(12) United States Patent
Jeon et al.

(10) Patent No.: US 11,095,894 B2
(45) Date of Patent: Aug. 17, 2021

(54) METHOD FOR ENCODING/DECODING IMAGE, AND DEVICE THEREFOR

(71) Applicant: SAMSUNG ELECTRONICS CO., LTD., Suwon-si (KR)

(72) Inventors: Sun-young Jeon, Anyang-si (KR); Jae-hwan Kim, Yongin-si (KR); Young-o Park, Seoul (KR); Jeong-hoon Park, Seoul (KR); Jong-seok Lee, Suwon-si (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/627,406

(22) PCT Filed: Feb. 6, 2018

(86) PCT No.: PCT/KR2018/001540
§ 371 (c)(1),
(2) Date: Dec. 30, 2019

(87) PCT Pub. No.: WO2019/009489
PCT Pub. Date: Jan. 10, 2019

(65) Prior Publication Data
US 2020/0145661 A1     May 7, 2020

(30) Foreign Application Priority Data

Jul. 6, 2017   (WO) ................ PCT/KR2017/007267

(51) Int. Cl.
*H04N 19/124* (2014.01)
*H04N 19/117* (2014.01)
(Continued)

(52) U.S. Cl.
CPC ............ *H04N 19/124* (2014.11); *G06N 3/08* (2013.01); *H04N 19/117* (2014.11);
(Continued)

(58) Field of Classification Search
CPC .... H04N 19/124; H04N 19/196; H04N 19/61; H04N 19/184; H04N 19/85; G06N 3/08
(Continued)

(56) References Cited

U.S. PATENT DOCUMENTS 6,075,884 A     6/2000 Lubin et al.
2016/0360202 A1   12/2016 Xu et al.
(Continued)

FOREIGN PATENT DOCUMENTS

JP          7-184082 A      7/1995
KR   10-2004-0107850 A    12/2004
(Continued)

OTHER PUBLICATIONS

Li et al., ("Toward A Practical Perceptual Video Quality Metric"; Available at: http://techblog.netflix.com/2016/06/oward-practical-perceptual-video.html; Jun. 6, 2016, pp. 1-24) (Year: 2016).*
(Continued)

*Primary Examiner* — On S Mung
(74) *Attorney, Agent, or Firm* — Sughrue Mion, PLLC

(57) ABSTRACT

Provided is a method of encoding an image, the method including: determining a subjective quality of the image when the image is compressed; determining at least one degree of compression that changes the subjective quality and is from among degrees of compression indicating how much the image is compressed; and encoding the image by compressing a residual signal of the image, based on compression information according to the determined degree of compression, wherein the subjective quality is determined for each frame by using a Deep Neural Network (DNN).
(Continued)

Provided are an image decoding method and an image decoding apparatus for performing the image decoding method for decoding an image by using information encoded according to an image encoding method.

15 Claims, 35 Drawing Sheets

(51) Int. Cl.
*H04N 19/184* (2014.01)
*H04N 19/196* (2014.01)
*H04N 19/61* (2014.01)
*H04N 19/85* (2014.01)
*G06N 3/08* (2006.01)

(52) U.S. Cl.
CPC ......... *H04N 19/184* (2014.11); *H04N 19/196* (2014.11); *H04N 19/61* (2014.11); *H04N 19/85* (2014.11)

(58) Field of Classification Search
USPC .................................................. 375/240.03
See application file for complete search history.

(56) References Cited

U.S. PATENT DOCUMENTS

2016/0379352 A1  12/2016  Zhang et al.
2017/0345130 A1* 11/2017  Wang ................... G06T 3/4053

FOREIGN PATENT DOCUMENTS

| KR | 10-2017-0000767 A | 1/2017 |
| WO | 2016/183011 A1 | 11/2016 |
| WO | 2017/036370 A1 | 3/2017 |

OTHER PUBLICATIONS

International Search Report dated Jul. 2, 2018 issued by the International Searching Authority in counterpart Application No. PCT/KR2018/001540 (PCT/ISA/210).
Written Opinion dated Jul. 2, 2018 issued by the International Searching Authority in counterpart International Application No. PCT/KR2018/001540 (PCT/ISA/237).
Angshul Majumdar and Aditay Tripathi, "Asymmetric Stacked Autoencoder", 2017, pp. 911-918, 8 pages total, XP033112151.
Dai et al., "A Convolutional Neural Network Approach for Post-Processing in HEVC Intra Coding", Oct. 29, 2016, 12 pages total.
Park et al., "CNN-Based In-Loop Filtering for Coding Efficiency Improvement", 2016, 5 pages total.
Communication dated Feb. 11, 2020 issued by the European Intellectual Property Office in counterpart European Application No. 18828859.1.

* cited by examiner

FIG. 8
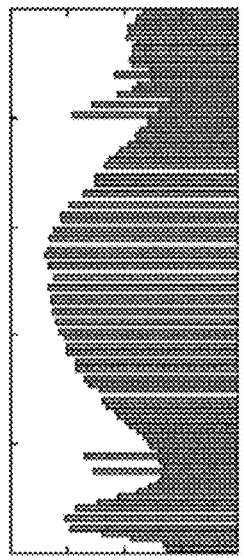
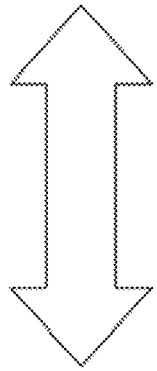
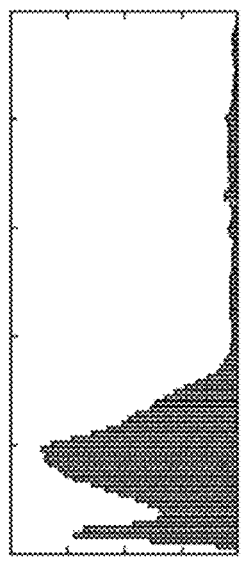
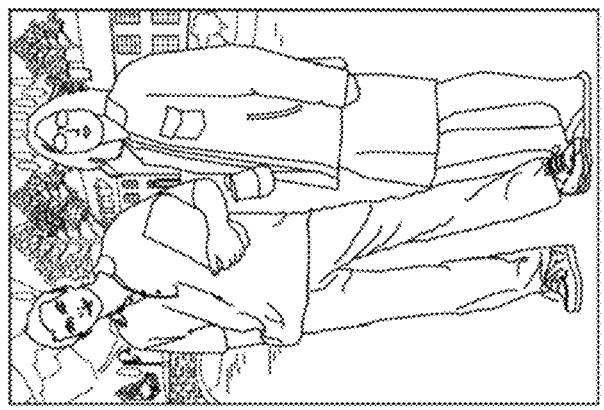

FIG. 11
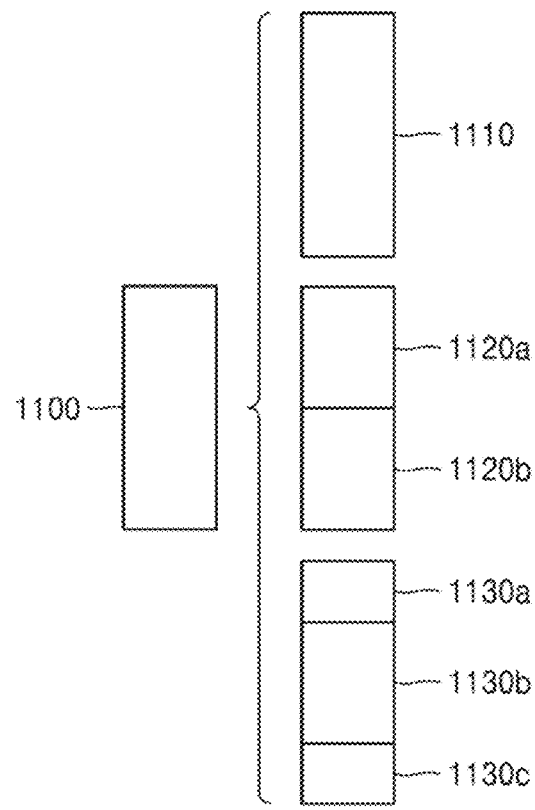
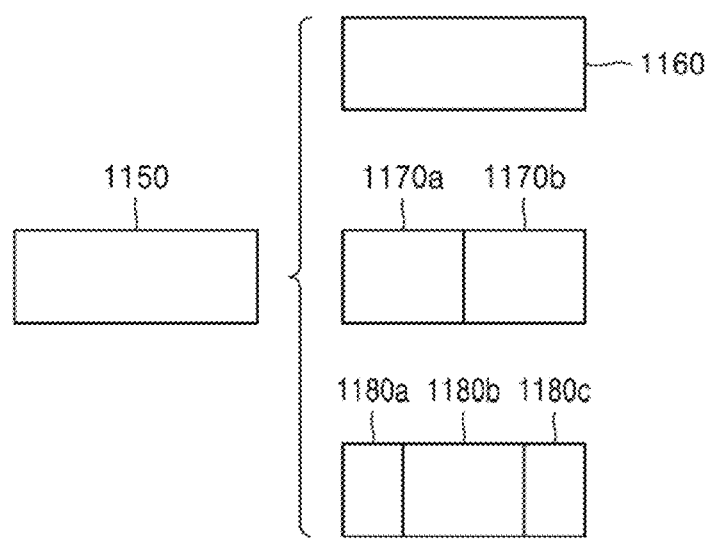

FIG. 20

| BLOCK TYPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... | ial
METHOD FOR ENCODING/DECODING IMAGE, AND DEVICE THEREFOR

TECHNICAL FIELD

The disclosure relates to a method and apparatus for efficiently performing prediction in an image encoding or image decoding process.

BACKGROUND ART

A residual sample used in a process of encoding an image may be transformed and quantized, and a restore process may be performed by using a signal that has undergone a transformation and quantization process and then been inverse-transformed and inverse-quantized. Accordingly, the restored signal may be stored, in a buffer, as sample values that are usable in a decoding process.

DESCRIPTION OF EMBODIMENTS

Technical Problem

According to a transformation and quantization process, when a signal that has been transformed from a spatial domain to a frequency domain is quantized, an error may occur, and a quality of an image that is decoded based on the error may be degraded. Also, when a lot of data is encoded to reduce the degradation in the quality, compression efficiency of the image may be degraded.

Solution to Problem

According to an embodiment, provided is a method of encoding an image, the method including: determining a subjective quality of the image when the image is compressed; determining at least one degree of compression that changes the subjective quality and is from among degrees of compression indicating how much the image is compressed; and encoding the image by compressing a residual signal of the image, based on compression information used in an image compression process performed based on the at least one degree of compression, wherein the subjective quality is determined for each frame included in the image by using a Deep Neural Network (DNN).

According to an embodiment, provided is a method of decoding an image, the method including: obtaining, from a bitstream, compression information used in an image compression process performed based on at least one degree of compression; obtaining a residual signal from an autoencoder, based on the compression information; and decoding the image by using the obtained residual signal, wherein the at least one degree of compression is at least one of degrees of compression which change a subjective quality obtained by using a DNN.

According to an embodiment, provided is an image decoding apparatus including: an obtainer configured to obtain, from a bitstream, compression information used in an image compression process performed based on at least one degree of compression; and a decoder configured to obtain a residual signal from an autoencoder, based on the compression information, and decode the image by using the obtained residual signal, wherein the at least one degree of compression is at least one of degrees of compression which change a subjective quality obtained by using a DNN.

Advantageous Effects of Disclosure

According to an embodiment, an image encoding or image decoding process is performed by using a Deep Neural Network (DNN), such that encoding or decoding efficiency for image may be improved.

BRIEF DESCRIPTION OF DRAWINGS

FIG. 8 illustrates a result of pre-processing or post-processing by the pre-processor or the post-processor, according to an embodiment.

FIG. 11 illustrates a process of determining at least one coding unit by splitting a non-square coding unit, according to an embodiment.

FIG. 20 illustrates a process of determining a depth of a coding unit as a shape and size of the coding unit change, when the coding unit is recursively split such that a plurality of coding units are determined, according to an embodiment.

BEST MODE

Figure 1A:
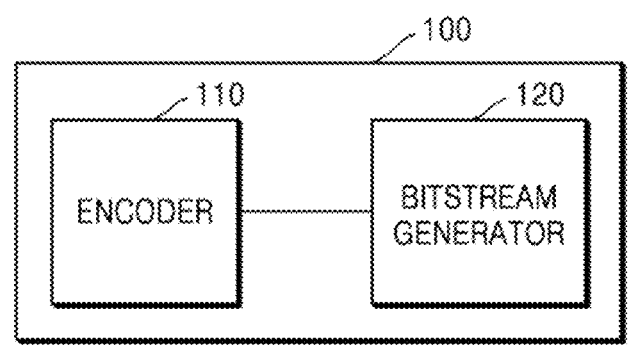
FIG. 1A is a block diagram of an image encoding apparatus for encoding an image by using a Deep Neural Network (DNN), according to an embodiment.

According to an embodiment, provided is a method of encoding an image, the method including: determining a subjective quality of the image when the image is compressed; determining at least one degree of compression that changes the subjective quality and is from among degrees of compression indicating how much the image is compressed; and encoding the image by compressing a residual signal of the image, based on compression information used in an image compression process performed based on the at least one degree of compression, wherein the subjective quality is determined for each frame included in the image by using a Deep Neural Network (DNN).

The determining of the subjective quality may include determining the subjective quality based on a machine learning result obtained by using the DNN using a plurality of layers.

The determining of the subjective quality may include: determining at least one convolution image by using at least one filter kernel for each of the plurality of layers; and performing pooling on the at least one convolution image.

The determining of the subjective quality may include determining the subjective quality with respect to the frame by using at least one of a sample value, histogram and motion information which are associated with the frame.

The encoding of the image may include: when the image is compressed according to the at least one degree of compression, compressing the residual signal of the image by using the compression information including a quantization parameter of the compressed image; and generating a bitstream including the compressed residual signal.

The compressing of the residual signal of the image may include: inputting the residual signal to a autoencoder; and obtaining the compressed residual signal from a hidden layer that is commonly used in compression and decompression processes and is from among at least one hidden layer included in the autoencoder.

The obtaining of the compressed residual signal may include: determining a number of nodes of the hidden layer that is commonly used in the compression and decompression processes, based on the compression information; and obtaining the compressed residual signal from the hidden layer having the determined number of nodes.

The inputting of the residual signal may include: performing pre-processing on amplitude and distribution of the residual signal; and inputting the pre-processed residual signal to the autoencoder.

The method may further include generating a bitstream including information indicating the pre-processing.

According to an embodiment, provided is a method of decoding an image, the method including: obtaining, from a bitstream, compression information used in an image compression process performed based on at least one degree of compression; obtaining a residual signal from an autoencoder, based on the compression information; and decoding the image by using the obtained residual signal, wherein the at least one degree of compression is at least one of degrees of compression which change a subjective quality obtained by using a DNN.

The decoding of the image may include obtaining the residual signal of the image by using the compression information including a quantization parameter of the image compressed according to the at least one degree of compression; and generating a bitstream including the compressed residual signal.

The obtaining of the residual signal may include obtaining the residual signal by inputting information to a hidden layer including a number of nodes determined based on the compression information, the information being obtained from the bitstream, and the number of nodes may correspond to a number of nodes of the hidden layer that is commonly used in compression and decompression processes performed by the autoencoder.

The decoding of the image may include: performing post-processing on amplitude and distribution of the obtained residual signal; and decoding the image by using the post-processed residual signal.

The performing of the post-processing may include obtaining information indicating the post-processing from the bitstream; and performing the post-processing, based on the obtained information indicating the post-processing.

According to an embodiment, provided is an image decoding apparatus including: an obtainer configured to obtain, from a bitstream, compression information used in an image compression process performed based on at least one degree of compression; and a decoder configured to obtain a residual signal from an autoencoder, based on the compression information, and decode the image by using the obtained residual signal, wherein the at least one degree of compression is at least one of degrees of compression which change a subjective quality obtained by using a DNN.

MODE OF DISCLOSURE

Advantages and features of the disclosure and methods of accomplishing the same may be understood more readily by reference to the following detailed descriptions of the embodiments and the accompanying drawings. In this regard, the disclosure may, however, be embodied in many different forms and should not be construed as being limited to the embodiments set forth herein. Rather, these embodiments are provided so that this disclosure will be thorough and complete and will fully convey the concept of the embodiments to one of ordinary skill in the art.

Hereinafter, the terms used in the specification will be briefly defined, and the disclosure will be described in detail.

All terms including descriptive or technical terms which are used in the disclosure should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed descriptions of the disclosure. Thus, the terms used in the disclosure have to be defined based on the meaning of the terms together with the descriptions throughout the specification.

An expression used in the singular encompasses the expression of the plural, unless it has a clearly different meaning in the context of the specification.

Throughout the specification, when a part "includes" or "comprises" an element, unless there is a particular description contrary thereto, the part can further include other elements, not excluding the other elements. Also, the term "unit" used in the specification means a software component or hardware component such as a field-programmable gate array (FPGA) or an application-specific integrated circuit (ASIC), and performs specific functions. However, the term "unit" is not limited to software or hardware. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, variables, or the like. A function provided by the components and "units" may be associated with the smaller number of components and "units", or may be divided into additional components and "units".

Hereinafter, an "image" may indicate a static image such as a still image of a video or may indicate a dynamic image such as a moving picture that is the video itself.

Hereinafter, a "signal" or "sample" refers to data that is allocated to a sampling location of an image and is a processing target. For example, pixel values in an image of a spatial domain or transform coefficients on a transformation domain may be samples. A unit including one or more samples may be defined as a block.

The disclosure will now be described more fully with reference to the accompanying drawings for one of ordinary skill in the art to be able to perform the disclosure without any difficulty. In addition, portions irrelevant to the description of the disclosure will be omitted in the drawings for clear descriptions of the disclosure.

FIG. 1A is a block diagram of an image encoding apparatus 100 for encoding an image by using a Deep Neural Network (DNN), according to an embodiment.

The image encoding apparatus 100 according to an embodiment may include an encoder 110 configured to perform a process of encoding and thus compressing an image, and a bitstream generator 120 configured to generate a bitstream including information associated with the encoded image.

According to an embodiment, the encoder 110 may execute a program command stored in a memory and/or storage device. The encoder 110 may include at least one processor including a central processing unit (CPU), a graphics processing unit (GPU), or the like.

According to an embodiment, to allow a decoding apparatus to use, in a decoding process, information encoded by the encoder 110, the bitstream generator 120 may generate a bitstream including an image compression result and various types of information used in the compression.

Figure 2A:
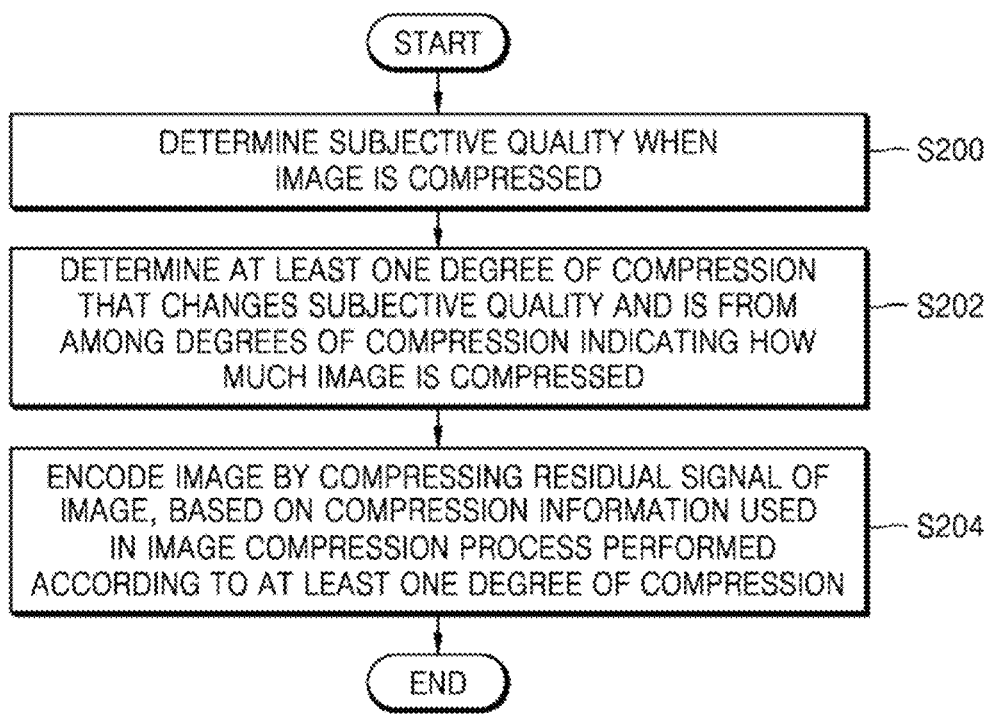
FIG. 2A is a flowchart of a method, performed by the image encoding apparatus, of encoding an image based on an inflection point of a subjective quality, according to an embodiment.

FIG. 2A is a flowchart of a method, performed by the image encoding apparatus 100, of encoding an image based on an inflection point of a subjective quality, according to an embodiment. According to an embodiment, the subjective quality may correspond to a quality that is one of various evaluation items for evaluating a quality of an image and with which a user views and perceives the image.

In operation S200, the encoder 110 of the image encoding apparatus 100 may determine a subjective quality of an image when the image is compressed according to an embodiment. According to an embodiment, a quality of an image may be determined based on an objective quality evaluation and a subjective quality evaluation. The objective quality evaluation may be performed by measuring a peak signal-to-noise ratio (PSNR) by using an average error of quality degradation, compared to an original image. According to an embodiment, the PSNR may be calculated by using Equation 1.

$$PSNR = 10\log_{10}\left(\frac{MAX^2}{MSE}\right) \quad \text{[Equation 1]}$$

Here, MAX may be a maximum value of an image signal and may be in dB. Mean squared error (MSE) may indicate a squared sum of an error between an original image and a compressed image.

In this manner, a scheme of deriving a level of a quality by using a mathematical equation is referred to as an objective quality evaluation method. However, occasionally, the objective quality evaluation method cannot directly represent a subjective quality a human perceives. Therefore, a "subjective quality evaluation" method involving relatively accurately digitizing qualities perceived by a human may be used. Studies for a method of assessing a perceptual quality of an image have been actively developed and may vary as to be described below, but are not limited thereto.

For example, according to how much information of a reference image (that is, an image before degradation) is to be used, a subjective quality may be evaluated according to a Full-Reference (FR) scheme of using all information of the reference image, a Reduced-Reference (RR) scheme of using a part of information extracted from the reference image, a No-Reference (NR) scheme of not using information of the reference image, or the like. Also, the subjective quality may be predicted and evaluated, without using a restored image signal, by using bitstream information before reconstruction or a parameter, etc. occurring in a restore process.

For example, the subjective quality may be assessed based on a Video Multimethod Assessment Fusion (VMAF) score. VMAF is a tool for assessing a subjective quality. The VMAF evaluates the subjective quality based on components including Visual Information Fidelity (VIF), Detail Loss Metric (DLM), motion estimation, or the like.

Also, for example, the subjective quality evaluation may be determined based on a mean opinion score (MOS) value. Such a MOS test may be performed to determine and compare values capable of directly representing a subjective perceptual quality to a user, and the values may be measured in a manner that a particular image is directly displayed to the user and the user directly determines a score representing a quality perceived by the user.

According to an embodiment, the encoder 110 of the image encoding apparatus 100 may use a DNN to evaluate a subjective quality of an image to be encoded. According to an embodiment, the subjective quality to be determined by the encoder 110 may be a VMAF score or a MOS value which varies according to a degree of compression of the image.

According to an embodiment, the encoder 110 may use a DNN to which a training procedure is performed using various types of images so as to perform a process of determining a subjective quality of an image by using the DNN. According to an embodiment, the encoder 110 may perform, by using the trained DNN, a subjective quality determination process based on features of the image to be encoded. The features of the image which are used in the subjective quality determination process may include brightness, hue, saturation, contrast, histogram, spatial frequency response feature, chromaticity coordinates, motion information, bit rate, resolution, aspect ratio, or the like of frames that construct the image. According to an embodiment, the DNN may be trained based on perceptual feature values (VMAF, MOS, etc.) that are preset with respect to various images, and may determine a subjective quality of the image to be encoded, in consideration of the preset perceptual feature values and a feature of at least one frame included in the image.

In operation S202, the encoder 110 of the image encoding apparatus 100 may determine at least one degree of compression that changes a subjective quality and is from among degrees of compression indicating how much an image is compressed.

Figure 3:
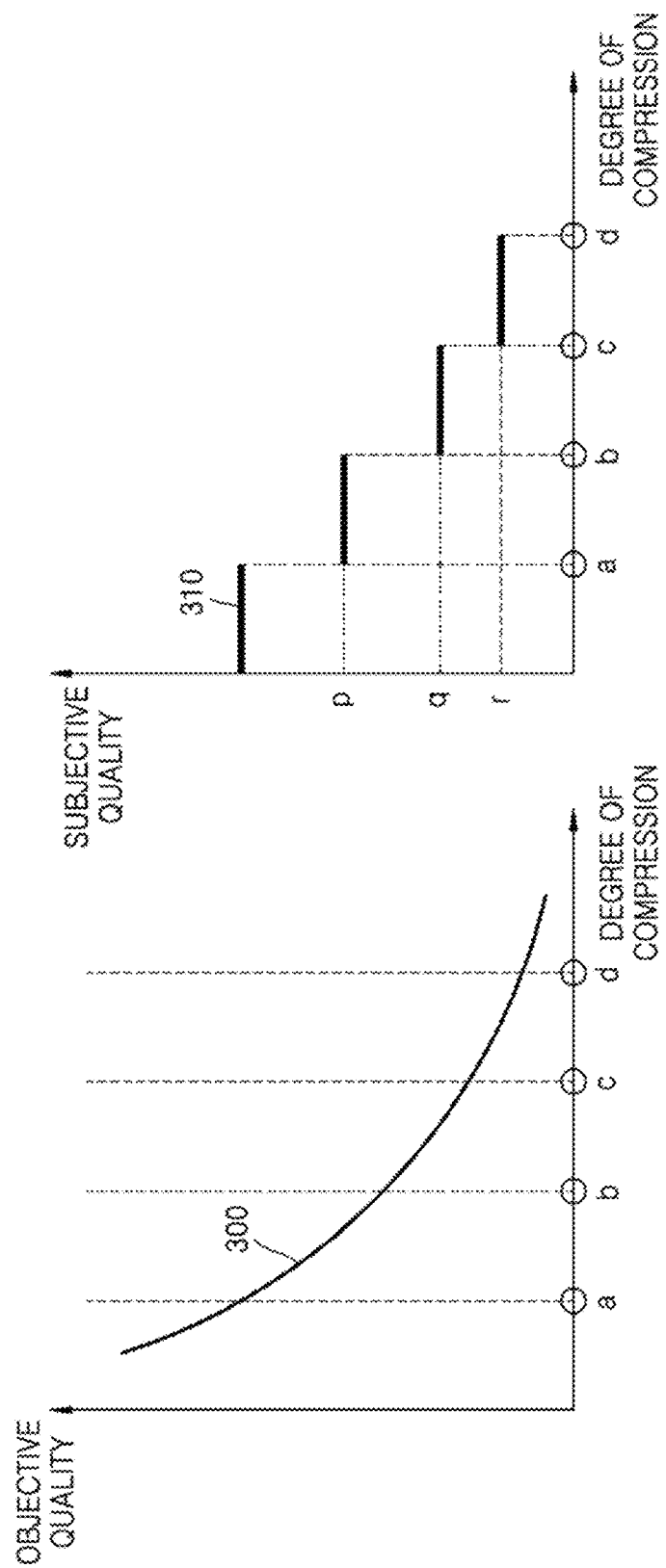
FIG. 3 illustrates that an objective quality and a subjective quality of an image become different in an image compression process, according to an embodiment.

FIG. 3 illustrates that an objective quality and a subjective quality of an image become different in an image compression process, according to an embodiment.

According to an embodiment, the encoder 110 may compress an image according to predetermined various degrees of compression so as to encode the image. Image degradation may occur due to compression of the image, and whether the image is degraded may be determined by evaluating the objective quality and the subjective quality. According to an embodiment, a degree of compression may be determined based on an amount of lossy data compared to an original image, and may indicate a compression rate via lossy compression, not lossless compression. The degree of compression may include various types of information to be used in a prediction process of removing temporal and spatial redundancies, a visual perception-based transformation and quantization process, and an entropy encoding process.

Referring to FIG. 3, when the degree of compression is increased, the objective quality of the image may be degraded. The objective quality of the image may be determined based on various types of information including a PSNR, a bit rate, or the like. For example, even when PSNRs are equal, an image having a higher bit rate may be determined as an image of a better objective quality.

According to an embodiment, the encoder 110 may determine the subjective quality corresponding to the degree of compression in each of frames constructing the image. The encoder 110 may determine, by using a DNN, a subjective quality of a frame included in the image to be encoded. The subjective quality determined by the encoder 110 may be information corresponding to a VMAF score or a MOS value, and may be a value that is constant in a range of a particular degree of compression. Referring to FIG. 3, an objective quality 300 is degraded when a degree of compression is increased, whereas a subjective quality 310 may have a range in which the subjective quality 310 is not changed even when a degree of compression is changed. In this regard, there is a threshold with respect to a change in an image quality perceived by an actual user, and thus, in a range where a change in a degree of compression does not exceed the threshold, compressed images may be determined to have subjective qualities that are equal to each other. According to an embodiment, referring to FIG. 3, when a degree of compression is increased in a range equal to or greater than a and less than b, the objective quality 300 may be degraded but the subjective quality 310 may remain constant at a p value. Similarly, when the degree of compression is increased in a range equal to or greater than b and less than c or a range equal to or greater than c and less than d, the objective quality 300 may be degraded but the subjective quality 310 may remain constant at a q value or an r value, respectively. According to an embodiment, a range of the subjective quality 310 may be between 1 to N (N>1).

According to an embodiment, the encoder 110 may determine a degree of compression which changes a subjective quality of an image determined according to the DNN. Referring to FIG. 3, unlike the objective quality 300 that is successively changed, a subjective quality may be determined to remain constant within a range of a preset degree of compression, and when a particular degree of compression is obtained, the subjective quality may be changed and such change may be non-successive. That is, the encoder 110 may determine a subjective quality compared to a degree of compression with respect to one of a plurality of frames constructing an image, and may determine the degree of compression to allow the subjective quality to remain constant in a preset range and then to be non-successively changed. Referring to FIG. 3, when the degree of compression is in the range equal to or greater than a and less than b, the subjective quality may be p, but, when the degree of compression is increased to b, the subjective quality that was p may be non-successively changed such that a value of p may be changed. The subjective quality in the range equal to or greater than b and less than c may remain constant at q.

Accordingly, to efficiently compress an image while a quality of the image that is actually compressed remains equally when a user views the image, the image encoding apparatus 100 may compress the image by using a largest degree of compression within a range of a degree of compression in which a subjective quality of the image is equally maintained. That is, referring to FIG. 3, to efficiently compress a particular frame by determining a subjective quality as q, the image encoding apparatus 100 may determine a largest degree of compression as a degree of compression to be used in an image encoding process, the largest degree of compression being from among degrees of compression in the range equal to or greater than b and less than c. For each frame, the encoder 110 may determine a subjective quality when each frame is encoded based on a degree of compression, and may determine at least one degree of compression (e.g., a, b, c, d, etc., of FIG. 3) that changes the subjective quality.

In operation S204, according to an embodiment, the image encoding apparatus 100 may encode the image by compressing a residual signal of the image, based on compression information used in the image compression process performed based on at least one degree of compression. The encoder 110 may determine the at least one degree of compression which changes the subjective quality, in operation S202, and may encode each frame by using the determined at least one degree of compression. The bitstream generator 120 of the image encoding apparatus 100 may generate a bitstream including a plurality of pieces of encoding information and may transmit the bitstream to a decoding end.

According to an embodiment, the image encoding apparatus 100 may determine the subjective quality by using a deep convolutional neural network as the DNN including a plurality of layers.

Figure 4A:
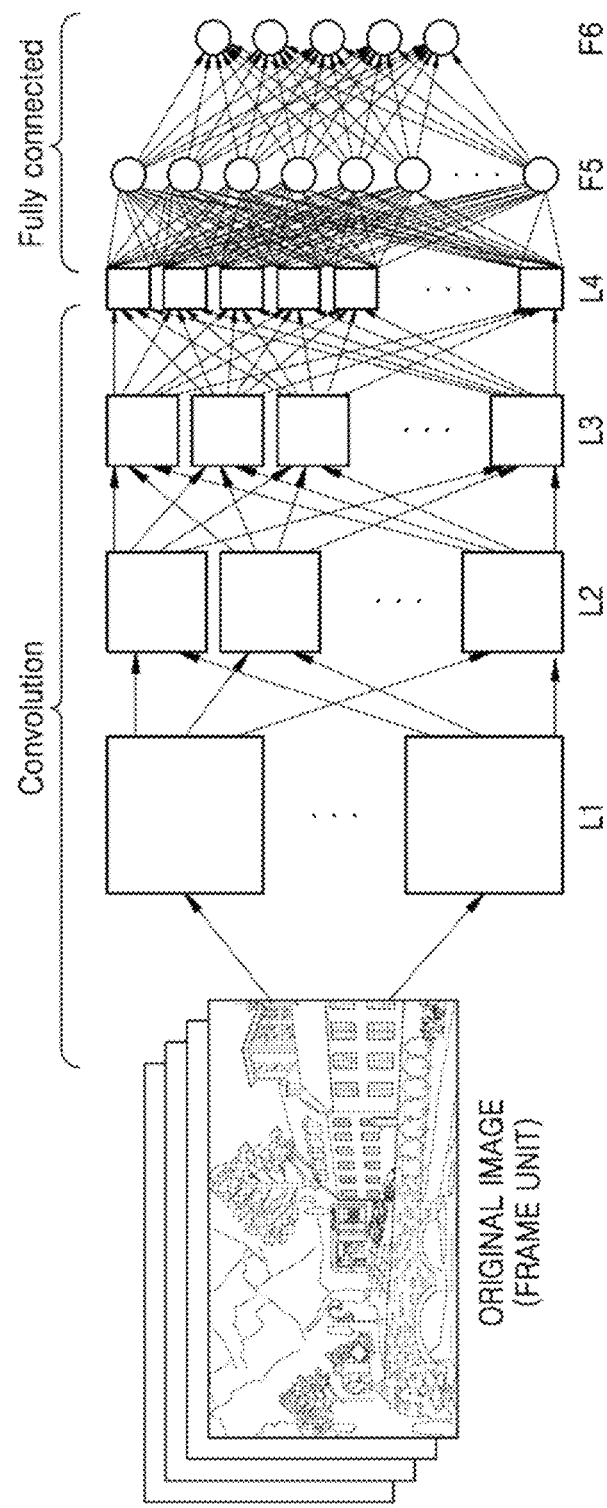
FIG. 4A illustrates a deep convolutional neural network that is usable by the image encoding apparatus to determine a subjective quality of an image, according to an embodiment.

FIG. 4A illustrates a deep convolutional neural network that is usable by the image encoding apparatus 100 to determine a subjective quality of an image, according to an embodiment.

According to an embodiment, the encoder 110 may determine a subjective quality of each of a plurality of frames included in an input original image. To determine the subjective quality of each frame, the deep convolutional neural network including a plurality of layers may be used. Referring to FIG. 4A, a convolution calculation with respect to a sample value included in each frame may be performed in each of a plurality of hidden layers L1, L2, L3 and L4. At least one feature map that is generated when the convolution calculation is performed in a last layer (e.g., L4) is applied to a fully connected layer and then is categorized, such that the subjective quality may be determined.

The deep convolutional neural network according to an embodiment may determine a subjective quality of an input image based on supervised learning. The supervised learning is designed to detect a determined answer by using an algorithm. Therefore, the deep convolutional neural network based on the supervised learning may be a model that infers a function from training data. In the supervised learning, a labeled sample (i.e., data having a target output value) is used in training.

The supervised learning algorithm receives a series of training data and a target output value corresponding thereto, detects an error by training based on comparison between an actual output value with respect to input data and the target output value, and thus modifies a model based on results thereof. That is, when the deep convolutional neural network is trained based on provided particular input/output data sets, the deep convolutional neural network learns data patterns of the provided input/output data sets and thus generates a model to predict a subjective quality of an input image. According to an embodiment, the input data set provided to the deep convolutional neural network is an input image of each content, and the output data set may be a subjective quality (e.g., a VMAF score or a MOS value) of the input image. In this manner, the deep convolutional neural network based on the supervised learning may optimize parameters of the deep convolutional neural network by self-training from many training data.

Figure 4B:
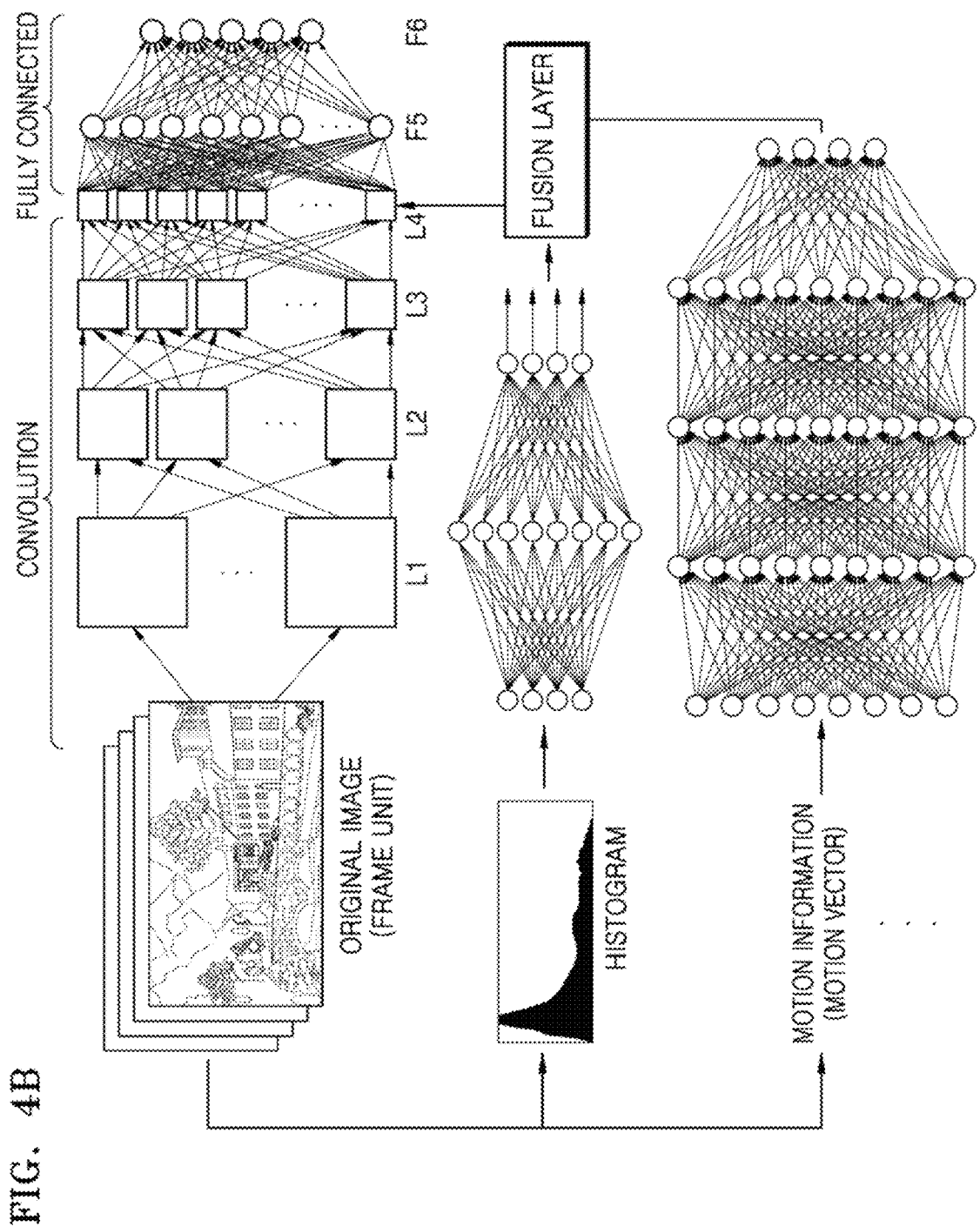
FIG. 4B illustrates a deep convolutional neural network of the image encoding apparatus which uses various types of information associated with an original signal so as to determine a subjective quality of an image, according to an embodiment.

FIG. 4B illustrates a deep convolutional neural network of the image encoding apparatus 100 which uses various types of information associated with an original signal so as to determine a subjective quality of an image, according to an embodiment.

According to an embodiment, the encoder 110 may use various types of information including sample values constituting frames of an original image, histogram of each frame, motion information, or the like, as an input value of a deep neural network.

According to an embodiment, the encoder 110 may determine a subjective quality of each of a plurality of frames included in an input original image, and may determine various types of information associated with each frame, as an input value of a deep convolutional neural network including a plurality of hidden layers. For example, the encoder 110 may use, as an input to a neural network, a sample value, histogram, motion information, brightness, color, chroma, contrast, a spatial frequency response characteristic, chromaticity coordinates, motion information, a resolution, an aspect ratio, or the like.

Referring to FIG. 4B, the encoder 110 may use a sample value of each frame, histogram, motion information, or the like, as an input value of a plurality of convolution layers so as to determine a subjective quality in a frame unit. In each of a plurality of hidden layers L1, L2, L3 and L4, a convolution calculation may be performed on a sample value included in each frame. At least one feature map generated when a convolution calculation is performed on a last hidden layer (e.g., the hidden layer L4) is applied to a fully-connected layer, such that a subjective quality may be determined.

According to an embodiment, various types of information used to determine a subjective quality may be determined as an input of a deep convolutional neural network having different architectures. A deep convolutional neural network may include any number of hidden layers, and the encoder 110 may determine a subjective quality by using the deep convolutional neural network including any number of hidden layers. For example, the encoder 110 may perform a convolution calculation on a sample value of a frame by using A hidden layers, may perform a convolution calculation on histogram of the frame by using B hidden layers, and may perform a convolution calculation on motion information by using C hidden layers. That is, when types of information to be convolution-computed are different, the encoder 110 may perform a convolution calculation using a different number of hidden layers on each type of information. However, the number of hidden layers and an input of a deep convolutional neural network are not limited to the aforementioned embodiment, and should be broadly interpreted to the extent that one of ordinary skill in the art can easily use characteristics in which various types of information associated with an original image may be used as an input of different hidden layers.

After a convolution calculation is performed on each of a plurality of pieces of information in a last layer, the encoder 110 may perform a convolution calculation on all of the plurality of pieces of information in a fusion layer. In order to allow a convolution calculation to be performed in the fusion layer including results of the convolution calculation with respect to various types of information, the encoder 110 may perform a preset calculation process on each of the plurality of pieces of information. For example, a calculation of concatenating results of final convolution calculations with respect to the plurality of pieces of information, a calculation of applying weights thereto, and a padding calculation may be performed.

According to an embodiment, the encoder 110 may perform a pooling process on a result of a convolution calculation in a convolution layer. That is, to reduce an amount of information of a result of a convolution calculation performed in each hidden layer, a simplification or compression process is required, and the encoder 110 may simplify a convolution result via a pooling or subsampling process. The encoder 110 may use a deep convolutional neural network in which a pooling layer for the pooling process exists between convolution layers. According to an embodiment, the encoder 110 may perform the simplification process on the convolution result by performing a max pooling process in the pooling layer.

According to an embodiment, the encoder 110 may determine a subjective quality of each of frames included in the original image and thus may determine a degree of compression at which the subjective quality is to be changed, and may determine a quantization parameter, a bit rate, or the like with respect to the determined degree of compression. That is, the encoder 110 may determine a quantization parameter, a bit rate, a rate-distortion cost, a bit depth, a size of a data unit, or the like so as to compress an image to a preset subjective quality. The image may be encoded by using the aforementioned various types of information determined by the encoder 110, as compression information that is information related to a degree of compression.

Figure 5A:
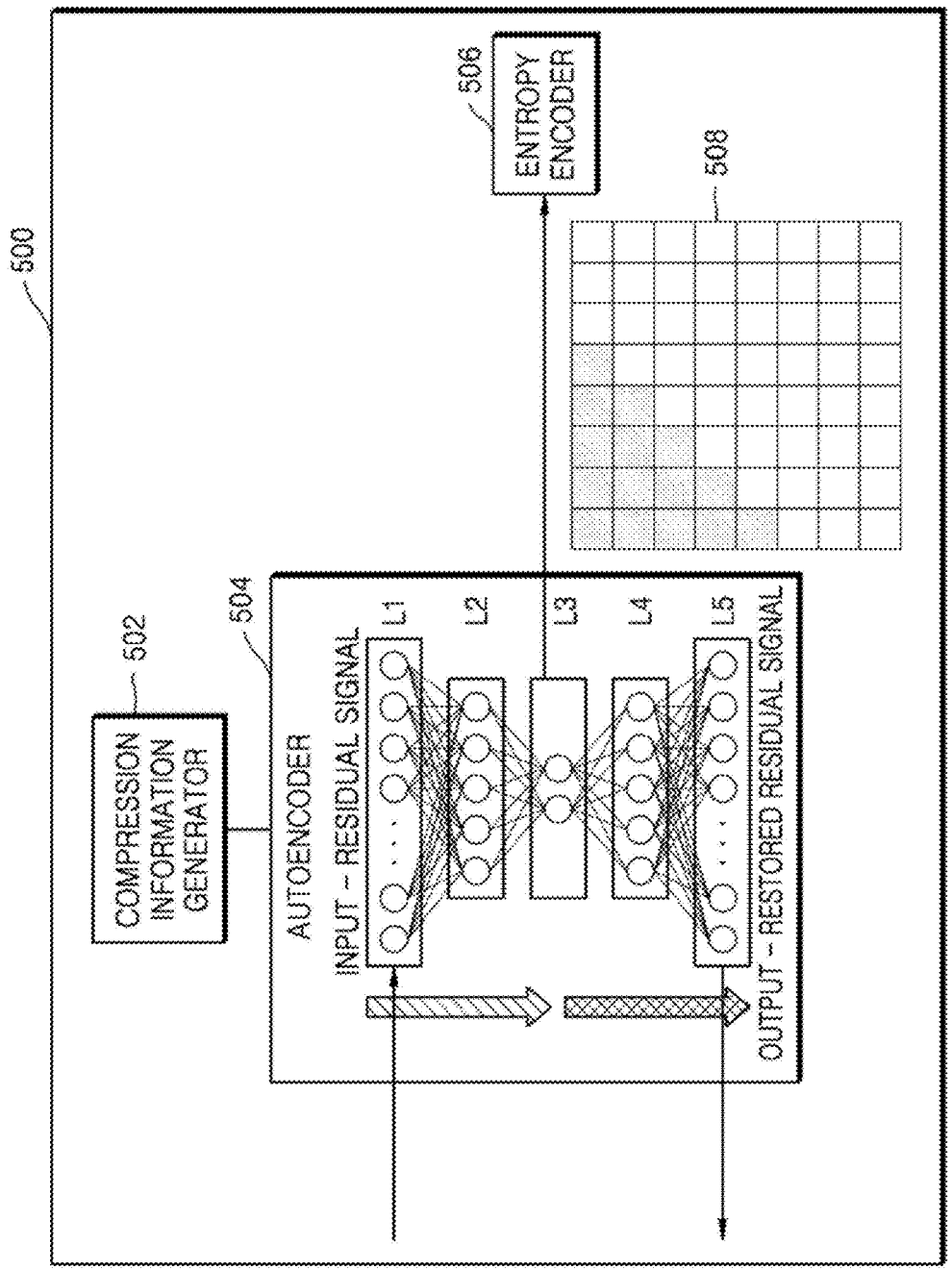
FIG. 5A is a block diagram for describing operations of an autoencoder included in an encoder, according to an embodiment.

FIG. 5A is a block diagram for describing operations of an autoencoder 504 included in an encoder 500, according to an embodiment. The encoder 500 of FIG. 5A has a structure corresponding to that of the encoder 110 of FIG. 1A.

The encoder 500 may perform various operations required to encode an image. Referring to FIG. 5A, the encoder 500 according to an embodiment may include a compression information generator 502 generating compression information used in a process of encoding an image according to a degree of compression at which a subjective quality is changed, the autoencoder 504 performing a process of compressing a residual signal based on the compression information generated by the compression information generator 502 and decompressing the compressed residual signal, and an entropy encoder 506 capable of entropy encoding the compressed residual signal.

According to an embodiment, the autoencoder 504 may automatically compress preset information, and may include a plurality of layers as network architecture. The plurality of layers included in the autoencoder 504 may consist of a plurality of layers in which compression and decompression are performed. The plurality of layers are symmetrical to each other with respect to hidden layers that are commonly used in compression and decompression processes. Referring to FIG. 5A, the autoencoder 504 has architecture in which layers L1, L2, L3, L4 and L5 are symmetrical to each other with respect to the layer L3. That is, the autoencoder 504 has symmetrical architecture in which the number of nodes of the layer L2 is equal to that of the layer L4 and the number of nodes of the layer L1 is equal to that of the layer L5 with respect to the layer L3. According to an embodiment, a hidden layer that is commonly used in compression and decompression processes may be a layer having a smallest number of nodes from among a plurality of layers included in an autoencoder.

According to an embodiment, the autoencoder 504 may receive an input of a signal for compression. Referring to FIG. 5A, a residual signal input to L1 may pass through L1, L2 and L3 and then may be compressed, and the compressed residual signal may be decoded by passing through L3, L4 and L5. A most compressed signal may be obtained from the layer L3. Because the layer L3 consists of the smallest number of neurons in the network of the autoencoder 504, the layer L3 may be called a "bottleneck" layer. According to an embodiment, a residual signal decompressed via a process of compressing and decompressing the residual signal, the process being performed by the autoencoder 504, may be generated, but a difference between the decompressed residual signal and an original signal may occur. According to an embodiment, the image encoding apparatus 100 may train the autoencoder 504 by setting the difference between an input and an output of the autoencoder 504 as an error and backpropagating the error. According to an embodiment, the autoencoder 504 may be trained to make a restored residual signal be equal to an input residual signal.

According to an embodiment, the autoencoder 504 may set weights on the plurality of layers, respectively, and the weights may be symmetrical with respect to a hidden layer that is commonly used in compression and decompression processes. Therefore, a weight of a layer used in the compression process may be equal to that of a layer used in the decompression process.

Hereinafter, for convenience of description, the hidden layer that is commonly used in the compression and decompression processes may be referred to as a common layer.

According to an embodiment, the entropy encoder 506 may obtain, from the autoencoder 504, a residual signal that is compressed up to the common layer, and may perform entropy encoding based on obtained information. An entropy encoding method that may be performed by the entropy encoder 506 may include various lossless compression techniques that can be performed in the video encoding/decoding field. The entropy encoder 506 may perform one method (for example, Context-based Adaptive Binary Arithmetic Coding (CABAC)) from among various binary arithmetic coding methods based on a probability of occurrence of a symbol to the extent that one of ordinary skill in the art can easily perform.

According to an embodiment, the encoder 500 may compress a residual signal of an image by using a quantization parameter as compression information used in a process of performing compression according to a degree of compression. According to an embodiment, the encoder 500 may determine the quantization parameter so as to perform compression based on the degree of compression at which a subjective quality is changed, and may perform, based on the quantization parameter, transformation and quantization processes, and inverse transformation and inverse quantization processes that are inverse thereto.

According to an embodiment, the encoder 500 may perform a process of compressing the residual signal by using the autoencoder 504, instead of the transformation and quantization processes based on the quantization parameter. The autoencoder 504 may perform compression on the residual signal, based on a quantization parameter that is compression information obtained from the compression information generator 502.

According to an embodiment, when a residual signal compression process using the autoencoder 504 is performed, a component input to entropy encoding may be gathered in a particular direction, unlike an encoding process in which quantization is performed by transforming a spatial component to a frequency component. That is, when the residual signal is frequency-transformed, non-zero transform coefficients may be more in a low frequency component, but zero transform coefficients exist among the non-zero transform coefficients, and thus there is a need for a process of detecting the non-zero transform coefficients by using a preset scan method. However, when the encoder 500 of the image encoding apparatus 100 performs the residual signal compression process using the autoencoder 504, compressed residual signals 508 that are gathered in a particular direction (e.g., the upper left side) may be obtained.

According to an embodiment, the encoder 500 may perform encoding on the residual signal by comparing a predetermined quantization parameter corresponding to a compression rate of the residual signal with the quantization parameter generated by the compression information generator 502.

According to an embodiment, the encoder 500 may determine a plurality of layers constituting the autoencoder 504, based on the compression information generated by the compression information generator 502. According to an embodiment, the encoder 500 may determine the number of layers and the number of nodes included in each of the layers constituting the autoencoder 504. According to an embodiment, the number of nodes of a common layer of the autoencoder 504 may be determined based on the compression information, and then compression and decompression processes of the residual signal may be performed based on a plurality of hidden layers including the common layer.

According to an embodiment, the bitstream generator 120 may generate a bitstream including autoencoder information indicating the number of layers of the autoencoder 504, the number of nodes included in each of the layers, and the like. According to an embodiment, the bitstream generator 120 may generate the bitstream including the autoencoder information indicating the number of nodes included in the common layer of the autoencoder 504 and may transmit the bitstream to a decoding end. However, the aforementioned characteristics of the autoencoder information are merely an embodiment, and it should be interpreted that the autoencoder information may variously include information indicating characteristics of the autoencoder 504, the characteristics being used by the encoder 110 to the extent that one of ordinary skill in the art can easily perform.

Figure 5B:
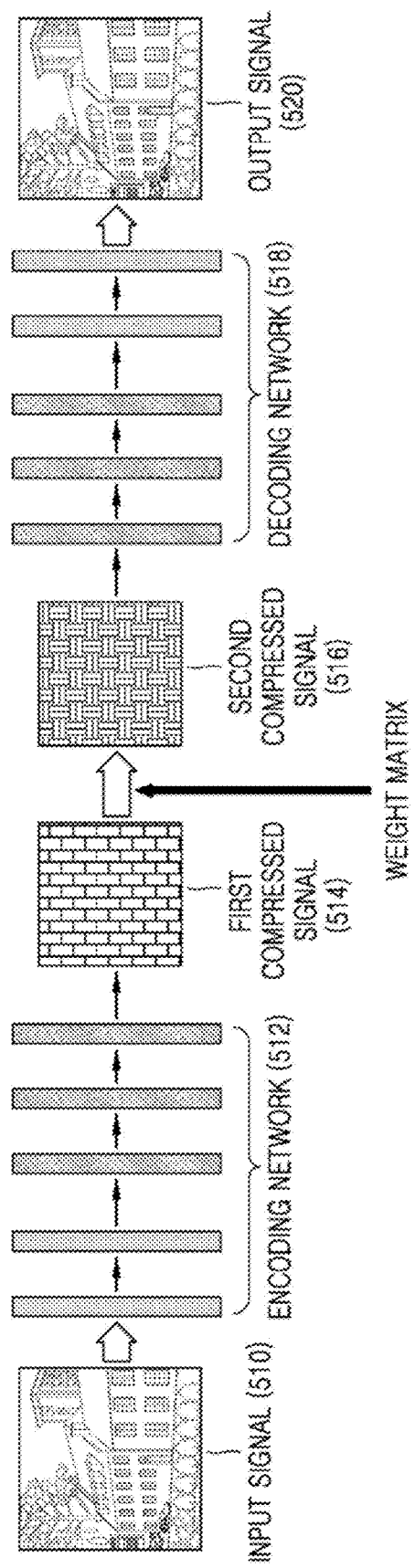
FIG. 5B is a diagram for describing layout architecture of an autoencoder, according to an embodiment.

FIG. 5B is a diagram for describing layout architecture of an autoencoder, according to an embodiment.

Referring to FIG. 5B, the autoencoder 504 includes an encoding network 512 and a decoding network 518. In this regard, the encoding network 512 may include the layers L1, L2 and L3 described above with reference to FIG. 5A, and the decoding network 518 may include the layers L3, L4 and L5 described above with reference to FIG. 5A.

The autoencoder 504 may perform unsupervised learning-based learning. Therefore, it is not necessary for the autoencoder 504 to receive an input of an expected value, but the autoencoder 504 may determine a weight parameter value of a network or a layer, based on only input data.

The encoding network 512 of the autoencoder 504 may be understood as a compression network that generates a compressed signal by reducing a dimension (i.e., by extracting a meaningful feature) of an input signal 510. On the other hand, the decoding network 518 of the autoencoder 504 may be understood as a reconstruction network that generates an output signal 520 similar to the input signal 510 by restoring the compressed signal compressed by the encoding network 512. As described above, the autoencoder 504 may be designed to include a convolutional neural network (CNN) and thus may output a restored signal similar to an original signal. Various architectures of the CNN will be described below with reference to FIGS. 5C to 5H.

According to an embodiment, the encoding network 512 and the decoding network 518 of the autoencoder 504 may each be constituted by a combination of a CNN layer and a fully connected (FC) layer.

For example, in order to design the autoencoder 504 to allow a medium result (that is, a compressed signal) to be equal to signal distribution of a discrete cosine transform (DCT) result, it is exemplary that the encoding network 512 and the decoding network 518 have a FC layer. Hereinafter, a configuration of the autoencoder 504 including the CNN layer and the FC layer will now be described.

According to an embodiment, the autoencoder 504 may generate a first compressed signal 514 by compressing the input signal 510 via the encoding network 512.

According to an embodiment, the autoencoder 504 may generate a second compressed signal 516 by applying a preset weight matrix to the first compressed signal 514. In this regard, the preset weight matrix may be a matrix by which the first compressed signal 514 becomes equal to signal distribution of a DCT result. Therefore, the preset weight matrix may be determined via training. For example, the autoencoder 504 may calculate loss by comparing the second compressed signal 516 with a DCT result of the first compressed signal 514, the second compressed signal 516 being generated by applying the preset weight matrix thereto. In this regard, a coefficient of the preset weight matrix may be determined (i.e., trained) to be a value to minimize the loss.

The DCT corresponds to a process of projecting a signal component of an image by using Cosine Eigen Vector as a basis vector, and thus, according to an embodiment, the second compressed signal 516 may concentrate distribution of signals, compared to the first compressed signal 514. That is, the preset weight matrix according to an embodiment may be a matrix for additionally compressing a compressed signal in terms of "concentration of pixel distribution in a spatial domain", the compressed signal having been already compressed via the encoding network 512. Therefore, the preset weight matrix may be understood as one of various matrices for concentrating on signal distribution of an image. In the aforementioned embodiment, it is described that a result of applying the preset weight matrix generates a result similar to signal distribution of the DCT result, but the embodiment is not limited thereto, and thus the result of applying the preset weight matrix may generate a result similar to signal distribution of transformation results by the discrete sine transform (DST), the Karhuhen-Loeve transform (KLT), or the like.

According to an embodiment, in order to design the autoencoder 504 to allow a medium result (that is, a compressed signal) to be equal to signal distribution of a DCT result, it is exemplary that the autoencoder 504 uses a FC layer.

According to an embodiment, the second compressed signal 516 may be a compressed signal of a residual signal. According to an embodiment, the second compressed signal 516 may be input to the entropy encoder 506 and thus may be entropy encoded. An entropy encoding process is described above with reference to FIG. 5A, and thus detailed descriptions thereof are omitted here.

According to an embodiment, the autoencoder 504 may generate and output an output signal 520 that is restored from the second compressed signal 516 via the decoding network 518. According to an embodiment, the image encoding apparatus 100 may train the autoencoder 504 by setting a difference between the input signal 510 and the output signal 520 as loss and backpropagating the loss. According to an embodiment, the autoencoder 504 may be trained to make the input signal 510 and the output signal 520 equal to each other.

That is, referring to FIG. 5B, the autoencoder 504 may be a network designed to be trained by using a sum of first loss and second loss. In this regard, the first loss may be loss corresponding to an error between the input signal 510 and the output signal 520. In other words, the first loss may be loss that is calculated by compressing and decompressing the input signal 510 via the autoencoder 504. The second loss may be loss corresponding to an error between the first compressed signal 514 and the second compressed signal 516. In other words, the second loss may be loss that is calculated by concentrating on signal distribution of the first compressed signal 514 compressed by the autoencoder 504. According to an embodiment, the autoencoder 504 may be trained to obtain functionality by concentrating on energy of a compressed signal to an upper left portion of a block, the functionality being better compared to an energy concentration level of a DCT.

FIGS. 5C to 5H are diagrams illustrating various architectures of a CNN.

Figure 5C:
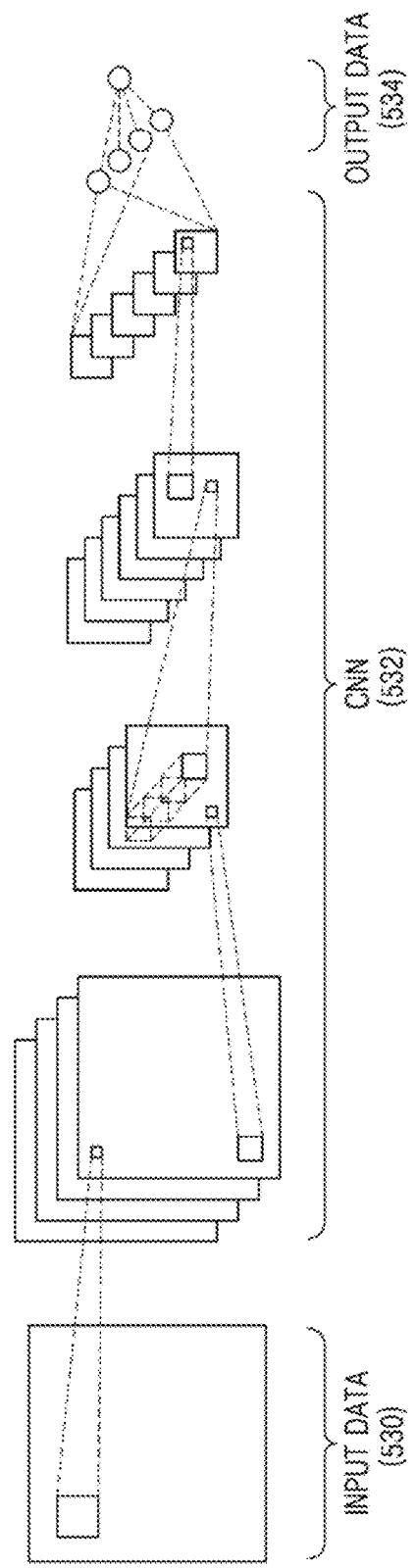
FIGS. 5C to 5H are diagrams illustrating various architectures of a convolutional neural network (CNN).

Referring to FIG. 5C, basic architecture of the DNN according to an embodiment is illustrated.

Referring to FIG. 5C, input data 530 is input via an input layer of a CNN 532, and output data 534 is output via an output layer of the CNN 532. A plurality of hidden layers may be included between the input layer and the output layer of the CNN 532. The hidden layers may include a convolution layer and a subsampling layer. The convolution layer performs, by using a convolution filter, a convolution calculation on image data input to each layer, and generates a feature map. In this regard, the feature map indicates image data that is representation of various features of the input data 530. The subsampling layer reduces a size of the feature map by performing sampling or pooling. An output layer of a CNN 620 identifies the various features represented in the feature map and thus classifies a class of the image data. In this regard, the output layer may be configured as a FC layer.

According to an embodiment, architecture (e.g., the number of hidden layers, the number and sizes of filters in each layer, and the like) of a CNN is predetermined, and a weight matrix of a filter (in particular, a convolution filter) in each layer may be set as an appropriate value by using a plurality of pieces of data of which correct classes are known. As described above, the plurality of pieces of data for which correct values are known are used as "training data". In this regard, a process of determining the weight matrix of the filter means "training".

For example, in the architecture of the CNN 532, the number of filters in each layer may be 64, and a size of each filter may be 3×3. Also, for example, the total number of layers in the architecture of the CNN 532 may be 10. However, the aforementioned embodiment is merely an example, and the number of hidden layers, and the number and sizes of filters in each layer may be changed and implemented according to various shapes.

Figure 5D:
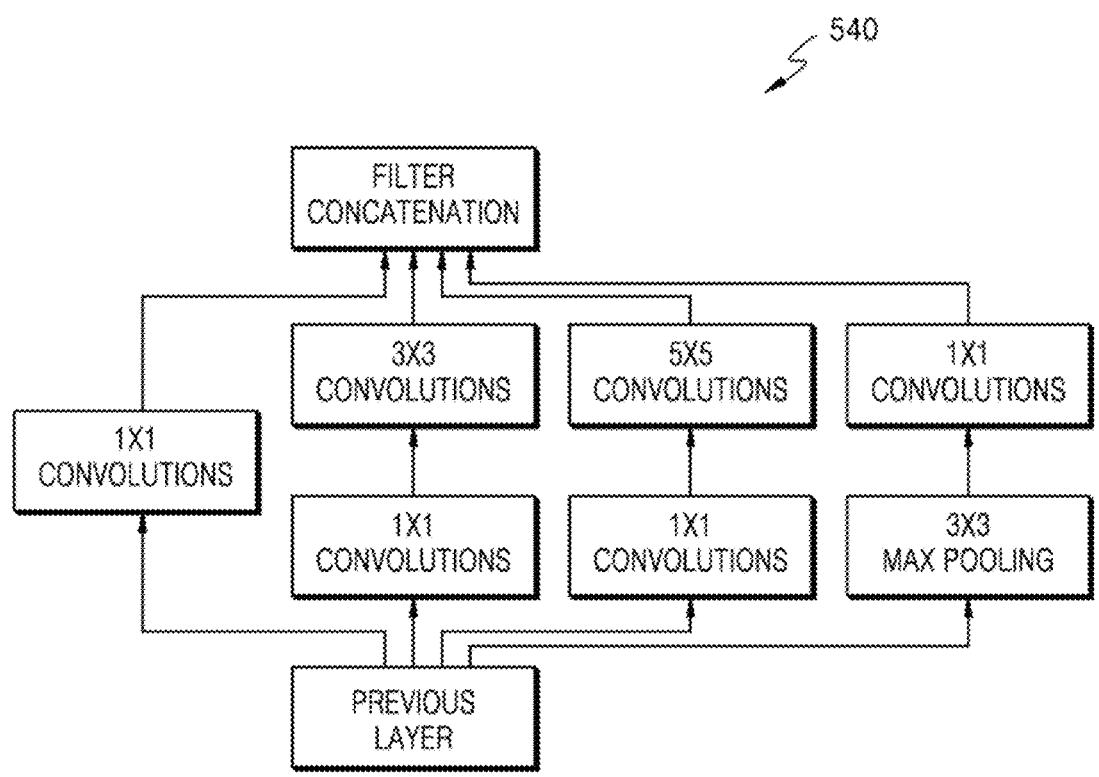

Referring to FIG. 5D, architecture of a CNN according to another embodiment is illustrated.

A CNN 540 of FIG. 5D may be a network constituted by a plurality of parallel layers. That is, a plurality of convolution layers and a pooling layer may be arrayed in parallel. In the CNN 540, a result output from a previous layer may be input to the plurality of parallel layers that are separate from each other. Different filters may be applied to the plurality of separate parallel layers, respectively. For example, the plurality of separate parallel layers may reduce a dimension via 1×1 convolution and then may perform convolution of 3×3, 5×5, or the like. Another layer may perform 3×3 max pooling and then may perform convolution. A layer that performs only 1×1 convolution may function as an identity loop that retains initial information. The plurality of parallel layers that performed convolution may be finally concatenated and may be output as a calculation result of a current layer. According to the CNN 540, layers are not required to be always stacked in a successive manner. Architecture of the CNN 540 is based on the fact that a network of which architecture is non-successively optimized has less error than a network of which architecture is successive.

Figure 5E:
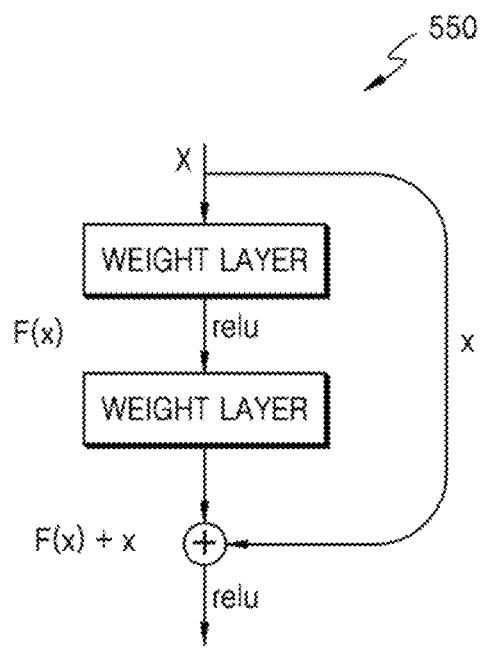

Referring to FIG. 5E, architecture of a CNN according to another embodiment is illustrated.

A CNN 550 of FIG. 5E corresponds to a network employing a concept of a skip layer. The CNN 550 has architecture in which an input of a past layer is added to an output of a current layer. A result of adding the past layer to the output of the current layer in the CNN 550 may become an input of a next layer. In general architecture of a CNN, convolution and pooling processes are performed in a plurality of layers, and then a size of a result value may be significantly decreased. In this case, detail information of the result value may be lost. The CNN 550 may use a past result in the convolution and pooling processes and thus may reinforce a detail part.

Figure 5F:
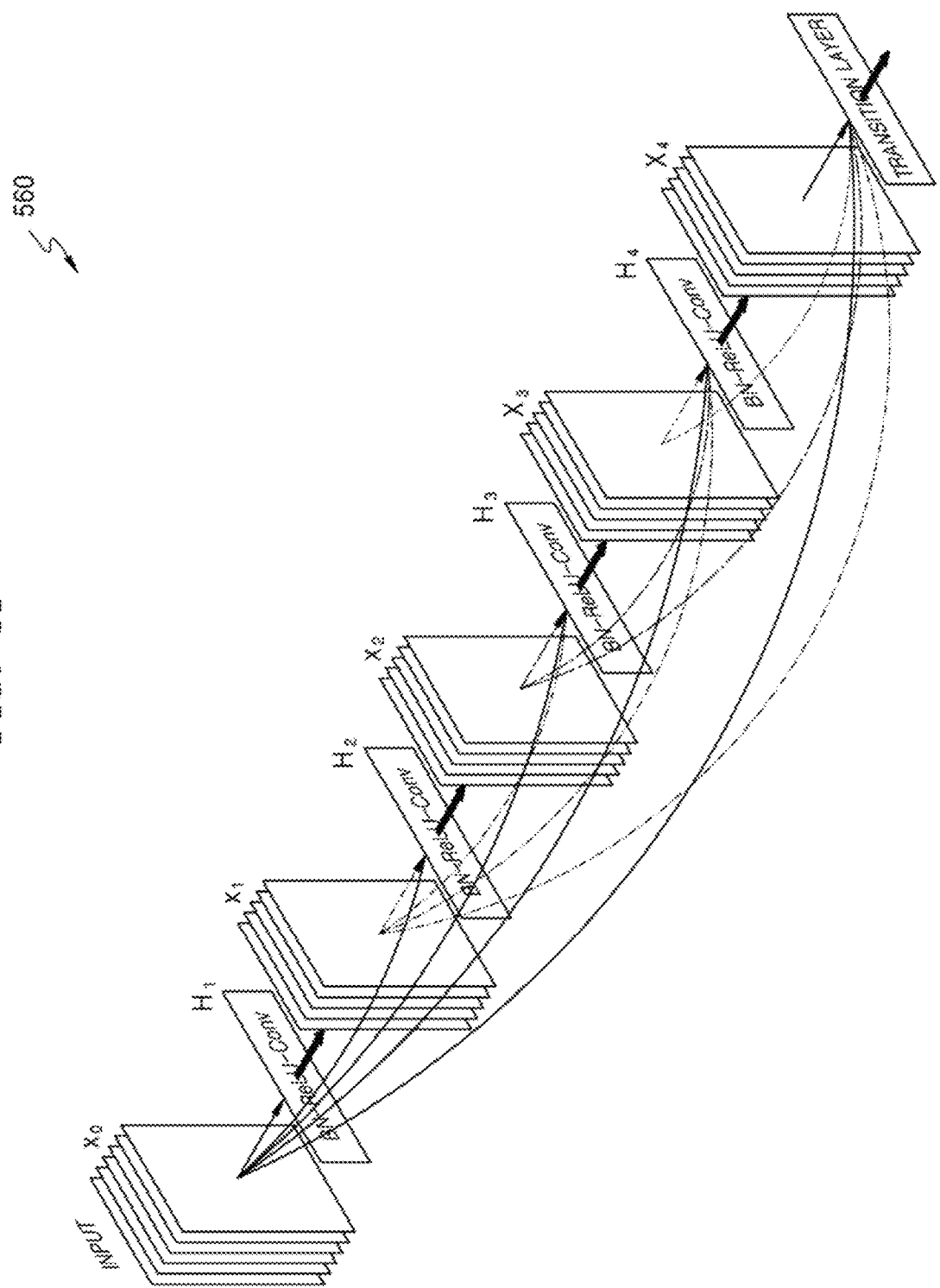

Referring to FIG. 5F, architecture of a CNN according to another embodiment is illustrated.

A CNN 560 of FIG. 5F corresponds to a network employing a concept of a skip layer, as that of the CNN 550 of FIG. 5E. However, compared to the CNN 550, the CNN 560 is characterized in that a relation between layers is dense because a past result may be added as an input of a layer at a random position. Furthermore, the CNN 560 may use a result of a calculation as the input of the layer at the random position, the calculation being performed by a past layer via a convolution operation.

Figure 5G:
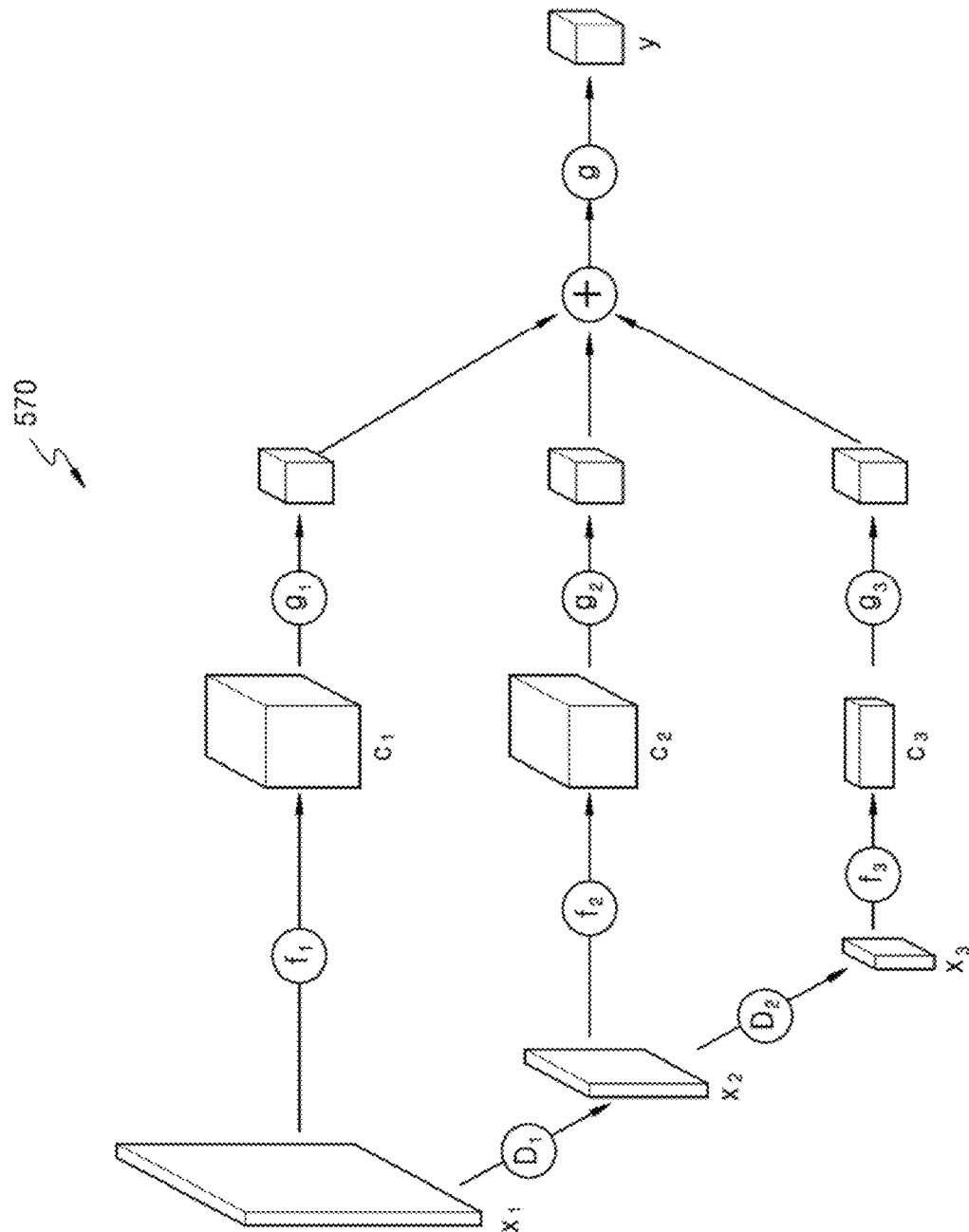

Referring to FIG. 5G, architecture of a CNN according to another embodiment is illustrated.

A CNN 570 of FIG. 5G is a network using pyramid architecture of multi-resolutions. The CNN 570 may divide a result of an immediate previous convolution layer into a pyramid of several steps. For example, in first step, a resolution may not be scaled, in second step, the resolution may be scaled by ½×½, and in third step, the resolution may be scaled by ¼×¼. Results of the several steps may be concatenated and then may be used as an input of a FC layer. A convolution layer is not affected by a size of an image but a FC layer has a limitation in a size of an input image, and thus the size of the input image has to be fixed in a general network. However, as in the CNN 570, when features output from a pyramid level of several steps are used as an input of a FC layer, and an output of a pyramid is pre-fixed regardless of a size of an image, a size of an image may not be limited any more.

Figure 5H:
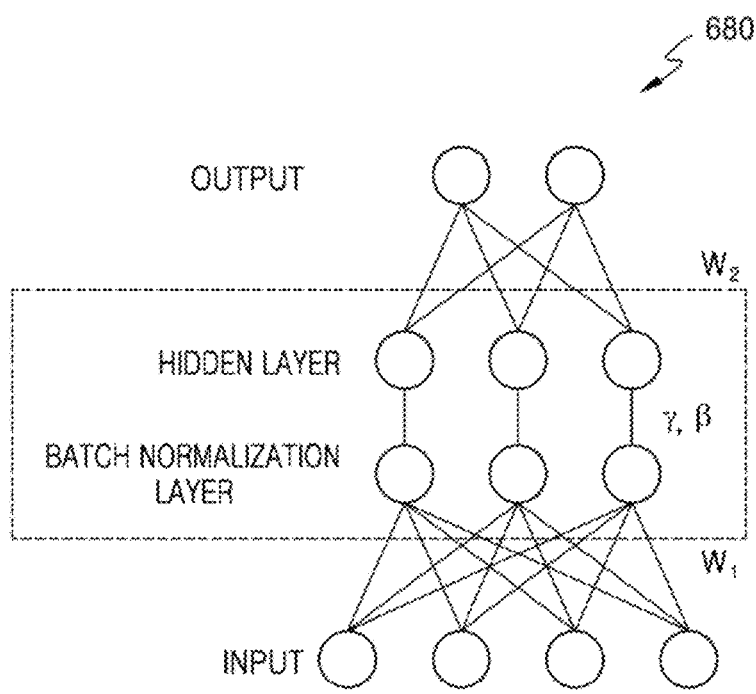

Referring to FIG. 5H, architecture of a CNN according to another embodiment is illustrated.

A CNN 580 of FIG. 5H is a network having architecture in which batch normalization is performed before or after a non-linear function (ReLu). A batch normalization layer is positioned at a front part of hidden layers and serves to adjust distribution of inputs. Also, the batch normalization layer is a layer absorbed in a network, and thus may optimize associated variables (scaling and shifting) via back-propagation. A method of improving distribution of inputs may be performed in a manner that normalization is performed on data with an average of 0 and distribution of 1, the data being input to each layer, and a scale variable γ is multiplied by the data and a shift variable β is added to the data. In this regard, the scale variable and the shift variable may be determined via training. The CNN 680 may prevent a gradient vanishing problem or a gradient exploding problem by performing normalization on a convolution result. Also, a training time may be decreased due to the batch normalization, and accuracy of training may be improved.

The various architectures of the CNN described with reference to FIGS. 5C to 5H may be applied to embodiments of the disclosure, and possible combinations thereof or a combination with a known learning network may also be applied thereto. Therefore, the aforementioned various architectures of the CNN are merely examples for convenience of description, and a CNN having variously modified architecture may be used in the present embodiment.

Figure 6A:
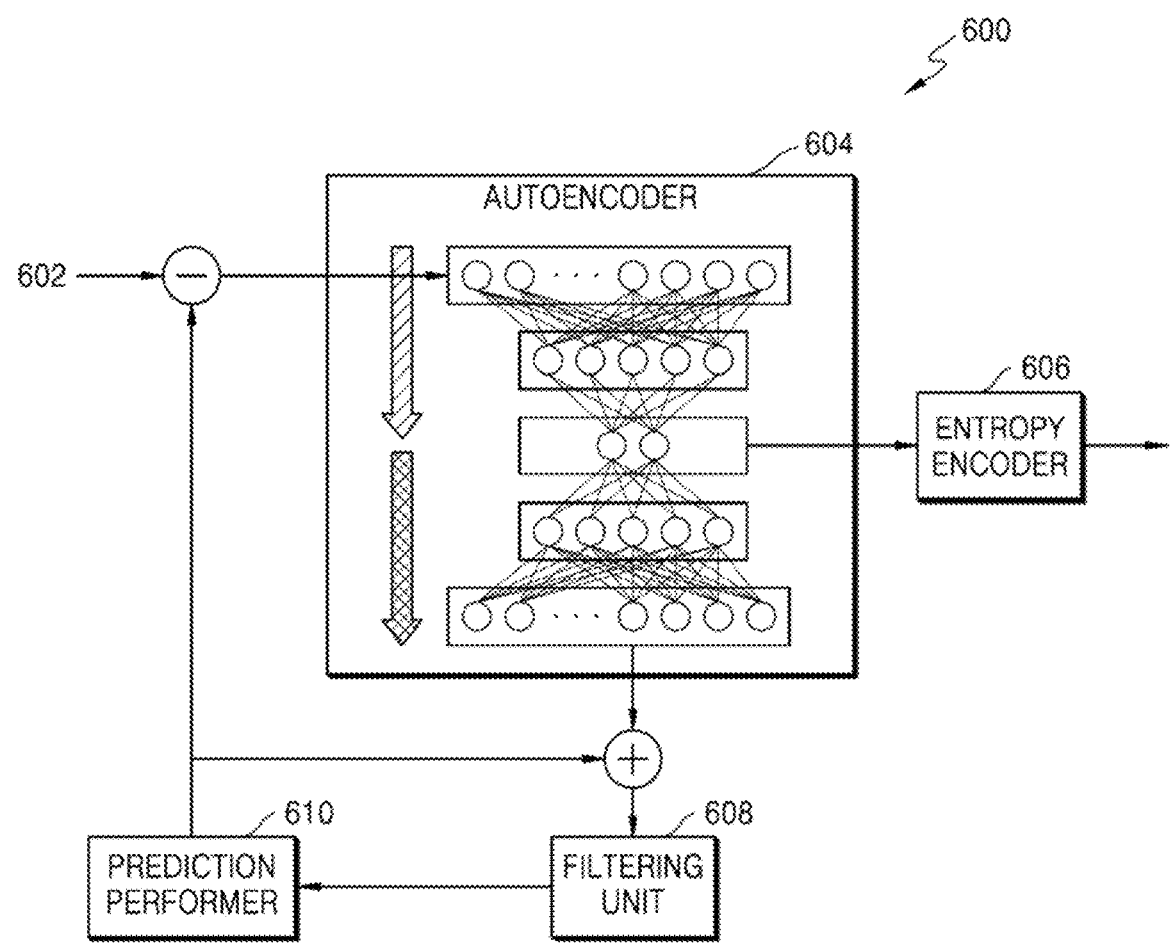
FIG. 6A is a block diagram of an encoder encoding and decoding an image by using an autoencoder, according to an embodiment.

FIG. 6A is a block diagram of an encoder 600 encoding and decoding an image by using an autoencoder 604, according to an embodiment.

According to an embodiment, the encoder 600 may include a prediction performer 610 capable of performing prediction based on blocks included in an original signal 602 of an input image, the autoencoder 604 capable of compressing or decompressing amplitude of a residual signal corresponding to a difference between a prediction signal and the original signal 602, an entropy encoder 606 capable of performing entropy encoding, based on the residual signal compressed by the autoencoder 604, and a filtering unit 608 performing in-loop filtering on a restored signal when the restored signal is determined based on the residual signal compressed and decompressed by the autoencoder 604 and the prediction signal determined by the prediction performer 610.

According to an embodiment, the autoencoder 604 may compress the residual signal corresponding to the difference between the original signal 602 and the prediction signal that is obtained by performing inter-prediction or intra-prediction using a reference picture stored in a decoded picture buffer (DPB) of the prediction performer 610.

According to an embodiment, a plurality of layers and a plurality of network nodes constituting the autoencoder 604 may be determined based on compression information determined by the encoder 600. For example, when the compression information determined by the encoder 600 indicates a high degree of compression, the number of layers and the number of network nodes which constitute the autoencoder 604 may be increased. As described above with reference to FIG. 2A, the compression information may be determined based on a subjective quality (e.g., a VMAF score or a MOS value) determined by the encoder 600.

As described above with reference to FIG. 5A, the autoencoder 604 may perform, via a plurality of layers, compression and decompression processes on an input residual signal. When the residual signal is compressed up to a common layer that is a layer commonly used in the compression and decompression processes by the autoencoder 604, the encoder 600 may perform entropy encoding According to an embodiment, the autoencoder 604 may obtain a decompressed residual signal by performing, via the plurality of layers, the compression and decompression processes on the input residual signal. The decompressed residual signal may be used to determine a restored signal based on a prediction signal determined by the prediction performer 610. In-loop filtering (e.g., deblocking filtering, sample adaptive offset (SAO) filtering, or the like) may be performed, by the filtering unit 608, on the restored signal that is determined based on the decompressed residual signal and the prediction signal. The filtered decompressed residual signal may be stored in the DPB of the prediction performer 610 and may be referred in a prediction process thereafter.

Figure 7A:
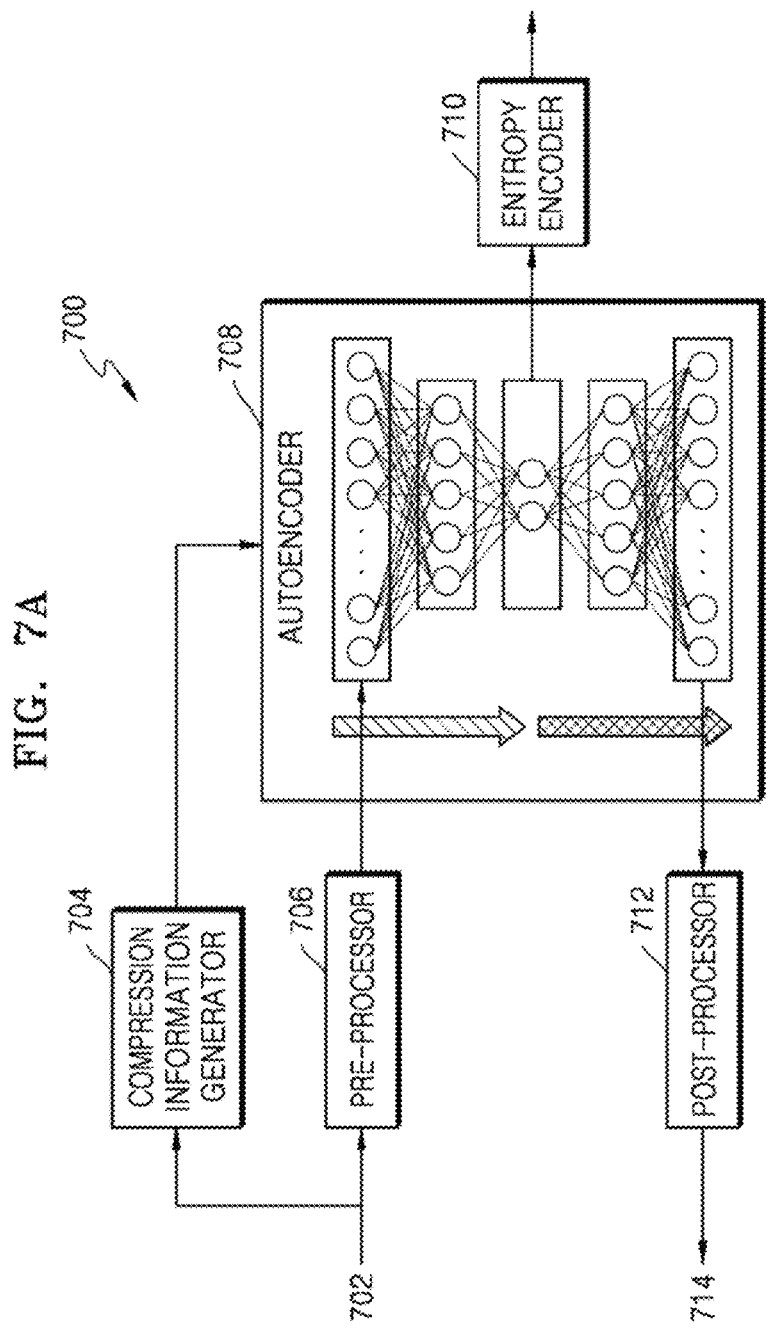
FIG. 7A illustrates pre-processing and post-processing processes that may be performed, by an encoder, on an input and an output of an autoencoder, according to an embodiment.

FIG. 7A illustrates pre-processing and post-processing processes that may be performed, by an encoder 700, on an input and an output of an autoencoder 708, according to an embodiment.

According to an embodiment, the encoder 700 may modify the input and the output of the autoencoder 708 by performing the pre-processing and post-processing processes in a process of compressing and decompressing a residual signal by using the autoencoder 708.

Referring to FIG. 7A, according to an embodiment, the encoder 700 may include a compression information generator 704 generating compression information used in a process of encoding an image at a degree of compression at which a subjective quality is changed, a pre-processor 706 performing pre-processing on a residual signal 702, the autoencoder 708 performing a process of compressing a residual signal based on the compression information generated by the compression information generator 704 and decompressing the residual signal to its original state, an entropy encoder 710 capable of entropy encoding the compressed residual signal, and a post-processor 712 performing post-processing on the residual signal decompressed by the autoencoder 708. The compression information generator 704, the autoencoder 708, and the entropy encoder 710 are described with reference to FIG. 5A, and thus detailed descriptions thereof are omitted here.

According to an embodiment, a residual signal that is determined by subtracting a prediction signal from an original signal is characterized in that a value of the residual signal is small and a dynamic range thereof is dense in a particular interval. The pre-processor 706 may perform pre-processing on the residual signal input to the autoencoder 708 and thus may change amplitude and a dynamic range of a signal input to the autoencoder 708 to a signal that can be efficiently compressed and decompressed by the autoencoder 708. According to an embodiment, the pre-processor 706 may change amplitude or a dynamic range of the residual signal by performing pre-processing such as normalization, histogram equalization, and the like.

According to an embodiment, a decompressed residual signal output by inputting the pre-processed residual signal to the autoencoder 708 may undergo a post-processing process by the post-processor 712. According to an embodiment, the post-processing process may be similar or inverse to the pre-processing process performed by the pre-processor 706. That is, the post-processor 712 may perform a process of restoring, via post-processing, the residual signal to an original residual signal before pre-processing is performed thereon. The encoder 700 may determine a restored signal by using a result of post-processing and a prediction signal, the post-processing being performed by the post-processor 712 with respect to the decompressed residual signal output from the autoencoder 708.

According to an embodiment, the post-processor 712 of the image encoding apparatus 100 may perform post-processing by using a predetermined post-processing performing method. According to an embodiment, the post-processor 712 may perform post-processing, according to one of a plurality of post-processing performing methods determined based on predetermined conditions. According to an embodiment, the predetermined conditions may be conditions about amplitude and distribution of a signal to be input to the post-processor 712, and the post-processor 712 may perform post-processing according to a method corresponding to the predetermined conditions.

According to an embodiment, the post-processor 712 of the image encoding apparatus 100 may perform post-processing according to a predetermined method, and the predetermined method may be a method that corresponds to a predetermined pre-processing performing method and corresponds to a pre-processing method performed by the pre-processor 706. According to an embodiment, it may be predetermined that the pre-processor 706 performs pre-processing to decrease amplitude of an input signal by 1/n and to increase distribution by n and the post-processor 712 performs post-processing to increase amplitude of an input signal by n and to decrease distribution by 1/n.

According to an embodiment, at least one of information about a pre-processing performing method, predetermined conditions used in a post-processing process, and a predetermined post-processing performing method corresponding to the pre-processing performing method may be shared via a separate server (not shown). According to an embodiment, information about the pre-processing performing method performed by the pre-processor 706 of the image encoding apparatus 100 may be transmitted to the server (not shown). In a post-processing process by a decoder, the decoder may determine, based on information obtained from the server, at least one of the information about the pre-processing performing method, the predetermined conditions used in the post-processing process, and the predetermined post-processing performing method corresponding to the pre-processing performing method.

According to an embodiment, the bitstream generator 120 may generate a bitstream including autoencoder information indicating the number of layers, the number of nodes of each of the layers, or the like of the autoencoder 504, and the pre-processing performing method, and the post-processing performing method. According to an embodiment, the autoencoder information and the bitstream related to the pre-processing or post-processing performing method may be included in Network Abstraction Layer (NAL) units that are distinguished therebetween.

According to an embodiment, the bitstream generator 120 may generate the bitstream including header information indicating that a preset number of NAL units included thereafter are a NAL unit related to the autoencoder information and a NAL unit related to the pre-processing performing method. The bitstream generator 120 may include, after the bitstream including header information, the NAL unit related to the autoencoder information and the NAL unit related to the pre-processing performing method, and thus may indicate that NAL units thereafter include information including data processing methods that are described in various embodiments and are performed by the autoencoder 504 and the pre-processor 706.

FIG. 8 illustrates a result of pre-processing or post-processing by the pre-processor 706 or the post-processor 712, according to an embodiment.

According to an embodiment, a signal pre-processed by the pre-processor 706 may be a signal of which dynamic range is wider compared to a signal before pre-processing, and an absolute value of a signal in a preset range is changed (e.g., a signal with amplitude equal to or less than a preset value is increased), and a signal post-processed by the post-processor 712 may be a signal of which dynamic range is narrower compared to a signal before post-processing, and an absolute value of a signal in a preset range is changed (e.g., a signal with amplitude equal to or more than a preset value is decreased). According to an embodiment, a pre-processing process and a post-processing process performed by the pre-processor 706 and the post-processor 712 may be inverse processes with respect to each other.

According to an embodiment, the various embodiments described above as a process that can be performed by the encoder 110 may be performed based on various data units being usable in an image encoding process. According to an embodiment, the encoder 110 may perform the image encoding process by using various data units including a video, a sequence, a frame, a slice, a slice segment, a largest coding unit, a coding unit, a prediction unit, a transform unit, a processing unit, or the like. According to an embodiment, the encoder 110 may perform pre-processing and post-processing processes on each frame. According to an embodiment, the encoder 110 may perform compression and decompression processes using an autoencoder, based on a coding unit, a prediction unit, or a transform unit. According to an embodiment, the encoder 110 may determine a subjective quality for each frame. The encoder 110 may generate a bitstream for each slice, the bitstream including compression information used when an image is compressed according to at least one degree of compression determined based on the subjective quality. According to an embodiment, the encoder 110 may perform, on each coding unit, a process of changing a resolution of a residual signal input to the autoencoder. However, it should not be interpreted that data units used by the encoder 110 to perform a preset process are limited to the aforementioned embodiments, and should be interpreted that various data units can be used to the extent that one of ordinary skill in the art can use. Characteristics of various data units that are usable by the image encoding apparatus 100 will be described below with reference to FIGS. 10 to 23.

Hereinafter, an image decoding apparatus configured to decode an image by obtaining a signal encoded by the image encoding apparatus 100 will now be described.

Figure 1B:
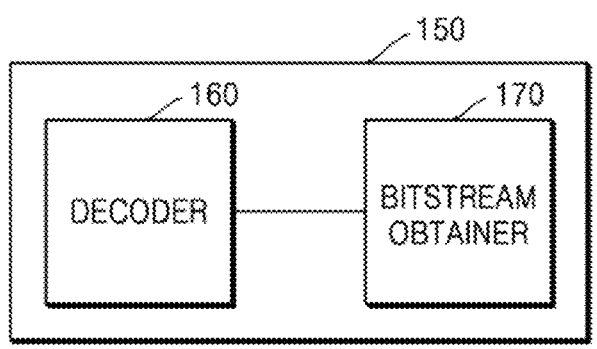
FIG. 1B is a block diagram of an image decoding apparatus for decoding an image by using a DNN, according to an embodiment.

FIG. 1B is a block diagram of an image decoding apparatus 150 for decoding an image by using a DNN, according to an embodiment.

The image decoding apparatus 150 according to an embodiment may include a decoder 160 configured to perform a process of decoding and thus reconstructing an image, and a bitstream obtainer 170 configured to obtain a bitstream including information associated with an encoded image.

According to an embodiment, the decoder 160 may execute a program command stored in a memory and/or storage device. The decoder 160 may include at least one processor including a CPU, a GPU, or the like.

According to an embodiment, the bitstream obtainer 170 may obtain a bitstream including information associated with an encoded image and various types of information used in the encoding, so as to allow the decoder 160 to use the bitstream in a decoding process.

Figure 2B:
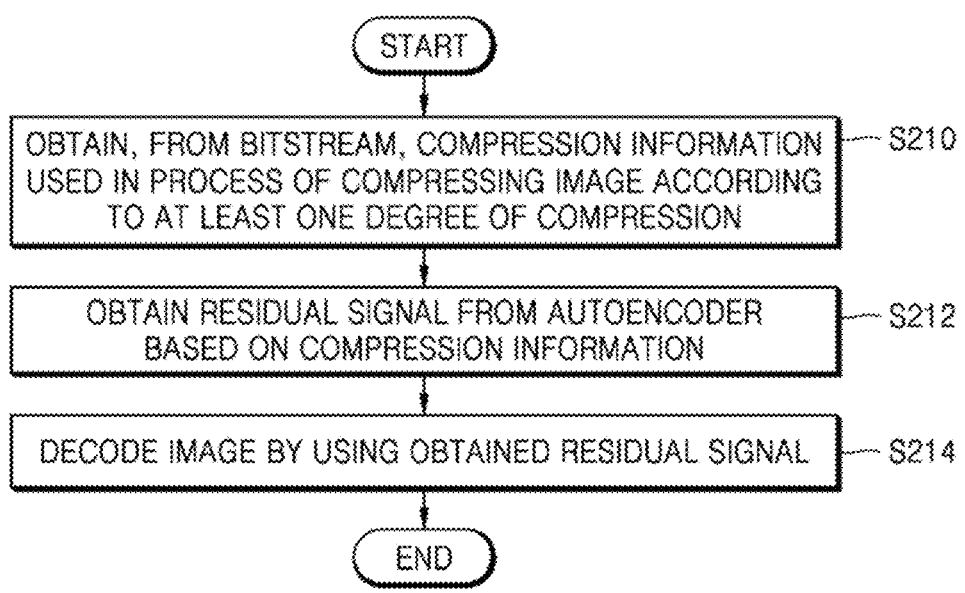
FIG. 2B is a flowchart of a method, performed by the image decoding apparatus, of decoding an image based on an inflection point of a subjective quality, according to an embodiment.

FIG. 2B is a flowchart of a method, performed by the image decoding apparatus 150, of decoding an image based on an inflection point of a subjective quality, according to an embodiment. According to an embodiment, the subjective quality may correspond to a quality that is one of various evaluation items for evaluating a quality of an image and with which a user views and perceives the image.

In operation S210, the bitstream obtainer 170 of the image decoding apparatus 150 may obtain, from a bitstream, compression information used in a process of compressing an image according to at least one degree of compression.

According to an embodiment, the compression information may be information indicating which degree of compression was used in a process of compressing an image to be decoded. According to an embodiment, at least one degree of compression which is indicative by the compression information may be determined based on a subjective quality of the image when the image is compressed.

According to an embodiment, the bitstream obtainer 170 of the image decoding apparatus 150 may obtain the bitstream including the compression information used when the image is encoded by using at least one degree of compression at which the subjective quality is changed. The decoder 160 may decode, by using the obtained compression information, the image of which subjective quality is determined by using a DNN. According to an embodiment, the at least one degree of compression indicated by the obtained compression information may be a degree of compression at which the subjective quality (e.g., a VMAF score or a MOS value) is changed.

FIG. 3 illustrates that an objective quality and a subjective quality of an image are changed in a process of compressing an image, according to an embodiment.

According to an embodiment, the decoder 160 may compress an image with various predetermined degrees of compression so as to encode the image. Image degradation may occur due to compression of the image, and whether the image is degraded may be determined by evaluating the objective quality and the subjective quality. According to an embodiment, a degree of compression may be determined based on an amount of lossy data compared to an original image, and may indicate a compression rate via lossy compression, not lossless compression. The degree of compression may include various types of information to be used in a prediction process of removing temporal and spatial redundancies, a visual perception-based transformation and quantization process, and an entropy encoding process. A process in which compression information to be used by the image decoding apparatus 150 is determined is described above with reference to FIGS. 3, 4A, and 4B, and thus, detailed descriptions thereof are omitted here.

According to an embodiment, in operation S212, the image decoding apparatus 150 may decode a residual signal of the image, based on the compression information obtained from the bitstream, and in operation S214, the decoder 160 may perform a residual signal decoding process using an autoencoder.

According to an embodiment, the image decoding apparatus 150 may determine the subjective quality by using a deep convolutional neural network as the DNN including a plurality of layers.

FIG. 5A is a block diagram for describing operations of the autoencoder 504 included in the encoder 500, according to an embodiment. The autoencoder 504 of FIG. 5A has network architecture including a plurality of layers for compressing and decompressing a residual signal. The decoder 160 has to perform an operation of decompressing a compressed residual signal obtained from a bitstream, and according to an embodiment, an autoencoder included in the decoder 160 may have architecture corresponding to the network architecture of the autoencoder 504 of the encoder 500. According to an embodiment, the autoencoder of the decoder 160 may decompress the residual signal by using layers for compression of the autoencoder 504 of the encoder 500. An operation of the autoencoder 504 of the encoder 500 is described above with reference to FIG. 5A, and thus, descriptions about an operation of the autoencoder of the decoder 160 are not omitted here.

According to an embodiment, the bitstream obtainer 170 may obtain, from a bitstream, autoencoder information indicating the number of layers of the autoencoder 504, the number of nodes included in each of the layers, and the like. According to an embodiment, the decoder 160 may obtain, from the bitstream, the autoencoder information indicating the number of nodes included in the common layer of the autoencoder 504, and may perform a decoding process using the autoencoder 504. However, the aforementioned characteristics of the autoencoder information are merely an embodiment, and it should be interpreted that the autoencoder information may variously include information indicating characteristics of the autoencoder 504, the characteristics being used by the decoder 160 to the extent that one of ordinary skill in the art can easily perform.

Figure 6B:
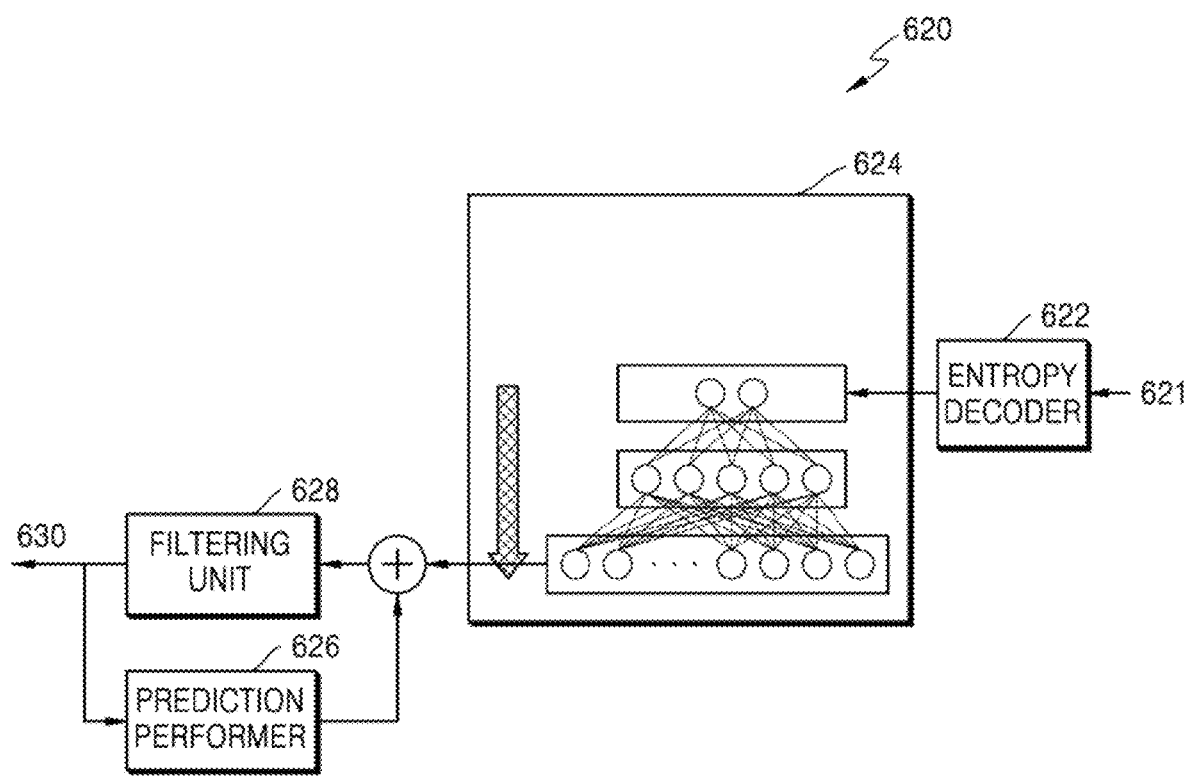
FIG. 6B is a block diagram of a decoder that decodes an image by using an autoencoder, according to an embodiment.

FIG. 6B is a block diagram of a decoder 620 that decodes an image by using an autoencoder 624, according to an embodiment.

According to an embodiment, the decoder 620 may include an entropy decoder 622 entropy decoding a residual signal 621 obtained by the bitstream obtainer 170 of the image decoding apparatus 150, the autoencoder 624 capable of decompressing amplitude of the obtained residual signal, a prediction performer 626 capable of performing prediction based on a block included in an image to be reconstructed, and a filtering unit 628 performing in-loop filtering on a restored signal when the restored signal is determined based on the residual signal decompressed by the autoencoder 624 and a prediction signal determined by the prediction performer 626.

As described above with reference to FIGS. 5A and 5B, the autoencoder 624 may perform, via a plurality of layers, a decompression process on a compressed signal where signal distribution is concentrated as in a DCT result. According to an embodiment, the autoencoder 624 may obtain a decompressed residual signal by performing the decompression process on a residual signal (i.e., the compressed signal) that is input through the plurality of layers. The decompressed residual signal may be used to determine the restored signal, based on the prediction signal determined by the prediction performer 626. In-loop filtering (e.g., deblocking filtering, SAO filtering, or the like) may be performed, by the filtering unit 628, on the restored signal that is determined based on the decompressed residual signal and the prediction signal. The filtered decompressed residual signal may be stored in a DPB of the prediction performer 626 and may be referred in a prediction process thereafter.

As the network architecture of the autoencoder 604 in the encoder 600 is determined based on compression information, the network architecture of the autoencoder 624 in the decoder 620 may be determined based on compression information, in an equal manner. According to an embodiment, the decoder 600 may determine the network architecture of the autoencoder 624, based on the compression information obtained from a bitstream. According to an embodiment, the compression information may include information such as a quantization parameter, a bit rate, or the like. According to an embodiment, the compression information may be determined based on the subjective quality (e.g., a VMAF score or a MOS value) determined by the encoder 600.

According to an embodiment, a plurality of layers and a plurality of network nodes constituting the autoencoder 624 may correspond to the network architecture of the autoencoder 604 of the encoder 600.

Figure 7B:
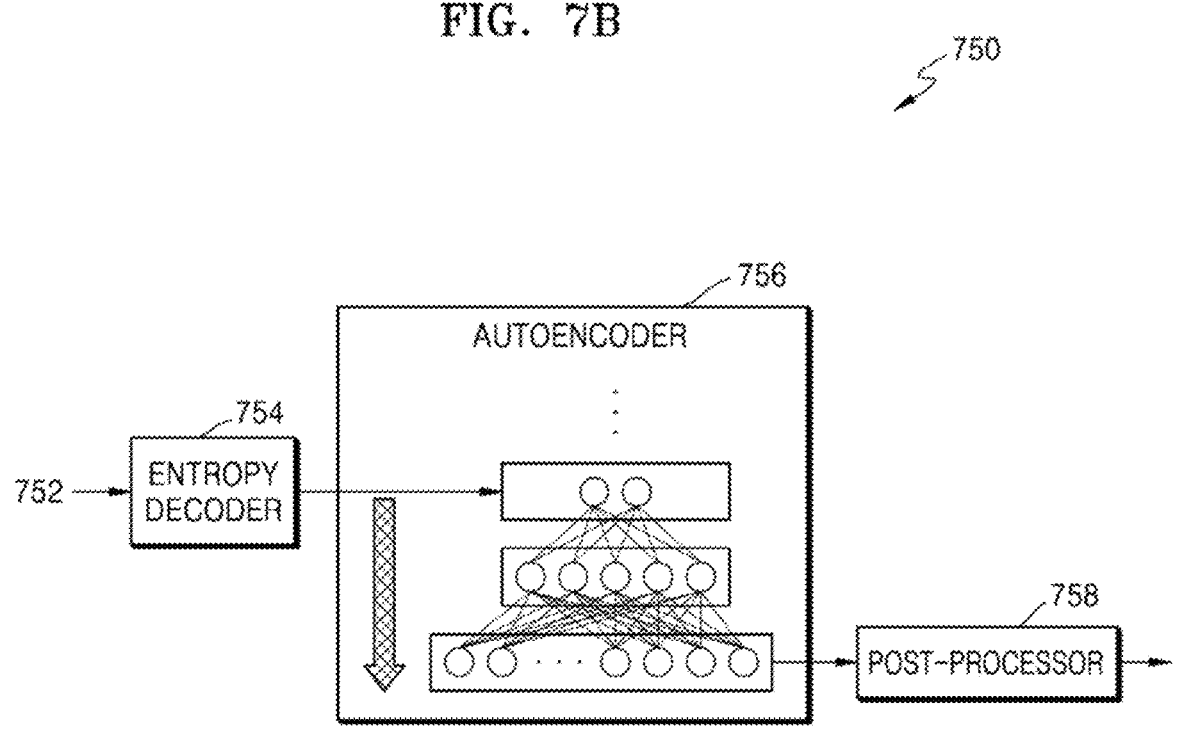
FIG. 7B illustrates a post-processing process to be performed, by a decoder, on an output of an autoencoder, according to an embodiment.

FIG. 7B illustrates a post-processing process to be performed, by a decoder 750, on an output of an autoencoder 756, according to an embodiment.

According to an embodiment, the decoder 750 may modify an input and an output of the autoencoder 708 by performing pre-processing and post-processing processes in a process of compressing and decompressing a residual signal by using the autoencoder 756.

Referring to FIG. 7B, according to an embodiment, the decoder 750 may include an entropy decoder 754 performing entropy decoding to obtain a residual signal 752 and compression information from a received bitstream, the autoencoder 756 performing a process of compressing a residual signal based on the compression information obtained from the bitstream and decompressing the residual signal to its original state, and a post-processor 758 performing post-processing on the residual signal decompressed by the autoencoder 756. The autoencoder 756 and the entropy decoder 754 are described with reference to FIGS. 5A and 6B, and thus detailed descriptions thereof are omitted here.

According to an embodiment, a decompressed residual signal output by inputting the pre-processed residual signal to the autoencoder 756 may undergo a post-processing process by the post-processor 758. According to an embodiment, the post-processing process may be similar or inverse to the pre-processing process performed by the pre-processor 706 of the encoder 700. That is, the post-processor 758 may perform a process of restoring, via post-processing, the residual signal to an original residual signal before pre-processing is performed thereon. The decoder 750 may determine a restored signal by using a result of post-processing and a prediction signal, the post-processing being performed by the post-processor 758 with respect to the decompressed residual signal output from the autoencoder 756.

According to an embodiment, the image decoding apparatus 150 may obtain information related to a pre-processing performing method from a bitstream, and the decoder 750 may perform a post-processing process on the decompressed residual signal based on the obtained information, the post-processing process corresponding to a pre-processing process. According to an embodiment, the information related to a pre-processing performing method may include a method of changing amplitude of a residual signal, a method of changing distribution of the residual signal, information about a filter set (e.g., a distribution model used in a pre-processing process, table information used in the pre-processing process, etc.) used by the pre-processor 706, or the like.

According to an embodiment, a signal post-processed by the post-processor 758 may be a signal whose dynamic range is narrower compared to a signal before post-processing, and an absolute value of a signal in a preset range is changed (e.g., a signal with amplitude equal to or less than a preset value is decreased). According to an embodiment, the post-processing process performed by the post-processor 758 may be inverse to a pre-processing process performed in an encoding process.

According to an embodiment, the post-processor 758 of the image decoding apparatus 150 may perform the post-processing process by using a predetermined post-processing performing method. According to an embodiment, the post-processor 758 may perform post-processing, according to one of a plurality of post-processing performing methods determined based on predetermined conditions. According to an embodiment, the predetermined conditions may be conditions about amplitude and distribution of a signal to be input to the post-processor 758, and the post-processor 758 may perform post-processing according to a method corresponding to the predetermined conditions.

According to an embodiment, the post-processor 758 of the image decoding apparatus 150 may perform post-processing according to a predetermined method, and the predetermined method may be a method that corresponds to a predetermined pre-processing performing method and corresponds to a pre-processing method performed by the pre-processor 706. According to an embodiment, it may be predetermined that the pre-processor 706 performs pre-processing to decrease amplitude of an input signal by 1/n and to increase distribution by n and the post-processor 758 performs post-processing to increase amplitude of an input signal by n and to decrease distribution by 1/n.

According to an embodiment, at least one of information about a pre-processing performing method, predetermined conditions used in a post-processing process, and a predetermined post-processing performing method corresponding to the pre-processing performing method may be shared via a separate server (not shown). According to an embodiment, the image decoding apparatus 150 may determine, based on information obtained from the server (not shown), at least one of the information about the pre-processing performing method, the predetermined conditions used in the post-processing process, and the predetermined post-processing performing method corresponding to the pre-processing performing method.

According to an embodiment, the bitstream obtainer 170 may obtain, from a bitstream, header information indicating that a preset number of NAL units included thereafter are a NAL unit related to the autoencoder information and a NAL unit related to the pre-processing performing method.

After the bitstream obtainer 170 obtains the header information from the bitstream, the bitstream obtainer 170 may obtain the NAL unit related to the autoencoder information and the NAL unit related to the pre-processing performing method. The decoder 160 may perform decoding using the autoencoder 624 or the post-processor 758 by using a data processing method performed by the autoencoder 624 or the post-processor 758, the data processing method included in the NAL unit obtained by obtaining the header information. According to an embodiment, the post-processing performing method may be a method corresponding to the pre-processing performing method performed by the image encoding apparatus 100, and may include information required in a post-processing process to be performed by the decoder 160.

Figure 9:
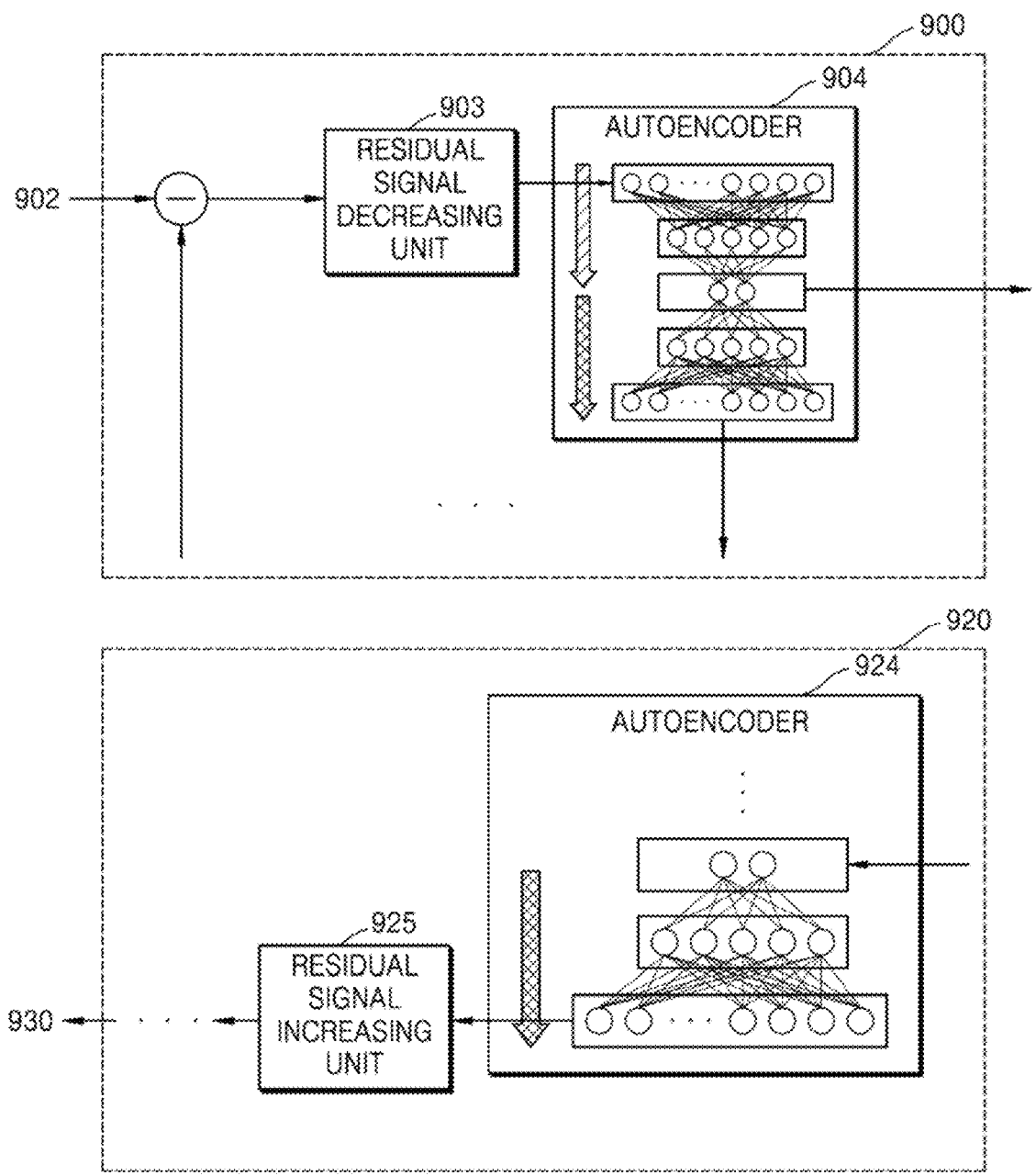
FIG. 9 is a diagram for describing a characteristic of a residual signal, the characteristic being increasable or decreasable by an encoder or a decoder, according to an embodiment.

FIG. 9 is a diagram for describing a characteristic of a residual signal, the characteristic being increasable or decreasable by an encoder 900 or a decoder 920, according to an embodiment.

According to an embodiment, the encoder 900 may include a residual signal decreasing unit 903 capable of decreasing a resolution of a residual signal corresponding to a difference between an original signal 902 and a prediction signal obtained by performing prediction, and an autoencoder 904 capable of compressing or decompressing the residual signal of which resolution is decreased by the residual signal decreasing unit 903.

According to an embodiment, the decoder 920 may include an autoencoder 924 capable of obtaining a decompressed residual signal by performing decompression on a residual signal obtained from a bitstream, and a residual signal increasing unit 925 capable of increasing a resolution of a residual signal output from the autoencoder 924.

According to an embodiment, the residual signal decreasing unit 903 may increase efficiency of the autoencoder 904 by decreasing a resolution of a residual signal to be input to the autoencoder 904. The efficiency of the autoencoder 904 may be increased by efficiently decreasing an amount of information input to the autoencoder 904. According to an embodiment, the residual signal decreasing unit 903 may decrease the resolution of the residual signal by performing a down-sampling process using a DNN. The residual signal increasing unit 925 may increase a resolution of a residual signal output from the autoencoder 924, and thus may restore the resolution of the residual signal which is decreased in an encoding process. According to an embodiment, the residual signal increasing unit 925 may increase the resolution of the residual signal by performing an up-sampling process using a DNN.

According to an embodiment, the DNNs used by the residual signal decreasing unit 903 and the residual signal increasing unit 925 may have architecture of a network trained by sharing information generated in a process of performing down-sampling and up-sampling.

According to an embodiment, the DNN for down-sampling which is used by the residual signal decreasing unit 903 may be trained in a manner that a sum of at least one piece of loss information indicating loss occurring due to down-sampling may be minimized. Furthermore, some of the at least one piece of loss information may be determined based on a result of comparison between a reconstructed image and an original image before down-sampling is performed thereto, the reconstructed image is obtained in a manner that a compressed image is decoded and then up-sampling is performed thereon. The result of comparison may be used in a process of training the DNN for up-sampling.

According to an embodiment, the DNN for up-sampling which is used by the residual signal increasing unit 925 may be trained in a manner that a sum of at least one piece of loss information determined by comparing an image reconstructed by performing up-sampling on a decoded compressed image with an original image before down-sampling is performed thereon may be minimized. Furthermore, some of the at least one piece of loss information may be used in a process of training the DNN for down-sampling.

According to an embodiment, the various embodiments described above as a process that can be performed by the decoder 160 may be performed based on various data units being usable in an image decoding process. According to an embodiment, the decoder 160 may perform the image decoding process by using various data units including a video, a sequence, a frame, a slice, a slice segment, a largest coding unit, a coding unit, a prediction unit, a transform unit, a processing unit, or the like. According to an embodiment, the decoder 160 may perform a post-processing process on each frame. According to an embodiment, the decoder 160 may perform a decompression process using an autoencoder, based on a coding unit, a prediction unit, or a transform unit. The decoder 160 may obtain, from a bitstream, compression information for each slice, the compression information being used when an image is compressed according to at least one degree of compression determined based on the subjective quality. According to an embodiment, the decoder 160 may perform, on each coding unit, a process of changing a resolution of a residual signal output from the autoencoder. However, it should not be interpreted that data units used by the decoder 160 to perform a preset process are limited to the aforementioned embodiments, and should be interpreted that various data units can be used to the extent that one of ordinary skill in the art can use.

Characteristics of various data units that are usable by the image decoding apparatus 150 will be described below with reference to FIGS. 10 to 23.

According to an embodiment, the deep convolutional neural network and the autoencoder may be implemented as a software module. When the deep convolutional neural network and the autoencoder are implemented as a software module (for example, a program module including instructions), the deep convolutional neural network and the autoencoder may be stored in a computer-readable recording medium.

Also, the deep convolutional neural network and the autoencoder may be a part of the encoder 110 or the decoder 160 described above by being integrated as a hardware chip. For example, the deep convolutional neural network and the autoencoder may be manufactured as an exclusive hardware chip for artificial intelligence (AI), or may be manufactured as a part of an existing general-purpose processor (for example, central processing unit (CPU) or application processor (AP)) or a graphic-exclusive processor (for example GPU).

Also, the deep convolutional neural network and the autoencoder may be provided as downloadable software. A computer program product may include a product (for example, a downloadable application) as a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

Hereinafter, with reference to FIGS. 10 through 23, a method of determining a data unit of an image according to an embodiment will be described.

Figure 10:
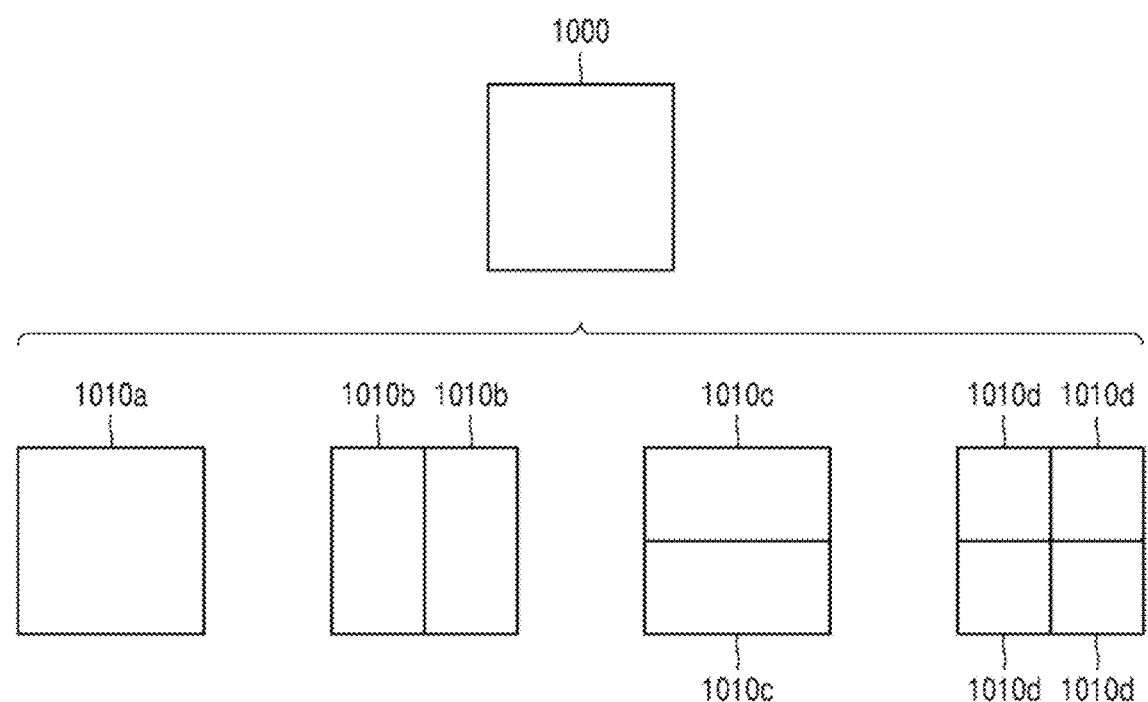
FIG. 10 illustrates a process of determining at least one coding unit by splitting a current coding unit, according to an embodiment.

FIG. 10 illustrates a process, performed by the image decoding apparatus 150, of determining at least one coding unit by splitting a current coding unit, according to an embodiment.

According to an embodiment, the image decoding apparatus 150 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 150.

According to an embodiment, the image decoding apparatus 150 may use the block shape information indicating that the current coding unit has a square shape. For example, the image decoding apparatus 150 may determine whether not to split a square coding unit, whether to vertically split the square coding unit, whether to horizontally split the square coding unit, or whether to split the square coding unit into four coding units, based on the split shape information. Referring to FIG. 10, when the block shape information of a current coding unit 1000 indicates a square shape, a decoder 1030 may determine that a coding unit 1010a having the same size as the current coding unit 1000 is not split, based on the split shape information indicating not to perform splitting, or may determine coding units 1010b, 1010c, or 1010d split based on the split shape information indicating a preset splitting method.

Referring to FIG. 10, according to an embodiment, the image decoding apparatus 150 may determine two coding units 1010b obtained by splitting the current coding unit 1000 in a vertical direction, based on the split shape information indicating to perform splitting in a vertical direction. The image decoding apparatus 150 may determine two coding units 1010c obtained by splitting the current coding unit 1000 in a horizontal direction, based on the split shape information indicating to perform splitting in a horizontal direction. The image decoding apparatus 150 may determine four coding units 1010d obtained by splitting the current coding unit 1000 in vertical and horizontal directions, based on the split shape information indicating to perform splitting in vertical and horizontal directions. However, splitting methods of the square coding unit are not limited to the above-described methods, and the split shape information may indicate various methods. Preset splitting methods of splitting the square coding unit will be described in detail below in relation to various embodiments.

FIG. 11 illustrates a process, performed by the image decoding apparatus 150, of determining at least one coding unit by splitting a non-square coding unit, according to an embodiment.

According to an embodiment, the image decoding apparatus 150 may use block shape information indicating that a current coding unit has a non-square shape. The image decoding apparatus 150 may determine whether not to split the non-square current coding unit or whether to split the non-square current coding unit by using a preset splitting method, based on split shape information. Referring to FIG. 11, when the block shape information of a current coding unit 1100 or 1150 indicates a non-square shape, the image decoding apparatus 150 may determine that a coding unit 1110 or 1160 having the same size as the current coding unit 1100 or 1150 is not split, based on the split shape information indicating not to perform splitting, or determine coding units 1120a and 1120b, 1130a to 1130c, 1170a and 1170b, or 1180a to 1180c split based on the split shape information indicating a preset splitting method. Preset splitting methods of splitting a non-square coding unit will be described in detail below in relation to various embodiments.

According to an embodiment, the image decoding apparatus 150 may determine a splitting method of a coding unit by using the split shape information and, in this case, the split shape information may indicate the number of one or more coding units generated by splitting a coding unit. Referring to FIG. 11, when the split shape information indicates to split the current coding unit 1100 or 1150 into two coding units, the image decoding apparatus 150 may determine two coding units 1120a and 1120b, or 1170a and 1170b included in the current coding unit 1100 or 1150, by splitting the current coding unit 1100 or 1150 based on the split shape information.

According to an embodiment, when the image decoding apparatus 150 splits the non-square current coding unit 1100 or 1150 based on the split shape information, the location of a long side of the non-square current coding unit 1100 or 1150 may be considered. For example, the image decoding apparatus 150 may determine a plurality of coding units by dividing a long side of the current coding unit 1100 or 1150, in consideration of the shape of the current coding unit 1100 or 1150.

According to an embodiment, when the split shape information indicates to split a coding unit into an odd number of blocks, the image decoding apparatus 150 may determine an odd number of coding units included in the current coding unit 1100 or 1150. For example, when the split shape information indicates to split the current coding unit 1100 or 1150 into three coding units, the image decoding apparatus 150 may split the current coding unit 1100 or 1150 into three coding units 1130a, 1130b, and 1130c, or 1180a, 1180b, and 1180c. According to an embodiment, the image decoding apparatus 150 may determine an odd number of coding units included in the current coding unit 1100 or 1150, and not all the determined coding units may have the same size. For example, a preset coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. That is, coding units which may be determined by splitting the current coding unit 1100 or 1150 may have multiple sizes and, in some cases, all of the odd number of coding units 1130a, 1130b, and 1130c, or 1180a, 1180b, and 1180c may have different sizes.

According to an embodiment, when the split shape information indicates to split a coding unit into an odd number of blocks, the image decoding apparatus 150 may determine an odd number of coding units included in the current coding unit 1100 or 1150, and may put a preset restriction on at least one coding unit from among the odd number of coding units generated by splitting the current coding unit 1100 or 1150. Referring to FIG. 11, the image decoding apparatus 150 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by splitting the current coding unit 1100 or 1150. For example, the image decoding apparatus 150 may restrict the coding unit 1130b or 1180b at the center location to be no longer split or to be split only a preset number of times, unlike the other coding units 1130a and 1130c, or 1180a and 1180c.

Figure 12:
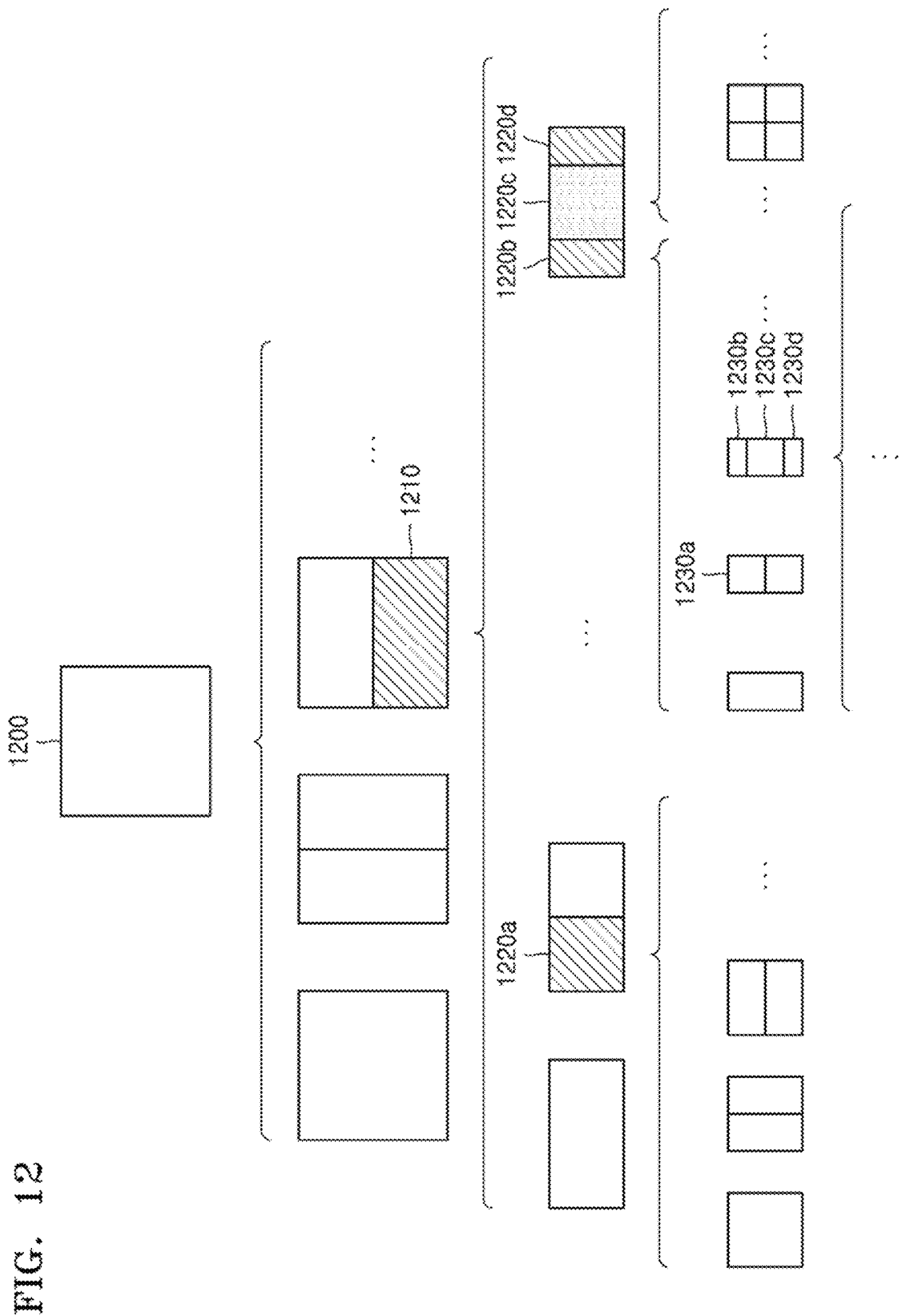
FIG. 12 illustrates a process of splitting a coding unit based on at least one of block shape information and split shape information, according to an embodiment.

FIG. 12 illustrates a process, performed by the image decoding apparatus 150, of splitting a coding unit based on at least one of block shape information and split shape information, according to an embodiment.

According to an embodiment, the image decoding apparatus 150 may determine to split or not to split a square first coding unit 1200 into coding units, based on at least one of the block shape information and the split shape information. According to an embodiment, when the split shape information indicates to split the first coding unit 1200 in a horizontal direction, the image decoding apparatus 150 may determine a second coding unit 1210 by splitting the first coding unit 1200 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 150 may determine to split or not to split the determined second coding unit 1210 into coding units, based on at least one of the block shape information and the split shape information. Referring to FIG. 12, the image decoding apparatus 150 may or may not split the non-square second coding unit 1210, which is determined by splitting the first coding unit 1200, into one or more third coding units 1220a, or 1220b, 1220c, and 1220d based on at least one of the block shape information and the split shape information. The image decoding apparatus 150 may obtain at least one of the block shape information and the split shape information, and determine a plurality of various-shaped second coding units (e.g., 1210) by splitting the first coding unit 1200, based on the obtained at least one of the block shape information and the split shape information, and the second coding unit 1210 may be split by using the splitting method of the first coding unit 1200, based on at least one of the block shape information and the split shape information. According to an embodiment, when the first coding unit 1200 is split into the second coding units 1210 based on at least one of the block shape information and the split shape information of the first coding unit 1200, the second coding unit 1210 may also be split into the third coding units 1220a, or 1220b, 1220c, and 1220d based on at least one of the block shape information and the split shape information of the second coding unit 1210. That is, a coding unit may be recursively split based on at least one of the block shape information and the split shape information of each coding unit. Therefore, a square coding unit may be determined by splitting a non-square coding unit, and a non-square coding unit may be determined by recursively splitting the square coding unit. Referring to FIG. 12, a preset coding unit from among an odd number of third coding units 1220b, 1220c, and 1220d determined by splitting the non-square second coding unit 1210 (e.g., a coding unit at a center location or a square coding unit) may be recursively split. According to an embodiment, the square third coding unit 1220c from among the odd number of third coding units 1220b, 1220c, and 1220d may be split in a horizontal direction into a plurality of fourth coding units. A non-square fourth coding unit 1240 from among the plurality of fourth coding units may be split into a plurality of coding units. For example, the non-square fourth coding unit 1240 may be split into an odd number of coding units 1250a, 1250b, and 1250c.

A method that may be used to recursively split a coding unit will be described below in relation to various embodiments.

According to an embodiment, the image decoding apparatus 150 may determine to split each of the third coding units 1220a, or 1220b, 1220c, and 1220d into coding units or not to split the second coding unit 1210, based on at least one of the block shape information and the split shape information. According to an embodiment, the image decoding apparatus 150 may split the non-square second coding unit 1210 into the odd number of third coding units 1220b, 1220c, and 1220d. The image decoding apparatus 150 may put a preset restriction on a preset third coding unit from among the odd number of third coding units 1220b, 1220c, and 1220d. For example, the image decoding apparatus 150 may restrict the third coding unit 1220c at a center location from among the odd number of third coding units 1220b, 1220c, and 1220d to be no longer split or to be split a settable number of times. Referring to FIG. 12, the image decoding apparatus 150 may restrict the third coding unit 1220c, which is at the center location from among the odd number of third coding units 1220b, 1220c, and 1220d included in the non-square second coding unit 1210, to be no longer split, to be split by using a preset splitting method (e.g., split into only four coding units or split by using a splitting method of the second coding unit 1210), or to be split only a preset number of times (e.g., split only n times (where n>0)). However, the restrictions on the third coding unit 1220c at the center location are not limited to the above-described examples, and may include various restrictions for decoding the third coding unit 1220c at the center location differently from the other third coding units 1220b and 1220d.

According to an embodiment, the image decoding apparatus 150 may obtain at least one of the block shape information and the split shape information, which is used to split a current coding unit, from a preset location in the current coding unit.

Figure 13:
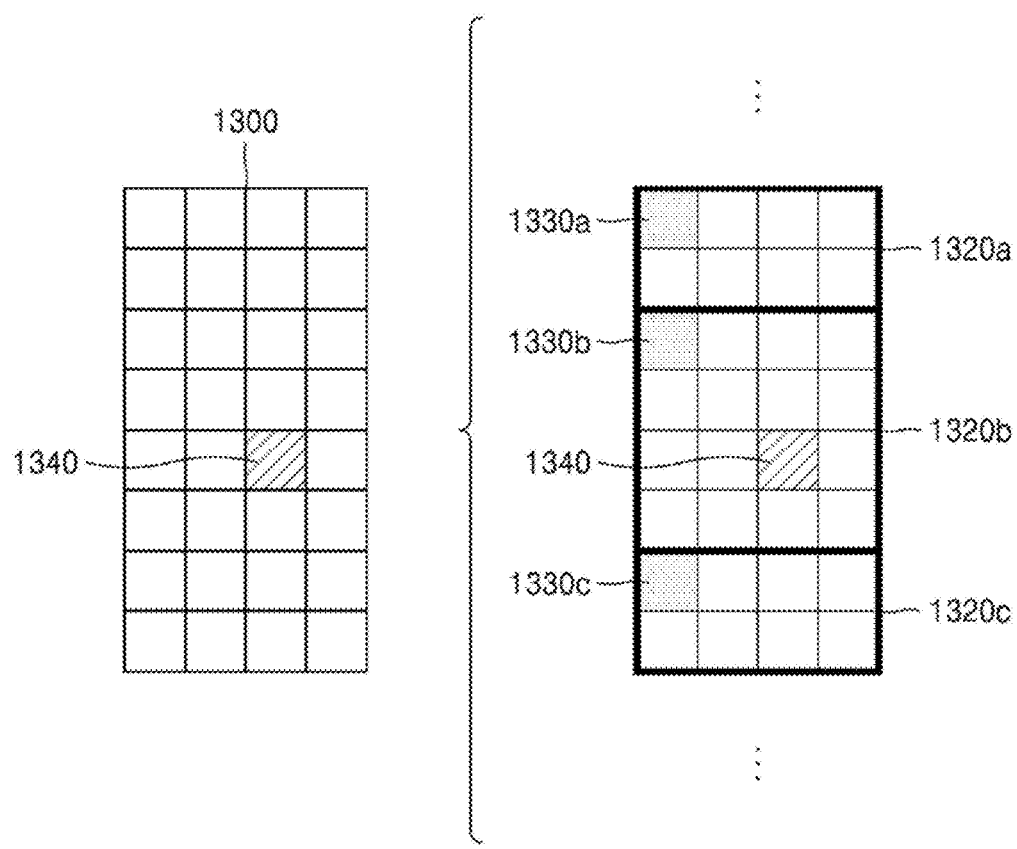
FIG. 13 illustrates a method of determining a predetermined coding unit from among an odd number of coding units, according to an embodiment.

FIG. 13 illustrates a method, performed by the image decoding apparatus 150, of determining a preset coding unit from among an odd number of coding units, according to an embodiment. Referring to FIG. 13, at least one of block shape information and split shape information of a current coding unit 1300 may be obtained from a sample of a preset location from among a plurality of samples included in the current coding unit 1300 (e.g., a sample 1340 of a center location). However, the preset location in the current coding unit 1300, from which at least one of the block shape information and the split shape information may be obtained, is not limited to the center location in FIG. 13, and may include various locations included in the current coding unit 1300 (e.g., top, bottom, left, right, top left, bottom left, top right, and bottom right locations). The image decoding apparatus 150 may obtain at least one of the block shape information and the split shape information from the preset location and determine to split or not to split the current coding unit into various-shaped and various-sized coding units.

According to an embodiment, when the current coding unit is split into a preset number of coding units, the image decoding apparatus 150 may select one of the coding units. Various methods may be used to select one of a plurality of coding units, as will be described below in relation to various embodiments.

According to an embodiment, the image decoding apparatus 150 may split the current coding unit into a plurality of coding units, and may determine a coding unit at a preset location.

FIG. 13 illustrates a method, performed by the image decoding apparatus 150, of determining a coding unit of a preset location from among an odd number of coding units, according to an embodiment.

According to an embodiment, the image decoding apparatus 150 may use information indicating locations of the odd number of coding units, to determine a coding unit at a center location from among the odd number of coding units. Referring to FIG. 13, the image decoding apparatus 150 may determine an odd number of coding units 1320a, 1320b, and 1320c by splitting the current coding unit 1300. The image decoding apparatus 150 may determine a coding unit 1320b at a center location by using information about locations of the odd number of coding units 1320a to 1320c. For example, the image decoding apparatus 150 may determine the coding unit 1320b of the center location by determining the locations of the coding units 1320a, 1320b, and 1320c based on information indicating locations of preset samples included in the coding units 1320a, 1320b, and 1320c. In detail, the image decoding apparatus 150 may determine the coding unit 1320b at the center location by determining the locations of the coding units 1320a, 1320b, and 1320c based on information indicating locations of top left samples 1330a, 1330b, and 1330c of the coding units 1320a, 1320b, and 1320c.

According to an embodiment, the information indicating the locations of the top left samples 1330a, 1330b, and 1330c, which are included in the coding units 1320a, 1320b, and 1320c, respectively, may include information about locations or coordinates of the coding units 1320a, 1320b, and 1320c in a picture. According to an embodiment, the information indicating the locations of the top left samples 1330a, 1330b, and 1330c, which are included in the coding units 1320a, 1320b, and 1320c, respectively, may include information indicating widths or heights of the coding units 1320*a*, 1320*b*, and 1320*c* included in the current coding unit 1300, and the widths or heights may correspond to information indicating differences between the coordinates of the coding units 1320*a*, 1320*b*, and 1320*c* in the picture. That is, the image decoding apparatus 150 may determine the coding unit 1320*b* at the center location by directly using the information about the locations or coordinates of the coding units 1320*a*, 1320*b*, and 1320*c* in the picture, or by using the information about the widths or heights of the coding units, which correspond to the difference values between the coordinates.

According to an embodiment, information indicating the location of the top left sample 1330*a* of the upper coding unit 1320*a* may include coordinates (xa, ya), information indicating the location of the top left sample 1330*b* of the middle coding unit 1320*b* may include coordinates (xb, yb), and information indicating the location of the top left sample 1330*c* of the lower coding unit 1320*c* may include coordinates (xc, yc). The image decoding apparatus 150 may determine the middle coding unit 1320*b* by using the coordinates of the top left samples 1330*a*, 1330*b*, and 1330*c* which are included in the coding units 1320*a*, 1320*b*, and 1320*c*, respectively. For example, when the coordinates of the top left samples 1330*a*, 1330*b*, and 1330*c* are sorted in an ascending or descending order, the coding unit 1320*b* including the coordinates (xb, yb) of the sample 1330*b* at a center location may be determined as a coding unit at a center location from among the coding units 1320*a*, 1320*b*, and 1320*c* determined by splitting the current coding unit 1300. However, the coordinates indicating the locations of the top left samples 1330*a*, 1330*b*, and 1330*c* may include coordinates indicating absolute locations in the picture, or may use coordinates (dxb, dyb) indicating a relative location of the top left sample 1330*b* of the middle coding unit 1320*b* and coordinates (dxc, dyc) indicating a relative location of the top left sample 1330*c* of the lower coding unit 1320*c* with reference to the location of the top left sample 1330*a* of the upper coding unit 1320*a*. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 150 may split the current coding unit 1300 into a plurality of coding units 1320*a*, 1320*b*, and 1320*c*, and may select one of the coding units 1320*a*, 1320*b*, and 1320*c* based on a preset criterion. For example, the image decoding apparatus 150 may select the coding unit 1320*b*, which has a size different from that of the others, from among the coding units 1320*a*, 1320*b*, and 1320*c*.

According to an embodiment, the image decoding apparatus 150 may determine the widths or heights of the coding units 1320*a*, 1320*b*, and 1320*c* by using the coordinates (xa, ya) indicating the location of the top left sample 1330*a* of the upper coding unit 1320*a*, the coordinates (xb, yb) indicating the location of the top left sample 1330*b* of the middle coding unit 1320*b*, and the coordinates (xc, yc) indicating the location of the top left sample 1330*c* of the lower coding unit 1320*c*. The image decoding apparatus 150 may determine the respective sizes of the coding units 1320*a*, 1320*b*, and 1320*c* by using the coordinates (xa, ya), (xb, yb), and (xc, yc) indicating the locations of the coding units 1320*a*, 1320*b*, and 1320*c*.

According to an embodiment, the image decoding apparatus 150 may determine the width of the upper coding unit 1320*a* to be xb-xa and determine the height thereof to be yb-ya. According to an embodiment, the image decoding apparatus 150 may determine the width of the middle coding unit 1320*b* to be xc-xb and determine the height thereof to be yc-yb. According to an embodiment, the image decoding apparatus 150 may determine the width or height of the lower coding unit 1320*c* by using the width or height of the current coding unit 1300 or the widths or heights of the upper and middle coding units 1320*a* and 1320*b*. The image decoding apparatus 150 may determine a coding unit, which has a size different from that of the others, based on the determined widths and heights of the coding units 1320*a* to 1320*c*. Referring to FIG. 13, the image decoding apparatus 150 may determine the middle coding unit 1320*b*, which has a size different from the size of the upper and lower coding units 1320*a* and 1320*c*, as the coding unit of the preset location. However, the above-described method, performed by the image decoding apparatus 150, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described top left locations, and information about arbitrary locations of samples included in the coding units may be used.

According to an embodiment, the image decoding apparatus 150 may select a coding unit at a preset location from among an odd number of coding units determined by splitting the current coding unit, considering the shape of the current coding unit. For example, when the current coding unit has a non-square shape, a width of which is longer than a height, the image decoding apparatus 150 may determine the coding unit at the preset location in a horizontal direction. That is, the image decoding apparatus 150 may determine one of coding units at different locations in a horizontal direction and put a restriction on the coding unit. When the current coding unit has a non-square shape, a height of which is longer than a width, the image decoding apparatus 150 may determine the coding unit at the preset location in a vertical direction. That is, the image decoding apparatus 150 may determine one of coding units at different locations in a vertical direction and may put a restriction on the coding unit.

According to an embodiment, the image decoding apparatus 150 may use information indicating respective locations of an even number of coding units, to determine the coding unit at the preset location from among the even number of coding units. The image decoding apparatus 150 may determine an even number of coding units by splitting the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 13, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 13, the image decoding apparatus 150 may split the current coding unit 1300 into a plurality of coding units 1320*a*, 1320*b*, and 1320*c* based on at least one of the block shape information and the split shape information, and may determine a coding unit 1320*b* at a center location from among the plurality of the coding units 1320*a*, 1320*b*, and 1320*c*. Furthermore, the image decoding apparatus 150 may determine the coding unit 1320*b* at the center location, in consideration of a location from which at least one of the block shape information and the split shape information is obtained. That is, at least one of the block shape information and the split shape information of the current coding unit 1300 may be obtained from the sample 1340 at a center location of the current coding unit 1300 and, when the current coding unit 1300 is split into the plurality of coding units 1320*a*, 1320*b*, and 1320*c* based on at least one of the block shape information and the split shape information, the coding unit 1320*b* including the sample 1340 may be determined as the coding unit at the center location. However, information used to determine the coding unit at the center location is not limited to at least one of the block shape information and the split shape information, and various types of information may be used to determine the coding unit at the center location.

According to an embodiment, preset information for identifying the coding unit at the preset location may be obtained from a preset sample included in a coding unit to be determined. Referring to FIG. 13, the image decoding apparatus 150 may use at least one of the block shape information and the split shape information, which is obtained from a sample at a preset location in the current coding unit 1300 (e.g., a sample at a center location of the current coding unit 1300) to determine a coding unit at a preset location from among the plurality of the coding units 1320*a*, 1320*b*, and 1320*c* determined by splitting the current coding unit 1300 (e.g., a coding unit at a center location from among a plurality of split coding units). That is, the image decoding apparatus 150 may determine the sample at the preset location by considering a block shape of the current coding unit 1300, determine the coding unit 1320*b* including a sample, from which preset information (e.g., at least one of the block shape information and the split shape information) may be obtained, from among the plurality of coding units 1320*a*, 1320*b*, and 1320*c* determined by splitting the current coding unit 1300, and may put a preset restriction on the coding unit 1320*b*. Referring to FIG. 13, according to an embodiment, the image decoding apparatus 150 may determine the sample 1340 at the center location of the current coding unit 1300 as the sample from which the preset information may be obtained, and may put a preset restriction on the coding unit 1320*b* including the sample 1340, in a decoding operation. However, the location of the sample from which the preset information may be obtained is not limited to the above-described location, and may include arbitrary locations of samples included in the coding unit 1320*b* to be determined for a restriction.

According to an embodiment, the location of the sample from which the preset information may be obtained may be determined based on the shape of the current coding unit 1300. According to an embodiment, the block shape information may indicate whether the current coding unit has a square or non-square shape, and the location of the sample from which the preset information may be obtained may be determined based on the shape. For example, the image decoding apparatus 150 may determine a sample located on a boundary for dividing at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 150 may determine one of samples adjacent to a boundary for dividing a long side of the current coding unit in half, as the sample from which the preset information may be obtained.

According to an embodiment, when the current coding unit is split into a plurality of coding units, the image decoding apparatus 150 may use at least one of the block shape information and the split shape information to determine a coding unit at a preset location from among the plurality of coding units. According to an embodiment, the image decoding apparatus 150 may obtain at least one of the block shape information and the split shape information from a sample at a preset location in a coding unit, and split the plurality of coding units, which are generated by splitting the current coding unit, by using at least one of the split shape information and the block shape information, which is obtained from the sample of the preset location in each of the plurality of coding units. That is, a coding unit may be recursively split based on at least one of the block shape information and the split shape information, which is obtained from the sample at the preset location in each coding unit. An operation of recursively splitting a coding unit has been described above in relation to FIG. 12, and thus detailed descriptions thereof will not be provided here.

According to an embodiment, the image decoding apparatus 150 may determine one or more coding units by splitting the current coding unit, and may determine an order of decoding the one or more coding units, based on a preset block (e.g., the current coding unit).

Figure 14:
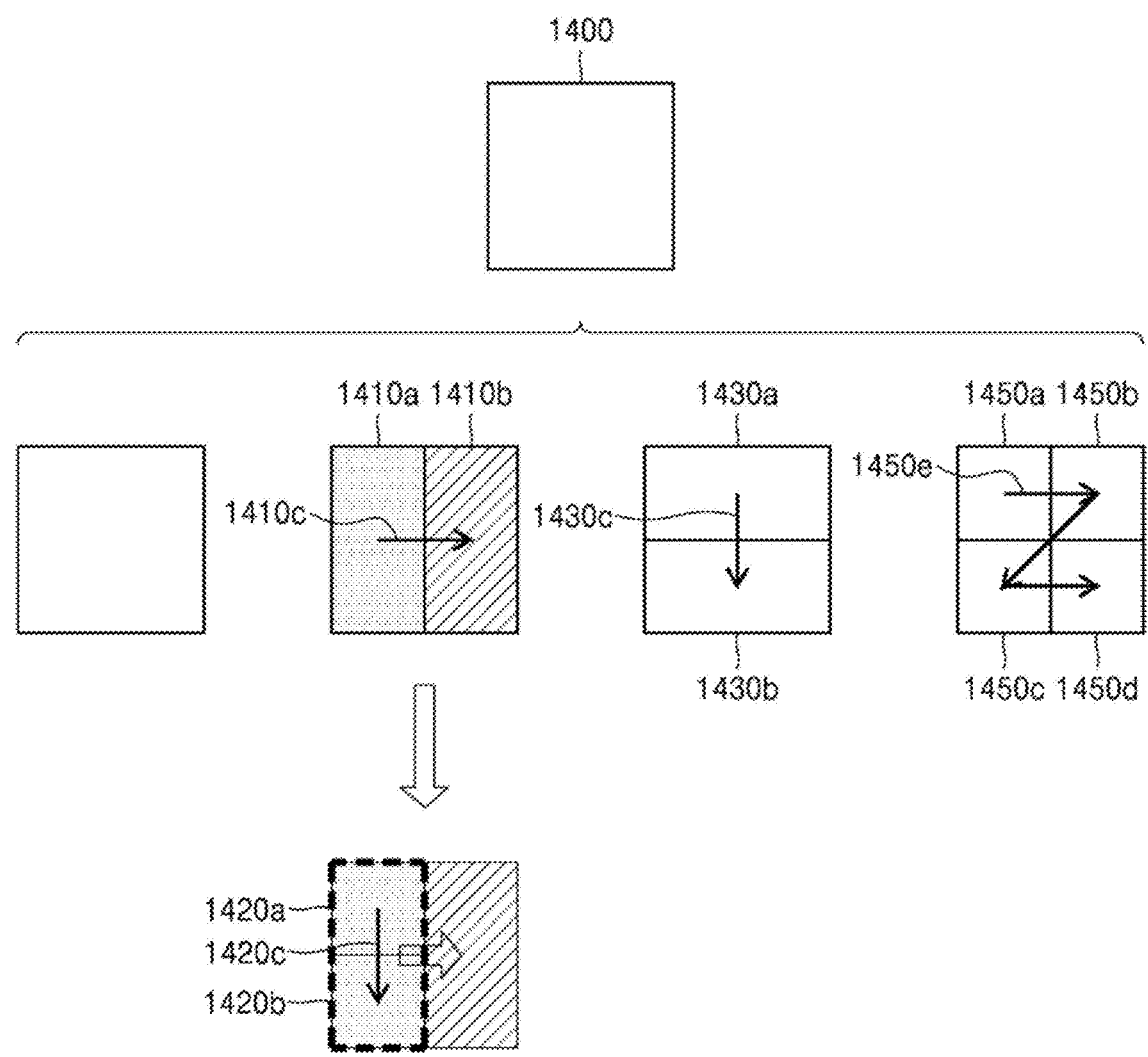
FIG. 14 illustrates an order of processing a plurality of coding units when the plurality of coding units are determined by splitting a current coding unit, according to an embodiment.

FIG. 14 illustrates an order of processing a plurality of coding units when the image decoding apparatus 150 determines the plurality of coding units by splitting a current coding unit, according to an embodiment.

According to an embodiment, the image decoding apparatus 150 may determine second coding units 1410*a* and 1410*b* by splitting a first coding unit 1400 in a vertical direction, determine second coding units 1430*a* and 1430*b* by splitting the first coding unit 1400 in a horizontal direction, or determine second coding units 1450*a* to 1450*d* by splitting the first coding unit 1400 in vertical and horizontal directions, based on block shape information and split shape information.

Referring to FIG. 14, the image decoding apparatus 150 may determine to process the second coding units 1410*a* and 1410*b*, which are determined by splitting the first coding unit 1400 in a vertical direction, in a horizontal direction order 1410*c*. The image decoding apparatus 150 may determine to process the second coding units 1430*a* and 1430*b*, which are determined by splitting the first coding unit 1400 in a horizontal direction, in a vertical direction order 1430*c*. The image decoding apparatus 150 may determine to process the second coding units 1450*a* to 1450*d*, which are determined by splitting the first coding unit 1400 in vertical and horizontal directions, in a preset order for processing coding units in a row and then processing coding units in a next row (e.g., in a raster scan order or Z-scan order 1450e).

According to an embodiment, the image decoding apparatus 150 may recursively split coding units. Referring to FIG. 14, the image decoding apparatus 150 may determine a plurality of coding units 1410a, 1410b, 1430a, 1430b, 1450a, 1450b, 1450c, and 1450d by splitting the first coding unit 1400, and may recursively split each of the determined plurality of coding units 1410a, 1410b, 1430a, 1430b, 1450a, 1450b, 1450c, and 1450d. A splitting method of the plurality of coding units 1410a, 1410b, 1430a, 1430b, 1450a, 1450b, 1450c, and 1450d may correspond to a splitting method of the first coding unit 1400. As such, each of the plurality of coding units 1410a, 1410b, 1430a, 1430b, 1450a, 1450b, 1450c, and 1450d may be independently split into a plurality of coding units. Referring to FIG. 14, the image decoding apparatus 150 may determine the second coding units 1410a and 1410b by splitting the first coding unit 1400 in a vertical direction, and may determine to independently split or not to split each of the second coding units 1410a and 1410b.

According to an embodiment, the image decoding apparatus 150 may determine third coding units 1420a and 1420b by splitting the left second coding unit 1410a in a horizontal direction, and may not split the right second coding unit 1410b.

According to an embodiment, a processing order of coding units may be determined based on an operation of splitting a coding unit. In other words, a processing order of split coding units may be determined based on a processing order of coding units immediately before being split. The image decoding apparatus 150 may determine a processing order of the third coding units 1420a and 1420b determined by splitting the left second coding unit 1410a, independently of the right second coding unit 1410b. Because the third coding units 1420a and 1420b are determined by splitting the left second coding unit 1410a in a horizontal direction, the third coding units 1420a and 1420b may be processed in a vertical direction order 1420c. Because the left and right second coding units 1410a and 1410b are processed in the horizontal direction order 1410c, the right second coding unit 1410b may be processed after the third coding units 1420a and 1420b included in the left second coding unit 1410a are processed in the vertical direction order 1420c. An operation of determining a processing order of coding units based on a coding unit before being split is not limited to the above-described example, and various methods may be used to independently process coding units, which are split and determined to various shapes, in a preset order.

Figure 15:
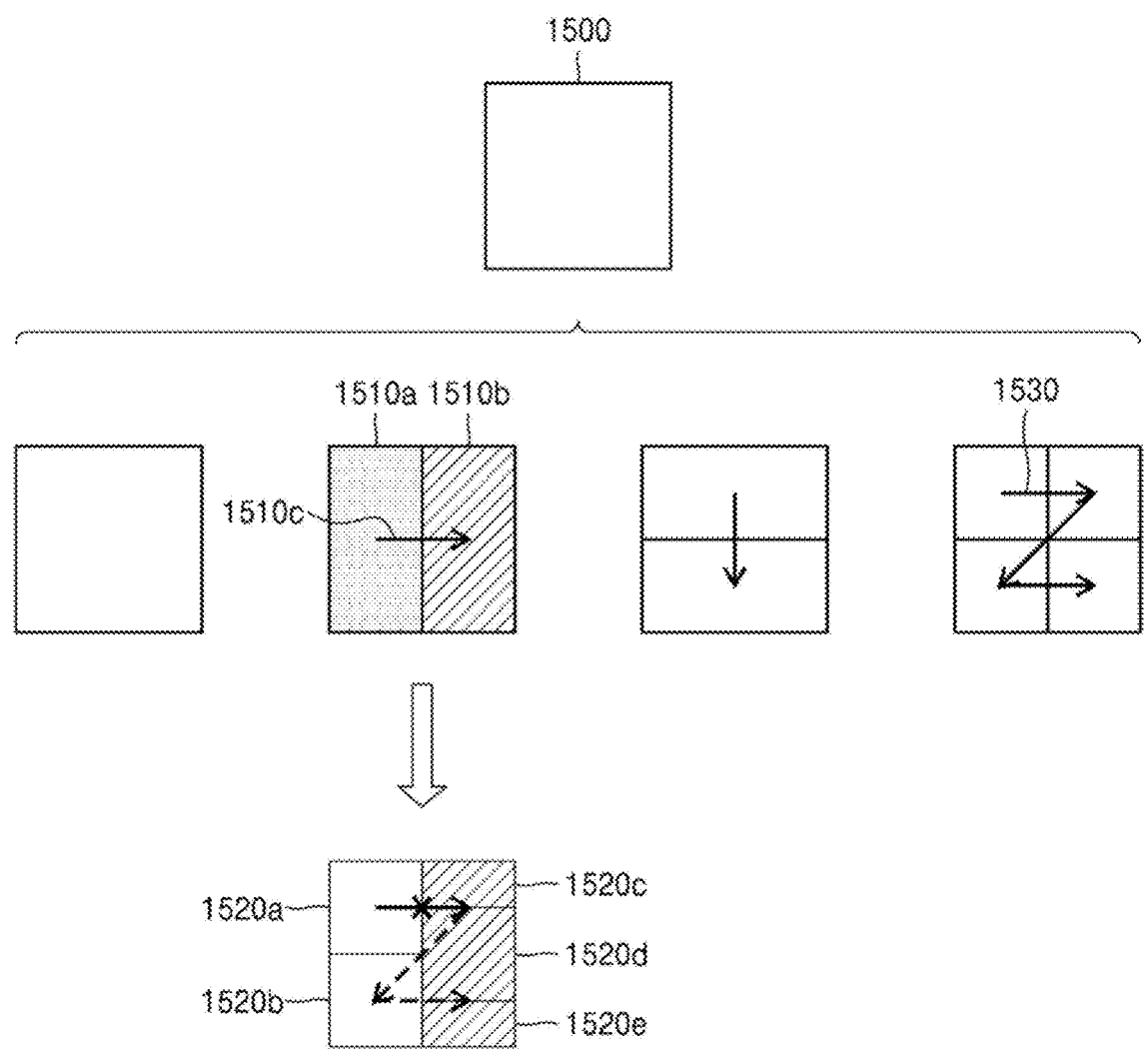
FIG. 15 illustrates a process of determining that a current coding unit is to be split into an odd number of coding units, when the coding units are not processable in a predetermined order, according to an embodiment.

FIG. 15 illustrates a process, performed by the image decoding apparatus 150, of determining that a current coding unit is to be split into an odd number of coding units, when the coding units are not processable in a preset order, according to an embodiment.

According to an embodiment, the image decoding apparatus 150 may determine whether the current coding unit is split into an odd number of coding units, based on obtained block shape information and split shape information. Referring to FIG. 15, a square first coding unit 1500 may be split into non-square second coding units 1510a and 1510b, and the second coding units 1510a and 1510b may be independently split into third coding units 1520a and 1520b, and 1520c to 1520e. According to an embodiment, the image decoding apparatus 150 may determine a plurality of third coding units 1520a and 1520b by splitting the left second coding unit 1510a in a horizontal direction, and may split the right second coding unit 1510b into an odd number of third coding units 1520c to 1520e.

According to an embodiment, the image decoding apparatus 150 may determine whether any coding unit is split into an odd number of coding units, by determining whether the third coding units 1520a and 1520b, and 1520c to 1520e are processable in a preset order. Referring to FIG. 15, the image decoding apparatus 150 may determine the third coding units 1520a and 1520b, and 1520c to 1520e by recursively splitting the first coding unit 1500. The image decoding apparatus 150 may determine whether any of the first coding unit 1500, the second coding units 1510a and 1510b, and the third coding units 1520a and 1520b, and 1520c, 1520d, and 1520e are split into an odd number of coding units, based on at least one of the block shape information and the split shape information. For example, the right second coding unit 1510b may be split into an odd number of third coding units 1520c, 1520d, and 1520e. A processing order of a plurality of coding units included in the first coding unit 1500 may be a preset order (e.g., a Z-scan order 1530), and the image decoding apparatus 150 may decide whether the third coding units 1520c, 1520d, and 1520e, which are determined by splitting the right second coding unit 1510b into an odd number of coding units, satisfy a condition for processing in the preset order.

According to an embodiment, the image decoding apparatus 150 may determine whether the third coding units 1520a and 1520b, and 1520c, 1520d, and 1520e included in the first coding unit 1500 satisfy the condition for processing in the preset order, and the condition relates to whether at least one of a width and height of the second coding units 1510a and 1510b is divided in half along a boundary of the third coding units 1520a and 1520b, and 1520c, 1520d, and 1520e. For example, the third coding units 1520a and 1520b determined by dividing the height of the non-square left second coding unit 1510a in half satisfy the condition. However, because boundaries of the third coding units 1520c, 1520d, and 1520e determined by splitting the right second coding unit 1510b into three coding units do not divide the width or height of the right second coding unit 1510b in half, it may be determined that the third coding units 1520c, 1520d, and 1520e do not satisfy the condition. When the condition is not satisfied as described above, the image decoding apparatus 150 may decide disconnection of a scan order, and determine that the right second coding unit 1510b is split into an odd number of coding units, based on a result of the decision. According to an embodiment, when a coding unit is split into an odd number of coding units, the image decoding apparatus 150 may put a preset restriction on a coding unit at a preset location among the split coding units. The restriction or the preset location has been described above in relation to various embodiments, and thus detailed descriptions thereof will not be provided here.

Figure 16:
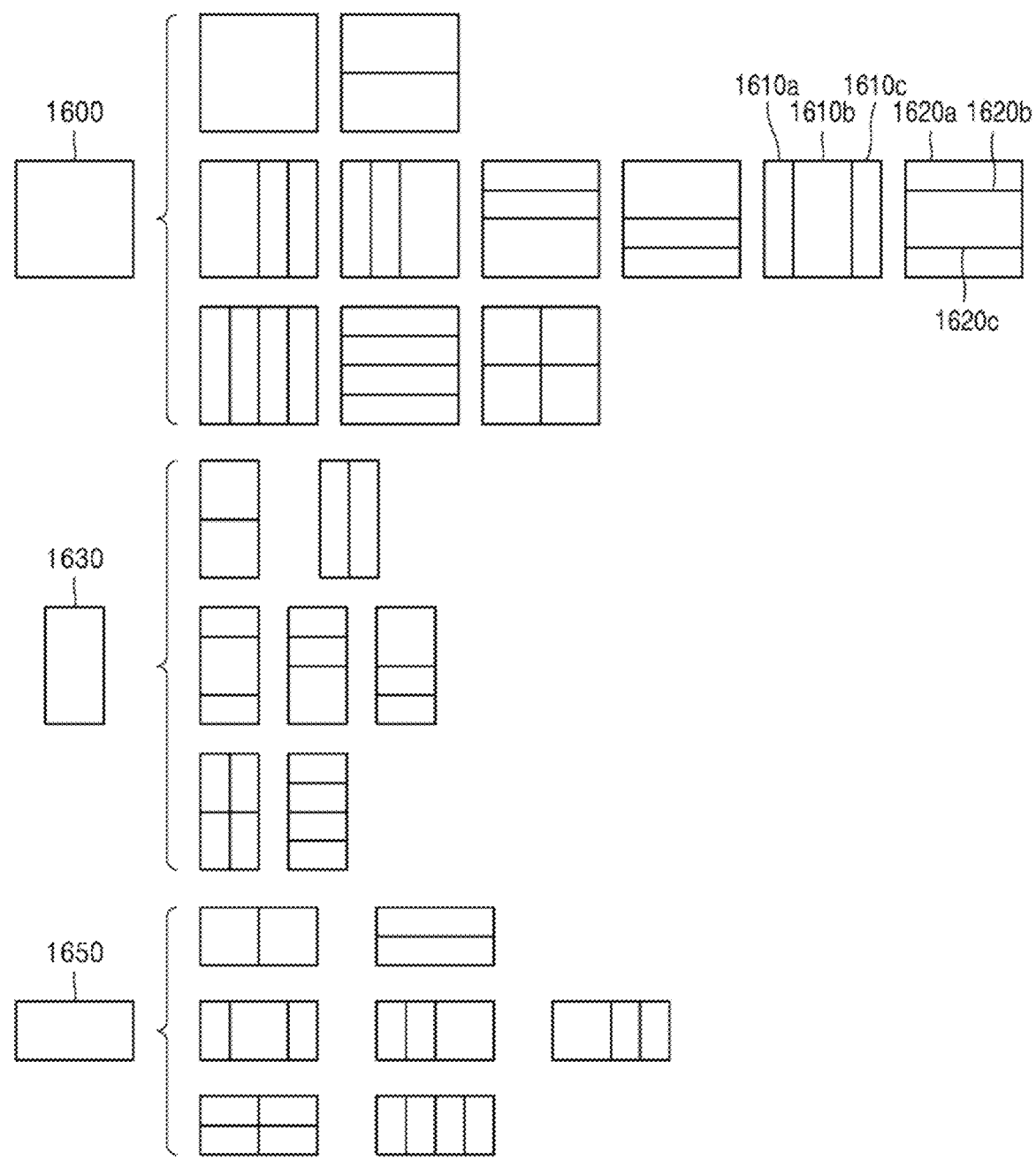
FIG. 16 illustrates a process of determining at least one coding unit by splitting a first coding unit, according to an embodiment.

FIG. 16 illustrates a process, performed by the image decoding apparatus 150, of determining at least one coding unit by splitting a first coding unit 1600, according to an embodiment. According to an embodiment, the image decoding apparatus 150 may split the first coding unit 1600, based on at least one of block shape information and split shape information, which is obtained by a receiver 210. The square first coding unit 1600 may be split into four square coding units, or may be split into a plurality of non-square coding units. For example, referring to FIG. 16, when the block shape information indicates that the first coding unit 1600 has a square shape and the split shape information indicates to split the first coding unit 1600 into non-square coding units, the image decoding apparatus 150 may split the first coding unit 1600 into a plurality of non-square coding units. In detail, when the split shape information indicates to determine an odd number of coding units by splitting the first coding unit 1600 in a horizontal direction or a vertical direction, the image decoding apparatus 150 may split the square first coding unit 1600 into an odd number of coding units, e.g., second coding units 1610a, 1610b, and 1610c determined by splitting the square first coding unit 1600 in a vertical direction or second coding units 1620a, 1620b, and 1620c determined by splitting the square first coding unit 1600 in a horizontal direction.

According to an embodiment, the image decoding apparatus 150 may determine whether the second coding units 1610a, 1610b, 1610c, 1620a, 1620b, and 1620c included in the first coding unit 1600 satisfy a condition for processing in a preset order, and the condition relates to whether at least one of a width and height of the first coding unit 1600 is divided in half along a boundary of the second coding units 1610a, 1610b, 1610c, 1620a, 1620b, and 1620c. Referring to FIG. 16, because boundaries of the second coding units 1610a, 1610b, and 1610c determined by splitting the square first coding unit 1600 in a vertical direction do not divide the height of the first coding unit 1600 in half, it may be determined that the first coding unit 1600 does not satisfy the condition for processing in the preset order. In addition, because boundaries of the second coding units 1620a, 1620b, and 1620c determined by splitting the square first coding unit 1600 in a horizontal direction do not divide the width of the first coding unit 1600 in half, it may be determined that the first coding unit 1600 does not satisfy the condition for processing in the preset order. When the condition is not satisfied as described above, the image decoding apparatus 150 may decide disconnection of a scan order, and may determine that the first coding unit 1600 is split into an odd number of coding units, based on a result of the decision. According to an embodiment, when a coding unit is split into an odd number of coding units, the image decoding apparatus 150 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 150 may determine various-shaped coding units by splitting a first coding unit.

Referring to FIG. 16, the image decoding apparatus 150 may split the square first coding unit 1600 or a non-square first coding unit 1630 or 1650 into various-shaped coding units.

Figure 17:
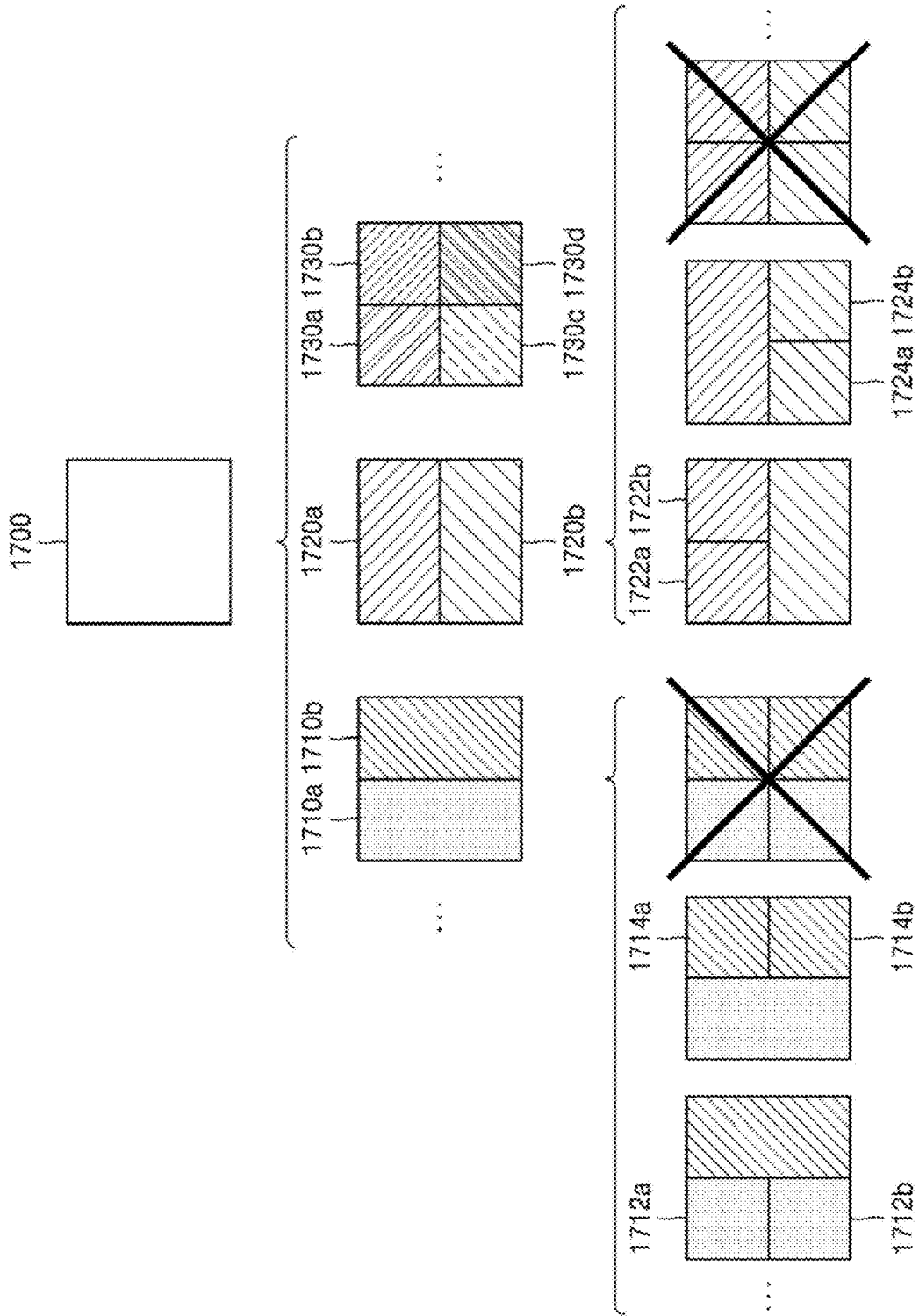
FIG. 17 illustrates that a shape into which a second coding unit is splittable is restricted when the second coding unit having a non-square shape, which is determined by splitting a first coding unit, satisfies a predetermined condition, according to an embodiment.

FIG. 17 illustrates that a shape into which a second coding unit is splittable by the image decoding apparatus 150 is restricted when the second coding unit having a non-square shape, which is determined by splitting a first coding unit 1700, satisfies a preset condition, according to an embodiment.

According to an embodiment, the image decoding apparatus 150 may determine to split the square first coding unit 1700 into non-square second coding units 1710a, 1710b, 1720a, and 1720b, based on at least one of block shape information and split shape information, which is obtained by the receiver 210. The second coding units 1710a, 1710b, 1720a, and 1720b may be independently split. As such, the image decoding apparatus 150 may determine to split or not to split the first coding unit 1700 into a plurality of coding units, based on at least one of the block shape information and the split shape information of each of the second coding units 1710a, 1710b, 1720a, and 1720b. According to an embodiment, the image decoding apparatus 150 may determine third coding units 1712a and 1712b by splitting the non-square left second coding unit 1710a, which is determined by splitting the first coding unit 1700 in a vertical direction, in a horizontal direction. However, when the left second coding unit 1710a is split in a horizontal direction, the image decoding apparatus 150 may restrict the right second coding unit 1710b to not be split in a horizontal direction in which the left second coding unit 1710a is split. When third coding units 1714a and 1714b are determined by splitting the right second coding unit 1710b in a same direction, because the left and right second coding units 1710a and 1710b are independently split in a horizontal direction, the third coding units 1712a, 1712b, 1714a, and 1714b may be determined. However, this case serves equally as a case in which the image decoding apparatus 150 splits the first coding unit 1700 into four square second coding units 1730a, 1730b, 1730c, and 1730d, based on at least one of the block shape information and the split shape information, and may be inefficient in terms of image decoding.

According to an embodiment, the image decoding apparatus 150 may determine third coding units 1722a, 1722b, 1724a, and 1724b by splitting the non-square second coding unit 1720a or 1720b, which is determined by splitting a first coding unit 1700 in a horizontal direction, in a vertical direction. However, when a second coding unit (e.g., the upper second coding unit 1720a) is split in a vertical direction, for the above-described reason, the image decoding apparatus 150 may restrict the other second coding unit (e.g., the lower second coding unit 1720b) to not be split in a vertical direction in which the upper second coding unit 1720a is split.

Figure 18:
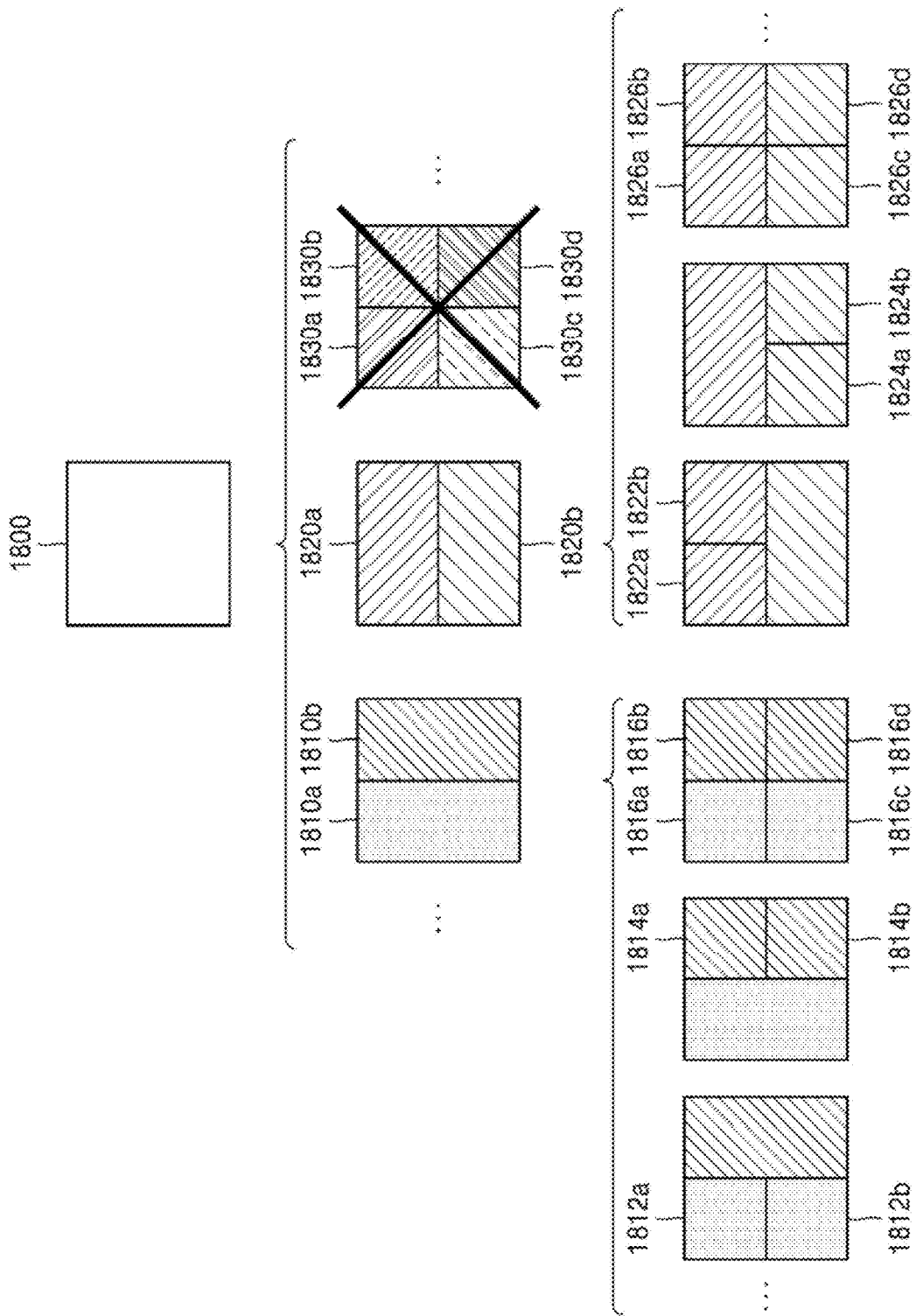
FIG. 18 illustrates a process of splitting a square coding unit when split shape information indicates that the square coding unit is not to be split into four square coding units, according to an embodiment.

FIG. 18 illustrates a process, performed by the image decoding apparatus 150, of splitting a square coding unit when split shape information indicates that the square coding unit is not to be split into four square coding units, according to an embodiment.

According to an embodiment, the image decoding apparatus 150 may determine second coding units 1810a, 1810b, 1820a, 1820b, etc. by splitting a first coding unit 1800, based on at least one of block shape information and split shape information. The split shape information may include information about various methods of splitting a coding unit but, the information about various splitting methods may not include information for splitting a coding unit into four square coding units. According to such split shape information, the image decoding apparatus 150 may not split the first square coding unit 1800 into four square second coding units 1830a, 1830b, 1830c, and 1830d. The image decoding apparatus 150 may determine the non-square second coding units 1810a, 1810b, 1820a, 1820b, etc., based on the split shape information.

According to an embodiment, the image decoding apparatus 150 may independently split the non-square second coding units 1810a, 1810b, 1820a, 1820b, etc. Each of the second coding units 1810a, 1810b, 1820a, 1820b, etc. may be recursively split in a preset order, and this splitting method may correspond to a method of splitting the first coding unit 1800, based on at least one of the block shape information and the split shape information.

For example, the image decoding apparatus 150 may determine square third coding units 1812a and 1812b by splitting the left second coding unit 1810a in a horizontal direction, and may determine square third coding units 1814a and 1814b by splitting the right second coding unit 1810b in a horizontal direction. Furthermore, the image decoding apparatus 150 may determine square third coding units 1816a, 1816b, 1816c, and 1816d by splitting both of the left and right second coding units 1810a and 1810b in a horizontal direction. In this case, coding units having the same shape as the four square second coding units 1830a, 1830b, 1830c, and 1830d split from the first coding unit 1800 may be determined.

As another example, the image decoding apparatus 150 may determine square third coding units 1822a and 1822b by splitting the upper second coding unit 1820a in a vertical direction, and may determine square third coding units 1824a and 1824b by splitting the lower second coding unit 1820b in a vertical direction. Furthermore, the image decoding apparatus 150 may determine square third coding units 1822a, 1822b, 1824a, and 1824b by splitting both of the upper and lower second coding units 1820a and 1820b in a vertical direction. In this case, coding units having the same shape as the four square second coding units 1830a, 1830b, 1830c, and 1830d split from the first coding unit 1800 may be determined.

Figure 19:
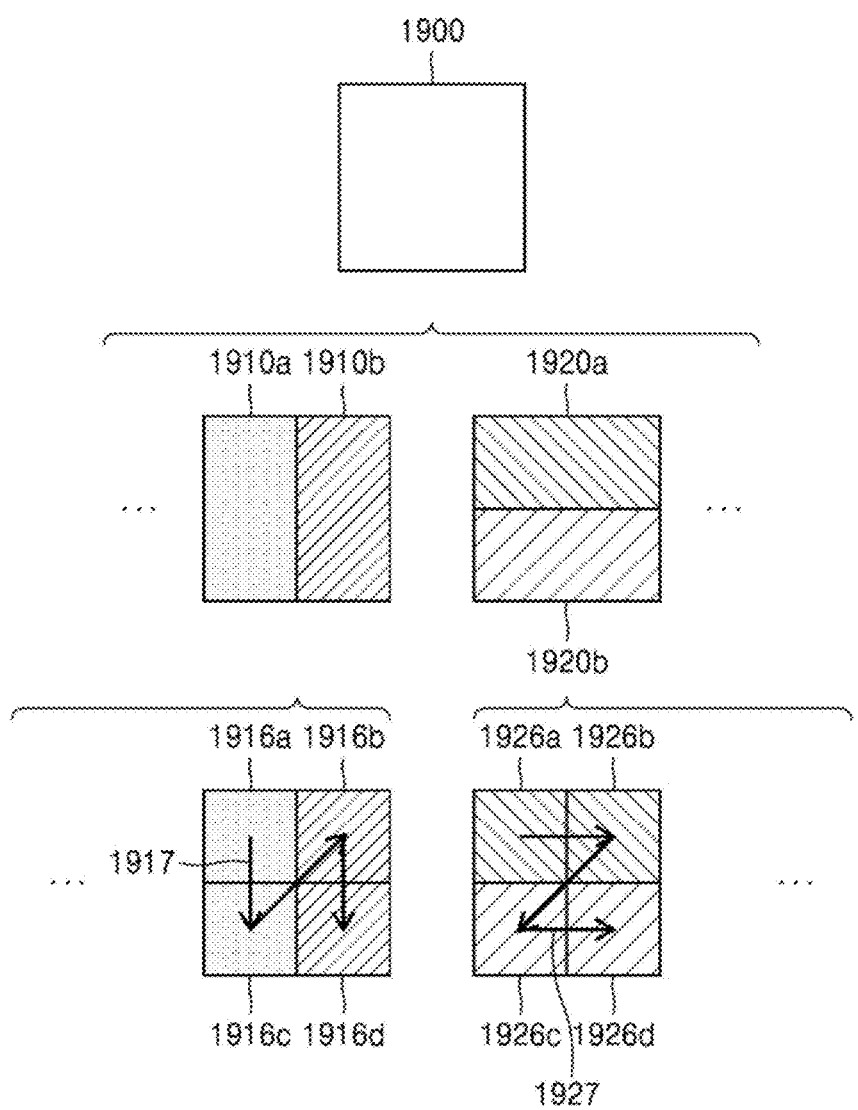
FIG. 19 illustrates that a processing order between a plurality of coding units may be changed depending on a process of splitting a coding unit, according to an embodiment.

FIG. 19 illustrates that a processing order between a plurality of coding units may be changed depending on a process of splitting a coding unit, according to an embodiment.

According to an embodiment, the image decoding apparatus 150 may split a first coding unit 1900, based on block shape information and split shape information. When the block shape information indicates a square shape and the split shape information indicates to split the first coding unit 1900 in at least one of horizontal and vertical directions, the image decoding apparatus 150 may determine second coding units 1910a, 1910b, 1920a, 1920b, 1930a, 1930b, 1930c, and 1930d by splitting the first coding unit 1900. Referring to FIG. 19, the non-square second coding units 1910a, 1910b, 1920a, and 1920b determined by splitting the first coding unit 1900 in only a horizontal direction or vertical direction may be independently split based on the block shape information and the split shape information of each coding unit. For example, the image decoding apparatus 150 may determine third coding units 1916a, 1916b, 1916c, and 1916d by splitting the second coding units 1910a and 1910b, which are generated by splitting the first coding unit 1900 in a vertical direction, in a horizontal direction, and may determine third coding units 1926a, 1926b, 1926c, and 1926d by splitting the second coding units 1920a and 1920b, which are generated by splitting the first coding unit 1900 in a horizontal direction, in a vertical direction. An operation of splitting the second coding units 1910a, 1910b, 1920a, and 1920b has been described above in relation to FIG. 17, and thus detailed descriptions thereof will not be provided herein.

According to an embodiment, the image decoding apparatus 150 may process coding units in a preset order. An operation of processing coding units in a preset order has been described above in relation to FIG. 14, and thus detailed descriptions thereof will not be provided herein. Referring to FIG. 19, the image decoding apparatus 150 may determine four square third coding units 1916a, 1916b, 1916c, and 1916d, and 1926a, 1926b, 1926c, and 1926d by splitting the square first coding unit 1900. According to an embodiment, the image decoding apparatus 150 may determine processing orders of the third coding units 1916a, 1916b, 1916c, and 1916d, and 1926a, 1926b, 1926c, and 1926d based on a splitting method of the first coding unit 1900.

According to an embodiment, the image decoding apparatus 150 may determine the third coding units 1916a, 1916b, 1916c, and 1916d by splitting the second coding units 1910a and 1910b generated by splitting the first coding unit 1900 in a vertical direction, in a horizontal direction, and may process the third coding units 1916a, 1916b, 1916c, and 1916d in a processing order 1917 for initially processing the third coding units 1916a and 1916b, which are included in the left second coding unit 1910a, in a vertical direction and then processing the third coding unit 1916c and 1916d, which are included in the right second coding unit 1910b, in a vertical direction.

According to an embodiment, the image decoding apparatus 150 may determine the third coding units 1926a, 1926b, 1926c, and 1926d by splitting the second coding units 1920a and 1920b generated by splitting the first coding unit 1900 in a horizontal direction, in a vertical direction, and may process the third coding units 1926a, 1926b, 1926c, and 1926d in a processing order 1927 for initially processing the third coding units 1926a and 1926b, which are included in the upper second coding unit 1920a, in a horizontal direction and then processing the third coding unit 1926c and 1926d, which are included in the lower second coding unit 1920b, in a horizontal direction.

Referring to FIG. 19, the square third coding units 1916a, 1916b, 1916c, and 1916d, and 1926a, 1926b, 1926c, and 1926d may be determined by splitting the second coding units 1910a, 1910b, 1920a, and 1920b, respectively. Although the second coding units 1910a and 1910b are determined by splitting the first coding unit 1900 in a vertical direction differently from the second coding units 1920a and 1920b which are determined by splitting the first coding unit 1900 in a horizontal direction, the third coding units 1916a, 1916b, 1916c, and 1916d, and 1926a, 1926b, 1926c, and 1926d split therefrom eventually show same-shaped coding units split from the first coding unit 1900. As such, by recursively splitting a coding unit in different manners based on at least one of the block shape information and the split shape information, the image decoding apparatus 150 may process a plurality of coding units in different orders even when the coding units are eventually determined to be the same shape.

FIG. 20 illustrates a process of determining a depth of a coding unit as a shape and size of the coding unit change, when the coding unit is recursively split such that a plurality of coding units are determined, according to an embodiment.

According to an embodiment, the image decoding apparatus 150 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 150 may determine that a depth of the current coding unit is increased from a depth of the coding unit before being split, by n. In the following description, a coding unit having an increased depth is expressed as a coding unit of a deeper depth.

Referring to FIG. 20, according to an embodiment, the image decoding apparatus 150 may determine a second coding unit 2002 and a third coding unit 2004 of deeper depths by splitting a square first coding unit 2000 based on block shape information indicating a square shape (for example, the block shape information may be expressed as '0: SQUARE'). Assuming that the size of the square first coding unit 2000 is 2N×2N, the second coding unit 2002 determined by dividing a width and height of the first coding unit 2000 to $\frac{1}{2}^1$ may have a size of N×N. Furthermore, the third coding unit 2004 determined by dividing a width and height of the second coding unit 2002 to ½ may have a size of N/2×N/2. In this case, a width and height of the third coding unit 2004 are ½² times those of the first coding unit 2000. When a depth of the first coding unit 2000 is D, a depth of the second coding unit 2002, the width and height of which are ½¹ times those of the first coding unit 2000, may be D+1, and a depth of the third coding unit 2004, the width and height of which are ½² times those of the first coding unit 2000, may be D+2.

According to an embodiment, the image decoding apparatus 150 may determine a second coding unit 2012 or 2022 and a third coding unit 2014 or 2024 of deeper depths by splitting a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 150 may determine a second coding unit 2002, 2012, or 2022 by dividing at least one of a width and height of the first coding unit 2010 having a size of N×2N. That is, the image decoding apparatus 150 may determine the second coding unit 2002 having a size of N×N or the second coding unit 2022 having a size of N×N/2 by splitting the first coding unit 2010 in a horizontal direction, or may determine the second coding unit 2012 having a size of N/2×N by splitting the first coding unit 2010 in horizontal and vertical directions.

According to an embodiment, the image decoding apparatus 150 may determine the second coding unit 2002, 2012, or 2022 by dividing at least one of a width and height of the first coding unit 2020 having a size of 2N×N. That is, the image decoding apparatus 150 may determine the second coding unit 2002 having a size of N×N or the second coding unit 2012 having a size of N/2×N by splitting the first coding unit 2020 in a vertical direction, or may determine the second coding unit 2022 having a size of N×N/2 by splitting the first coding unit 2020 in horizontal and vertical directions.

According to an embodiment, the image decoding apparatus 150 may determine a third coding unit 2004, 2014, or 2024 by dividing at least one of a width and height of the second coding unit 2002 having a size of N×N. That is, the image decoding apparatus 150 may determine the third coding unit 2004 having a size of N/2×N/2, the third coding unit 2014 having a size of N/2²×N/2, or the third coding unit 2024 having a size of N/2×N/2² by splitting the second coding unit 2002 in vertical and horizontal directions.

According to an embodiment, the image decoding apparatus 150 may determine the third coding unit 2004, 2014, or 2024 by dividing at least one of a width and height of the second coding unit 2012 having a size of N/2×N. That is, the image decoding apparatus 150 may determine the third coding unit 2004 having a size of N/2×N/2 or the third coding unit 2024 having a size of N/2×N/2² by splitting the second coding unit 2012 in a horizontal direction, or may determine the third coding unit 2014 having a size of N/2²×N/2 by splitting the second coding unit 2012 in vertical and horizontal directions.

According to an embodiment, the image decoding apparatus 150 may determine the third coding unit 2004, 2014, or 2024 by dividing at least one of a width and height of the second coding unit 2014 having a size of N×N/2. That is, the image decoding apparatus 150 may determine the third coding unit 2004 having a size of N/2×N/2 or the third coding unit 2014 having a size of N/2²×N/2 by splitting the second coding unit 2012 in a vertical direction, or may determine the third coding unit 2024 having a size of N/2×N/2² by splitting the second coding unit 2022 in vertical and horizontal directions.

According to an embodiment, the image decoding apparatus 150 may split the square coding unit 2000, 2002, or 2004 in a horizontal or vertical direction. For example, the image decoding apparatus 150 may determine the first coding unit 2010 having a size of N×2N by splitting the first coding unit 2000 having a size of 2N×2N in a vertical direction, or may determine the first coding unit 2020 having a size of 2N×N by splitting the first coding unit 2000 in a horizontal direction. According to an embodiment, when a depth is determined based on the length of the longest side of a coding unit, a depth of a coding unit determined by splitting the first coding unit 2000, 2002 or 2004 having a size of 2N×2N in a horizontal or vertical direction may be the same as the depth of the first coding unit 2000, 2002 or 2004.

According to an embodiment, a width and height of the third coding unit 2014 or 2024 may be ½² times those of the first coding unit 2010 or 2020. When a depth of the first coding unit 2010 or 2020 is D, a depth of the second coding unit 2012 or 2014, the width and height of which are ½ times those of the first coding unit 2010 or 2020, may be D+1, and a depth of the third coding unit 2014 or 2024, the width and height of which are ½² times those of the first coding unit 2010 or 2020, may be D+2.

Figure 21:
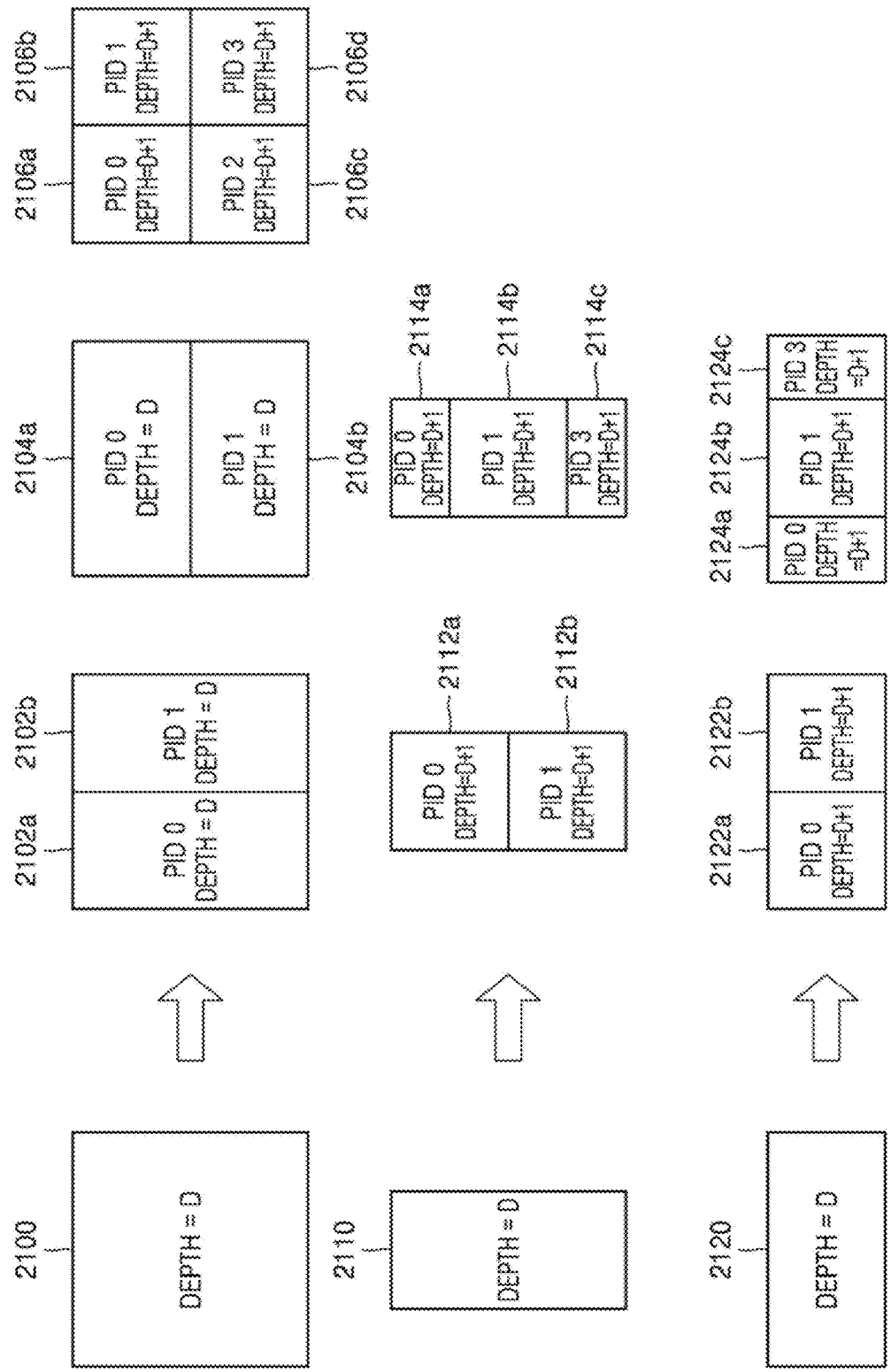
FIG. 21 illustrates depths that are determinable based on shapes and sizes of coding units, and part indexes (PIDs) that are for distinguishing the coding units, according to an embodiment.

FIG. 21 illustrates depths that are determinable based on shapes and sizes of coding units, and part indexes (PIDs) that are for distinguishing the coding units, according to an embodiment.

According to an embodiment, the image decoding apparatus 150 may determine various-shape second coding units by splitting a square first coding unit 2100. Referring to FIG. 21, the image decoding apparatus 150 may determine second coding units 2102a and 2102b, 2104a and 2104b, and 2106a, 2106b, 2106c, and 2106d by splitting the first coding unit 2100 in at least one of vertical and horizontal directions based on split shape information. That is, the image decoding apparatus 150 may determine the second coding units 2102a and 2102b, 2104a and 2104b, and 2106a, 2106b, 2106c, and 2106d, based on the split shape information of the first coding unit 2100.

According to an embodiment, a depth of the second coding units 2102a and 2102b, 2104a and 2104b, and 2106a, 2106b, 2106c, and 2106d, which are determined based on the split shape information of the square first coding unit 2100, may be determined based on the length of a long side thereof. For example, because the length of a side of the square first coding unit 2100 equals the length of a long side of the non-square second coding units 2102a and 2102b, and 2104a and 2104b, the first coding unit 2100 and the non-square second coding units 2102a and 2102b, and 2104a and 2104b may have the same depth, e.g., D. However, when the image decoding apparatus 150 splits the first coding unit 2100 into the four square second coding units 2106a, 2106b, 2106c, and 2106d based on the split shape information, because the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the image decoding apparatus 150 may determine a plurality of second coding units 2112a and 2112b, and 2114a, 2114b, and 2114c by splitting a first coding unit 2110, a height of which is longer than a width, in a horizontal direction based on the split shape information. According to an embodiment, the image decoding apparatus 150 may determine a plurality of second coding units 2122a and 2122b, and 2124a, 2124b, and 2124c by splitting a first coding unit 2120, a width of which is longer than a height, in a vertical direction based on the split shape information.

According to an embodiment, a depth of the second coding units 2112a and 2112b, 2114a, 2114b, and 2116a, 2116b, 2116c, and 2116d, which are determined based on the split shape information of the non-square first coding unit 2110 or 2120, may be determined based on the length of a long side thereof. For example, because the length of a side of the square second coding units 2112a and 2112b is ½ times the length of a long side of the first coding unit 2110 having a non-square shape, a height of which is longer than a width, a depth of the square second coding units 2102a, 2102b, 2104a, and 2104b is D+1 which is deeper than the depth D of the non-square first coding unit 2110 by 1.

Furthermore, the image decoding apparatus 150 may split the non-square first coding unit 2110 into an odd number of second coding units 2114a, 2114b, and 2114c based on the split shape information. The odd number of second coding units 2114a, 2114b, and 2114c may include the non-square second coding units 2114a and 2114c and the square second coding unit 2114b. In this case, because the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The image decoding apparatus 150 may determine depths of coding units split from the first coding unit 2120 having a non-square shape, a width of which is longer than a height, by using the above-described method of determining depths of coding units split from the first coding unit 2110.

According to an embodiment, the image decoding apparatus 150 may determine PIDs for identifying split coding units, based on a size ratio between the coding units when an odd number of split coding units do not have equal sizes. Referring to FIG. 21, a coding unit 2114b of a center location among an odd number of split coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, when a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the image decoding apparatus 150 may determine whether an odd number of split coding units do not have equal sizes, based on whether discontinuity is present in PIDs for identifying the split coding units.

According to an embodiment, the image decoding apparatus 150 may determine whether to use a specific splitting method, based on PID values for identifying a plurality of coding units determined by splitting a current coding unit. Referring to FIG. 21, the image decoding apparatus 150 may determine an even number of coding units 2112a and 2112b or an odd number of coding units 2114a, 2114b, and 2114c by splitting the first coding unit 2110 having a rectangular shape, a height of which is longer than a width. The image decoding apparatus 150 may use PIDs to identify respective coding units. According to an embodiment, the PID may be obtained from a sample of a preset location of each coding unit (e.g., a top left sample).

According to an embodiment, the image decoding apparatus 150 may determine a coding unit at a preset location from among the split coding units, by using the PIDs for distinguishing the coding units. According to an embodiment, when the split shape information of the first coding unit 2110 having a rectangular shape, a height of which is longer than a width, indicates to split a coding unit into three coding units, the image decoding apparatus 150 may split the first coding unit 2110 into three coding units 2114a, 2114b, and 2114c. The image decoding apparatus 150 may assign a PID to each of the three coding units 2114a, 2114b, and 2114c. The image decoding apparatus 150 may compare PIDs of an odd number of split coding units to determine a coding unit at a center location from among the coding units. The image decoding apparatus 150 may determine the coding unit 2114b having a PID corresponding to a middle value among the PIDs of the coding units, as the coding unit at the center location from among the coding units determined by splitting the first coding unit 2110. According to an embodiment, the image decoding apparatus 150 may determine PIDs for distinguishing split coding units, based on a size ratio between the coding units when the split coding units do not have equal sizes. Referring to FIG. 21, the coding unit 2114b generated by splitting the first coding unit 2110 may have a width equal to that of the other coding units 2114a and 2114c and a height which is two times that of the other coding units 2114a and 2114c. In this case, when the PID of the coding unit 2114b at the center location is 1, the PID of the coding unit 2114c located next to the coding unit 2114b may be increased by 2 and thus may be 3. When the PID is not uniformly increased as described above, the image decoding apparatus 150 may determine that a coding unit is split into a plurality of coding units including a coding unit having a size different from that of the other coding units. According to an embodiment, when the split shape information indicates to split a coding unit into an odd number of coding units, the image decoding apparatus 150 may split a current coding unit in such a manner that a coding unit of a preset location among an odd number of coding units (e.g., a coding unit of a centre location) has a size different from that of the other coding units. In this case, the image decoding apparatus 150 may determine the coding unit of the centre location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 150 may use a preset data unit where a coding unit starts to be recursively split.

Figure 22:
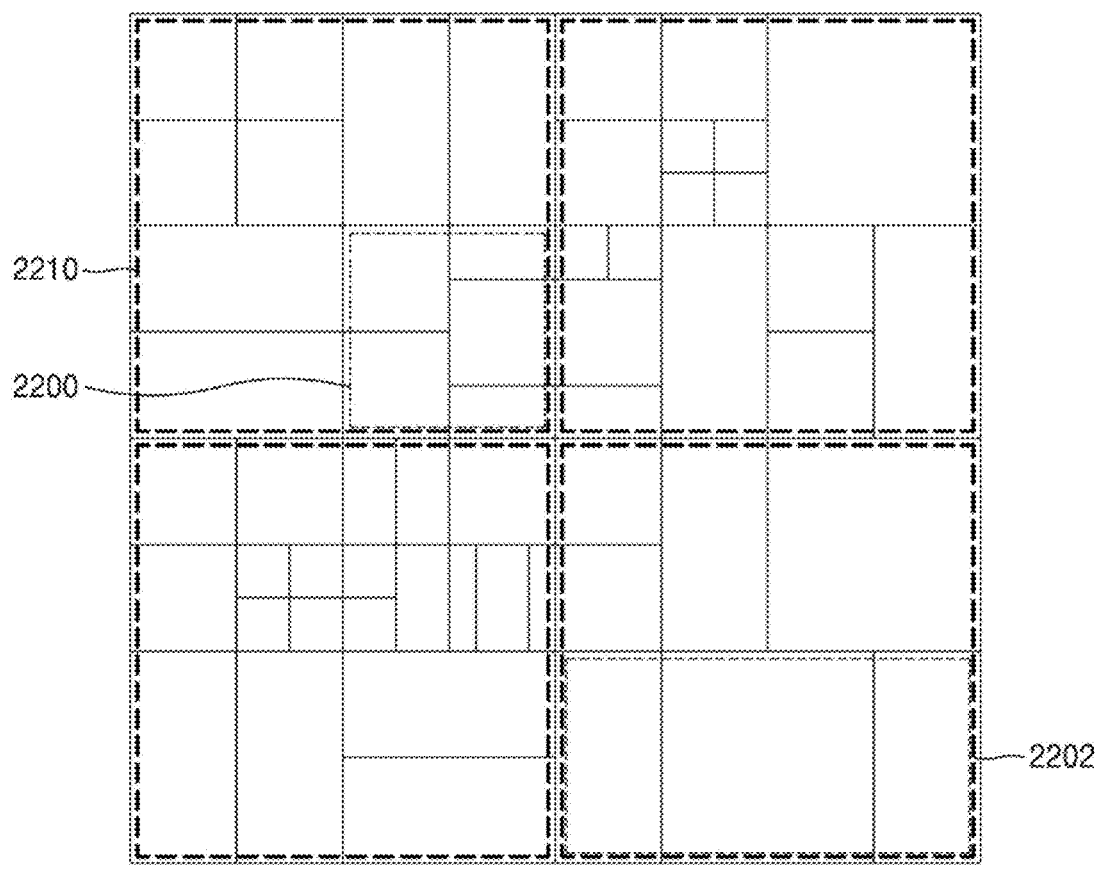
FIG. 22 illustrates that a plurality of coding units are determined based on a plurality of predetermined data units included in a picture, according to an embodiment.

FIG. 22 illustrates that a plurality of coding units are determined based on a plurality of preset data units included in a picture, according to an embodiment.

According to an embodiment, a preset data unit may be defined as a data unit where a coding unit starts to be recursively split by using at least one of block shape information and split shape information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 150 may split the current picture into a plurality of reference data units. According to an embodiment, the image decoding apparatus 150 may split the plurality of reference data units, which are split from the current picture, by using splitting information about each reference data unit. The operation of splitting the reference data unit may correspond to a splitting operation using a quadtree structure.

According to an embodiment, the image decoding apparatus 150 may previously determine the minimum size allowed for the reference data units included in the current picture. Accordingly, the image decoding apparatus 150 may determine various reference data units having sizes equal to or greater than the minimum size, and may determine one or more coding units by using the block shape information and the split shape information with reference to the determined reference data unit.

Referring to FIG. 22, the image decoding apparatus 150 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, largest coding units, or the like).

According to an embodiment, the receiver 210 of the image decoding apparatus 150 may obtain, from a bitstream, at least one of reference coding unit shape information and reference coding unit size information with respect to each of the various data units. An operation of splitting the square reference coding unit 2200 into one or more coding units has been described above in relation to the operation of splitting the current coding unit 1000 of FIG. 10, and an operation of splitting the non-square reference coding unit 2200 into one or more coding units has been described above in relation to the operation of splitting the current coding unit 1100 or 1150 of FIG. 11. Thus, detailed descriptions thereof will not be provided herein.

According to an embodiment, the image decoding apparatus 150 may use a PID for identifying the size and shape of reference coding units, to determine the size and shape of reference coding units according to some data units previously determined based on a preset condition. That is, the receiver 210 may obtain, from the bitstream, only the PID for identifying the size and shape of reference coding units with respect to each slice, slice segment, or largest coding unit which is a data unit satisfying a preset condition (e.g., a data unit having a size equal to or smaller than a slice) among the various data units (e.g., sequences, pictures, slices, slice segments, largest coding units, or the like). The image decoding apparatus 150 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 150 may determine at least one of the size and shape of reference coding units included in a data unit serving as a unit for obtaining the PID, by selecting the previously determined at least one of the size and shape of reference coding units based on the PID.

According to an embodiment, the image decoding apparatus 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 150 may determine the reference coding units by splitting the largest coding unit n times based on a quadtree structure, and may split the reference coding unit based on at least one of the block shape information and the split shape information according to various embodiments.

Figure 23:
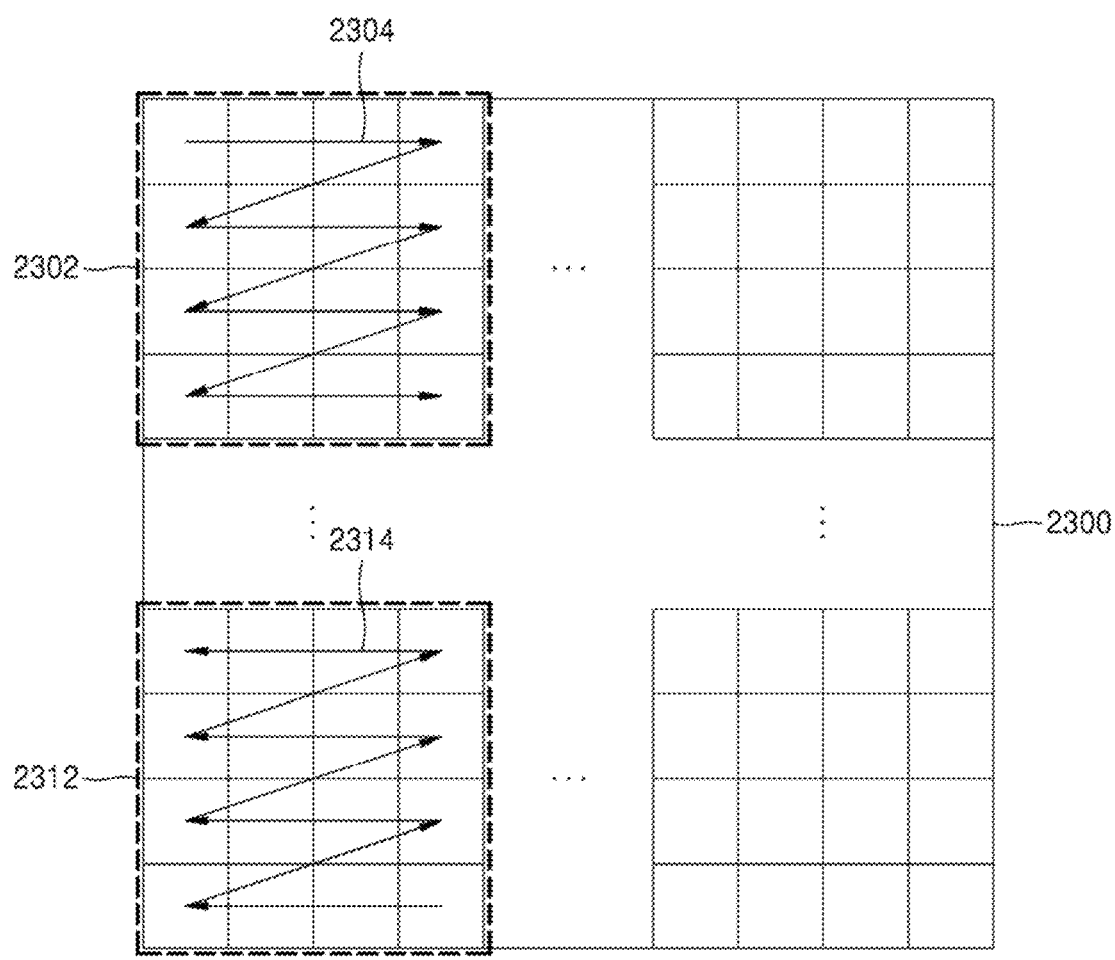
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the image decoding apparatus 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 150 may obtain processing block size information and may determine the size of one or more processing blocks included in the picture. The image decoding apparatus 150 may obtain the processing block size information from a bitstream and may determine the size of one or more processing blocks included in the picture. The size of processing blocks may be a preset size of data units, which is indicated by the processing block size information.

According to an embodiment, the receiver 210 of the image decoding apparatus 150 may obtain the processing block size information from the bitstream according to each specific data unit. For example, the processing block size information may be obtained from the bitstream in a data unit such as an image, sequence, picture, slice, or slice segment. That is, the receiver 210 may obtain the processing block size information from the bitstream according to each of the various data units, and the image decoding apparatus 150 may determine the size of one or more processing blocks, which are split from the picture, by using the obtained processing block size information. The size of the processing blocks may be integer times that of the reference coding units.

According to an embodiment, the image decoding apparatus 150 may determine the size of processing blocks 2302 and 2312 included in the picture 2300. For example, the image decoding apparatus 150 may determine the size of processing blocks based on the processing block size information obtained from the bitstream. Referring to FIG. 23, according to an embodiment, the image decoding apparatus 150 may determine a width of the processing blocks 2302 and 2312 to be four times the width of the reference coding units, and may determine a height of the processing blocks 2302 and 2312 to be four times the height of the reference coding units. The image decoding apparatus 150 may determine a determination order of one or more reference coding units in one or more processing blocks.

According to an embodiment, the image decoding apparatus 150 may determine the processing blocks 2302 and 2312, which are included in the picture 2300, based on the size of processing blocks, and may determine a determination order of one or more reference coding units in the processing blocks 2302 and 2312. According to an embodiment, determination of reference coding units may include determination of the size of the reference coding units.

According to an embodiment, the image decoding apparatus 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 150 may obtain, from the bitstream, the determination order information of reference coding units according to each specific data unit. For example, the receiver 210 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 150 may determine one or more reference coding units based on the determined determination order.

According to an embodiment, the receiver 210 may obtain the determination order information of reference coding units from the bitstream as information related to the processing blocks 2302 and 2312, and the image decoding apparatus 150 may determine a determination order of one or more reference coding units included in the processing blocks 2302 and 2312 and determine one or more reference coding units, which are included in the picture 2300, based on the determination order. Referring to FIG. 23, the image decoding apparatus 150 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included in the processing block 2302 may be determined according to a raster scan order. On the contrary, when the determination order 2314 of reference coding units in the other processing block 2312 is a backward raster scan order, reference coding units included in the processing block 2312 may be determined according to the backward raster scan order.

According to an embodiment, the image decoding apparatus 150 may decode the determined one or more reference coding units. The image decoding apparatus 150 may decode an image, based on the reference coding units determined as described above. A method of decoding the reference coding units may include various image decoding methods.

According to an embodiment, the image decoding apparatus 150 may obtain block shape information indicating the shape of a current coding unit or split shape information indicating a splitting method of the current coding unit, from the bitstream, and may use the obtained information. The block shape information or the split shape information may be included in the bitstream related to various data units. For example, the image decoding apparatus 150 may use the block shape information or the split shape information included in a sequence parameter set, a picture parameter set, a video parameter set, a slice header, or a slice segment header. Furthermore, the image decoding apparatus 150 may obtain, from the bitstream, syntax corresponding to the block shape information or the split shape information according to each largest coding unit, each reference coding unit, or each processing block, and may use the obtained syntax.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A method of encoding an image, the method comprising:
determining a subjective quality of the image when the image is compressed, wherein the subjective quality includes a Video Multimethod Assessment Fusion (VMAF) score or a mean opinion score (MOS score);
determining at least one degree of compression within a range of degrees of compression by which the subjective quality remains constant, wherein the at least one degree of compression corresponds to a bitrate or to a quantization parameter; and encoding the image by compressing using an autoencoder, a residual signal of the image, based on compression information according to the at least one degree of compression,
wherein the encoding the image further comprises obtaining a compressed residual signal from a bottleneck layer of the autoencoder, and
wherein the subjective quality is determined by using a Deep Neural Network (DNN).

2. The method of claim 1, wherein the determining of the subjective quality further comprises determining the subjective quality based on a machine learning result obtained by using the DNN using a plurality of layers.

3. The method of claim 2, wherein the determining of the subjective quality further comprises:
determining at least one convolution image by using at least one filter kernel for each of the plurality of layers; and
performing pooling on the at least one convolution image.

4. The method of claim 1, wherein the determining of the subjective quality comprises determining the subjective quality with respect to the frame by using at least one of a sample value, histogram and motion information which are associated with the frame.

5. The method of claim 1, wherein the encoding of the image further comprises:
when the image is compressed according to the at least one degree of compression, compressing the residual signal of the image by using the compression information comprising the quantization parameter of the compressed image; and
generating a bitstream comprising the compressed residual signal.

6. The method of claim 5, wherein the compressing of the residual signal of the image comprises:
inputting the residual signal to the autoencoder; and
obtaining the compressed residual signal from a hidden layer used in a compression process and is from among at least one hidden layer comprised in the autoencoder, wherein the hidden layer is the bottleneck layer.

7. The method of claim 6, wherein the autoencoder is a network designed to be trained by using a sum of a first loss and a second loss,
the first loss is calculated by compressing the residual signal via the autoencoder, and
the second loss is calculated by concentrating signal distribution of the residual signal compressed by the autoencoder.

8. The method of claim 6, wherein the obtaining of the compressed residual signal comprises:
determining a number of nodes of the hidden layer used in the compression process, based on the compression information; and
obtaining the compressed residual signal from the hidden layer having the number of nodes.

9. The method of claim 6, wherein the inputting of the residual signal comprises:
performing a pre-processing on amplitude and distribution of the residual signal; and
inputting the pre-processed residual signal to the autoencoder.

10. A method of decoding an image, the method comprising:
obtaining, from a bitstream, compression information according to at least one degree of compression, wherein the at least one degree of compression corresponds to a bitrate or to a quantization parameter;
obtaining a residual signal from an autoencoder, based on the compression information, wherein the obtaining the residual signal further comprises obtaining a compressed residual signal from a bottleneck layer of the autoencoder; and
decoding the image by using the residual signal,
wherein the at least one degree of compression is at least one of degrees of compression within a range degrees of compression by which a subjective quality remains constant wherein the subjective quality obtained by an output of a Deep Neural Network (DNN), wherein the subjective quality includes a Video Multimethod Assessment Fusion (VMAF) score or a mean opinion score (MOS score.

11. The method of claim 10, wherein the decoding of the image further comprises:
obtaining the residual signal of the image by using the compression information comprising the quantization parameter of the image compressed according to the at least one degree of compression.

12. The method of claim 10, wherein the obtaining of the residual signal comprises obtaining the residual signal by inputting information to a hidden layer comprising a number of nodes determined based on the compression information, the information being obtained from the bitstream, and
the number of nodes corresponds to a second number of nodes of the hidden layer used in a compression process performed by the autoencoder.

13. The method of claim 12, wherein the decoding of the image comprises:
performing a post-processing on amplitude and distribution of the residual signal; and
decoding the image by using the post-processed residual signal.

14. The method of claim 13, wherein the performing of the post-processing comprises:
obtaining information indicating the post-processing from the bitstream; and
performing the post-processing, based on the information indicating the post-processing.

15. An image decoding apparatus comprising:
an obtainer configured to obtain, from a bitstream, compression information according to at least one degree of compression, wherein the at least one degree of compression corresponds to a bitrate or to a quantization parameter; and
a decoder configured to obtain a residual signal from an autoencoder, based on the compression information, wherein the decoder is further configured to obtain a compressed residual signal from a bottleneck layer of the autoencoder, and decode an image by using the residual signal,
wherein the at least one degree of compression is at least one of degrees of compression within a range degrees of compression by which a subjective quality remains constant, wherein the subjective quality obtained by an output of obtained by using a Deep Neural Network (DNN), wherein the subjective quality includes a Video Multimethod Assessment Fusion (VMAF) score or a mean opinion score (MOS score).

* * * * *